United States Patent
Yamakaji

(10) Patent No.: US 9,664,591 B2
(45) Date of Patent: *May 30, 2017

(54) EYEGLASS LENS EVALUATION METHOD, EYEGLASS LENS DESIGN METHOD, EYEGLASS LENS MANUFACTURING METHOD, EYEGLASS LENS MANUFACTURING SYSTEM, AND EYEGLASS LENS

(75) Inventor: Tetsuma Yamakaji, Saitama (JP)

(73) Assignee: HOYA CORPORATION, Tokyo (JP)

(*) Notice: Subject to any disclaimer, the term of this patent is extended or adjusted under 35 U.S.C. 154(b) by 840 days.

This patent is subject to a terminal disclaimer.

(21) Appl. No.: 13/197,346

(22) Filed: Aug. 3, 2011

(65) Prior Publication Data

US 2012/0081661 A1    Apr. 5, 2012

Related U.S. Application Data

(63) Continuation-in-part of application No. PCT/JP2010/051267, filed on Jan. 29, 2010.

(30) Foreign Application Priority Data

Feb. 5, 2009   (JP) ................................. 2009-024890

(51) Int. Cl.
  *G02C 7/02*     (2006.01)
  *G01M 11/02*    (2006.01)
  *G02C 7/06*     (2006.01)

(52) U.S. Cl.
  CPC .......... *G01M 11/0257* (2013.01); *G02C 7/027* (2013.01); *G02C 7/061* (2013.01); *G02C 2202/06* (2013.01)

(58) Field of Classification Search
  CPC .......... G02C 7/02; G02C 7/025; G02C 7/027; G02C 7/061; G01M 11/0242; A61B 3/08
  USPC ........................................ 351/159.74–159.77
  See application file for complete search history.

(56) References Cited

U.S. PATENT DOCUMENTS

| | | |
|---|---|---|
| 4,606,622 A | 8/1986 | Fueter et al. |
| 6,222,621 B1 | 4/2001 | Taguchi |
| 6,554,426 B2 | 4/2003 | Shirayanagi |
| 6,817,713 B2 | 11/2004 | Ueno |
| 8,118,427 B2 | 2/2012 | Bonnin et al. |

(Continued)

FOREIGN PATENT DOCUMENTS

| | | |
|---|---|---|
| CN | 101010616 A | 8/2007 |
| DE | 10 2007 032 564 A1 | 1/2009 |

(Continued)

OTHER PUBLICATIONS

Mar. 30, 2010 International Search Report issued in Application No. PCT/JP/2010/051267(with translation).

(Continued)

*Primary Examiner* — Scott J Sugarman
(74) *Attorney, Agent, or Firm* — Oliff PLC

(57) ABSTRACT

With respect to the evaluation of custom-made eyeglass lenses using a binocular visual acuity function, a measurement value including essentially at least one of or both of a positive relative convergence or a negative relative convergence of the positive relative convergence, the negative relative convergence, a positive relative accommodation, a negative relative accommodation and a vertical fusional vergence is provided as a factor.

10 Claims, 37 Drawing Sheets

(56) References Cited

U.S. PATENT DOCUMENTS

| | | |
|---|---|---|
| 2001/0050752 A1 | 12/2001 | Shirayanagi |
| 2002/0118337 A1 | 8/2002 | Perrott et al. |
| 2003/0076479 A1 | 4/2003 | Qi |
| 2003/0107702 A1 | 6/2003 | Yamakaji |
| 2004/0179168 A1 | 9/2004 | Yamakaji |
| 2004/0190136 A1 | 9/2004 | Kanai |
| 2004/0239875 A1 | 12/2004 | Yamakaji |
| 2005/0004694 A1 | 1/2005 | Ueno |
| 2005/0041205 A1 | 2/2005 | Yamakaji |
| 2005/0179859 A1 | 8/2005 | Perrott et al. |
| 2008/0106697 A1 | 5/2008 | Pedrono |
| 2008/0239241 A1 | 10/2008 | Yamakaji |
| 2009/0290121 A1 | 11/2009 | Drobe et al. |
| 2010/0191504 A1 | 7/2010 | Esser et al. |
| 2010/0198817 A1 | 8/2010 | Esser et al. |
| 2011/0051082 A1 | 3/2011 | Becken et al. |
| 2011/0194067 A1 | 8/2011 | Yamakaji |
| 2011/0202421 A1 | 8/2011 | Yamakaji |
| 2012/0081661 A1 | 4/2012 | Yamakaji |
| 2012/0105609 A1 | 5/2012 | Qi |
| 2012/0105801 A1 | 5/2012 | Yamakaji |
| 2012/0113394 A1 | 5/2012 | Bonnin et al. |
| 2012/0218513 A1 | 8/2012 | Yamakaji |
| 2013/0044291 A1 | 2/2013 | Kato et al. |
| 2013/0179297 A1* | 7/2013 | Yamakaji ............... 705/26.5 |
| 2014/0028972 A1 | 1/2014 | Granger et al. |
| 2014/0139647 A1 | 5/2014 | Nagatani |

FOREIGN PATENT DOCUMENTS

| | | |
|---|---|---|
| DE | 10 2007 062 929 A1 | 7/2009 |
| EP | 0994375 A1 | 4/2000 |
| EP | 1 291 633 A2 | 3/2003 |
| EP | 2 207 021 A1 | 7/2010 |
| EP | 2 392 961 A1 | 12/2011 |
| JP | B-42-9416 | 5/1967 |
| JP | B2-2-39767 | 9/1990 |
| JP | A-2000-506628 | 5/2000 |
| JP | A-2000-186978 | 7/2000 |
| JP | 2001-198089 A | 7/2001 |
| JP | 2001-318349 A | 11/2001 |
| JP | 2005-043545 A | 2/2005 |
| JP | A-2008-083729 | 4/2008 |
| JP | A-2008-511033 | 4/2008 |
| JP | 4158906 B2 | 10/2008 |
| RU | 2 158 567 C2 | 11/2000 |
| WO | WO 02/088828 A1 | 11/2002 |
| WO | WO 2004/018988 A1 | 3/2004 |
| WO | 2007/019938 A1 | 2/2007 |
| WO | WO 2007/138428 A2 | 12/2007 |
| WO | 2009/057709 A1 | 5/2009 |
| WO | WO 2009/057708 A1 | 5/2009 |
| WO | 2009/083218 A1 | 7/2009 |

OTHER PUBLICATIONS

Noguchi et al., "Active Optics Experiment. I. Shack-Hartmann Wave-Front Analyzer to Measure F/5 Mirrors," Publ. Natl. Astron. Obs. Japan, vol. 1, pp. 49-55, 1989.

Wakakura et al., "All of the vision and eyeball movement," Medical View Co., pp. 140-143 and pp. 147-148, 2007.

Howard et al., "Binocular Vision and Stereopsis. Chapter 2: Binocular correspondence and the horopter," Oxford Psychology Series, No. 29, p. 39 and p. 56, 1995.

Ishihara, Revised by Shikano, "Little pupil science," Kanehara & Co., Ltd., 17th Revised Version, p. 39, p. 41, pp. 49-51 and p. 50, 1925.

Hatada, "Depth information and a characteristic of a vision," Visual Information Research Group, pp. 1-17, Apr. 23, 1974.

Ukai, "Influence of a stereoscopic image on a biological body: What will happen when a stimulation of an accommodation contradicts a stimulation of a convergence," Vision, vol. 17, No. 2, pp. 113-122, 2005.

Hoffman et al., "Vergence-accommodation conflicts hinder visual performance and cause visual fatigue," Journal of Vision, vol. 8, No. 3, 33, pp. 1-30, 2008.

Izumi et al., "Examination of Binocular Function," Waseda Optometry College, Revised Version, p. 5, 1985.

Edited by Uchikawa et al., "Vision II," Asakura Publishing Co., Ltd., pp. 86-87 and pp. 130-133, 2007.

Schor et al., "Binocular Sensory Fusion Is Limited by Spatial Resolution," Vision Res., vol. 24, No. 7, pp. 661-665, 1984.

Tsuda, "Introduction to the American 21-item inspection—Examination and analysis of visual performance," Kindai Kougaku Publishing Co., pp. 182-187 and pp. 218-229, 1983.

Emoto et al., "Distribution of Fusional Vergence Limit in Viewing Stereoscopic Image Systems," Journal of the Institute of Image Information and Television Engineers, vol. 55, No. 5, pp. 703-710, 2001.

Peters, "The Relationship Between Refractive Error and Visual Acuity at Three Age Levels," Am. J. Optom. Physiol. Opt., vol. 38, No. 4, pp. 194-198, 1961.

Osaka et al., "Binocular Movement and Hering Theory, Experimental Psychology of Eye Movement," The University of Nagoya Press, Chapter 3, pp. 60-61, 1993.

Nagata, "Distributions of 'Vergence Fusional Stereoscopic Limit (VFSL)' of Disparity in a Stereoscopic Display," T.V.R.S.J., vol. 7, No. 2, pp. 239-246, 2002.

Tsuruta, "History of eyesight. Transition of age and adjustment curve," Japanese Journal of Visual Science, vol. 19, No. 3, pp. 101-105.

Edited by The Vision Society of Japan, "Handbook of Visual Information Processing," Asakura Publishing Co., Ltd., pp. 283-287, 2000.

Shimono, "Effects of Vergence Eye Movements on Binocular Stereopsis," Optical Review, vol. 23, No. 1, pp. 17-22, Jan. 1994.

Takagi et al., "Adaptive Changes in Dynamic Properties of Human Disparity-Induced Vergence," Investigative Ophthalmology & Visual Science, vol. 42, No. 7, pp. 1479-1486, Jun. 2001.

Emoto, "The Influence of the Dissociation of Vergence and Accommodation on Visual Fatigue in Watching Stereoscopic Images," Visual Science, vol. 24, No. 1, pp. 4-14, 2003.

Nov. 7, 2013 Office Action issued in Russian Patent Application No. 2011136700/20(054576) (with translation).

Mar. 17, 2015 Extended Search Report issued in European Patent Application No. 11812400.7.

Apr. 29, 2015 Office Action issued in Chinese Patent Application No. 201410406794.1.

Aug. 4, 2015 Extended European Search Report issued in European Application No. 10738478.6.

Sep. 22, 2015 Office Action issued in U.S. Appl. No. 13/749,169.

Howard, I. P. and Roger, B. J., Binocular vision and stereopsis: Oxford Psychology Series No. 29, (1995), pp. 316-322.

Tsuda, Introduction to American 21-item inspection—Examination and analysis of visual performance, Kindai Kougaku Publishing Co., (1983), pp. 192-193 and 288-289.

Emoto et al., "Horizontal binocular disparity and visual fatigue during stereo display observation", Vision, vol. 17, No. 2, (2005), pp. 101-112.

Sep. 6, 2011 International Search Report issued in International Application No. PCT/JP2011/066715.

U.S. Appl. No. 13/749,169, filed Jan. 24, 2013 in the name of Yamakaji.

Jun. 30, 2016 Office Action issued in U.S. Appl. No. 13/749,169.

Jan. 5, 2017 Office Action issued in European Patent Application No. 11 812 400.7.

* cited by examiner

FIG. 35
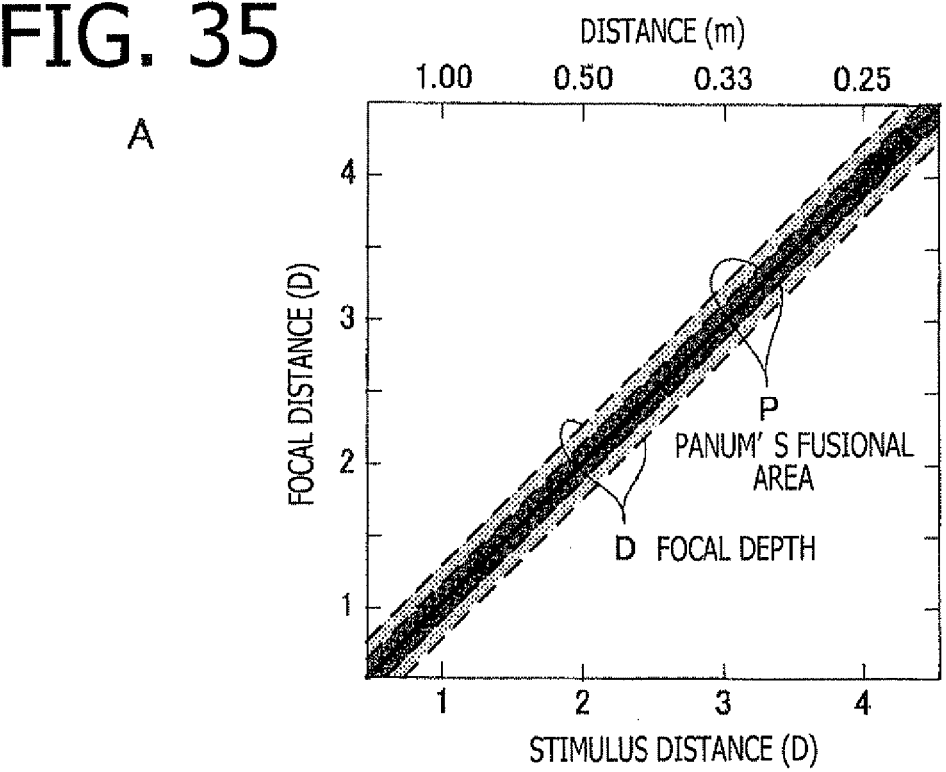
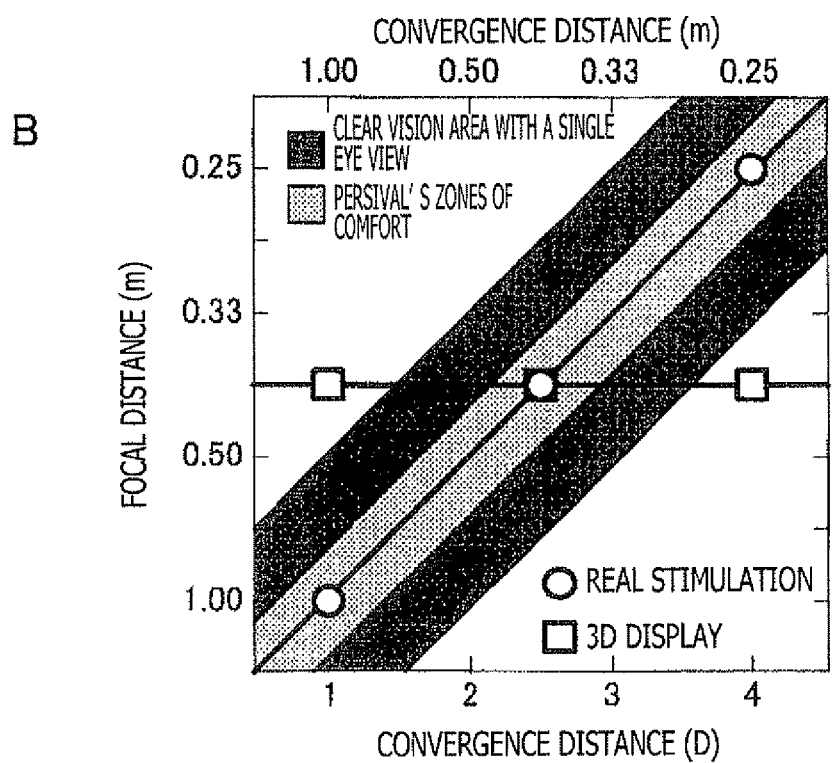

| cm | MA | arc min | Δ |
|---|---|---|---|
|  | 0 | 0.0 | 0.0 |
| 2000 | 0.05 | 10.3 | 0.3 |
| 1000 | 0.1 | 20.6 | 0.6 |
| 667 | 0.15 | 30.9 | 0.9 |
| 500 | 0.2 | 41.3 | 1.2 |
| 400 | 0.25 | 51.6 | 1.5 |
| 333 | 0.3 | 61.9 | 1.8 |
| 286 | 0.35 | 72.2 | 2.1 |
| 250 | 0.4 | 82.5 | 2.4 |
| 222 | 0.45 | 92.8 | 2.7 |
| 200 | 0.5 | 103.1 | 3.0 |
| 182 | 0.55 | 113.4 | 3.3 |
| 167 | 0.6 | 123.7 | 3.6 |
| 154 | 0.65 | 134.0 | 3.9 |
| 143 | 0.7 | 144.3 | 4.2 |
| 133 | 0.75 | 154.6 | 4.5 |
| 125 | 0.8 | 164.9 | 4.8 |
| 118 | 0.85 | 175.2 | 5.1 |
| 111 | 0.9 | 185.5 | 5.4 |
| 105 | 0.95 | 195.7 | 5.7 |
| 100 | 1 | 206.0 | 6.0 |
| 95 | 1.05 | 216.3 | 6.3 |
| 91 | 1.1 | 226.6 | 6.6 |
| 87 | 1.15 | 236.8 | 6.9 |
| 83 | 1.2 | 247.1 | 7.2 |
| 80 | 1.25 | 257.3 | 7.5 |
| 77 | 1.3 | 267.6 | 7.8 |
| 74 | 1.35 | 277.9 | 8.1 |
| 71 | 1.4 | 288.1 | 8.4 |
| 69 | 1.45 | 298.3 | 8.7 |
| 67 | 1.5 | 308.6 | 9.0 |
| 65 | 1.55 | 318.8 | 9.3 |
| 63 | 1.6 | 329.0 | 9.6 |
| 61 | 1.65 | 339.2 | 9.9 |
| 59 | 1.7 | 349.4 | 10.2 |
| 57 | 1.75 | 359.6 | 10.5 |
| 56 | 1.8 | 369.8 | 10.8 |
| 54 | 1.85 | 380.0 | 11.1 |
| 53 | 1.9 | 390.2 | 11.4 |
| 51 | 1.95 | 400.4 | 11.7 |
| 50 | 2 | 410.6 | 12.0 |

B (PD=0.065)

| cm | MA | arc min | Δ |
|---|---|---|---|
|  | 0 | 0.0 | 0.0 |
| 2000 | 0.05 | 11.2 | 0.3 |
| 1000 | 0.1 | 22.3 | 0.7 |
| 667 | 0.15 | 33.5 | 1.0 |
| 500 | 0.2 | 44.7 | 1.3 |
| 400 | 0.25 | 55.9 | 1.6 |
| 333 | 0.3 | 67.0 | 2.0 |
| 286 | 0.35 | 78.2 | 2.3 |
| 250 | 0.4 | 89.4 | 2.6 |
| 222 | 0.45 | 100.5 | 2.9 |
| 200 | 0.5 | 111.7 | 3.3 |
| 182 | 0.55 | 122.8 | 3.6 |
| 167 | 0.6 | 134.0 | 3.9 |
| 154 | 0.65 | 145.2 | 4.2 |
| 143 | 0.7 | 156.3 | 4.6 |
| 133 | 0.75 | 167.5 | 4.9 |
| 125 | 0.8 | 178.6 | 5.2 |
| 118 | 0.85 | 189.7 | 5.5 |
| 111 | 0.9 | 200.9 | 5.9 |
| 105 | 0.95 | 212.0 | 6.2 |
| 100 | 1 | 223.1 | 6.5 |
| 95 | 1.05 | 234.3 | 6.8 |
| 91 | 1.1 | 245.4 | 7.2 |
| 87 | 1.15 | 256.5 | 7.5 |
| 83 | 1.2 | 267.6 | 7.8 |
| 80 | 1.25 | 278.7 | 8.1 |
| 77 | 1.3 | 289.8 | 8.5 |
| 74 | 1.35 | 300.9 | 8.8 |
| 71 | 1.4 | 312.0 | 9.1 |
| 69 | 1.45 | 323.1 | 9.4 |
| 67 | 1.5 | 334.1 | 9.8 |
| 65 | 1.55 | 345.2 | 10.1 |
| 63 | 1.6 | 356.2 | 10.4 |
| 61 | 1.65 | 367.3 | 10.7 |
| 59 | 1.7 | 378.3 | 11.1 |
| 57 | 1.75 | 389.4 | 11.4 |
| 56 | 1.8 | 400.4 | 11.7 |
| 54 | 1.85 | 411.4 | 12.0 |
| 53 | 1.9 | 422.4 | 12.4 |
| 51 | 1.95 | 433.4 | 12.7 |
| 50 | 2 | 444.4 | 13.0 |

FIG. 42
A 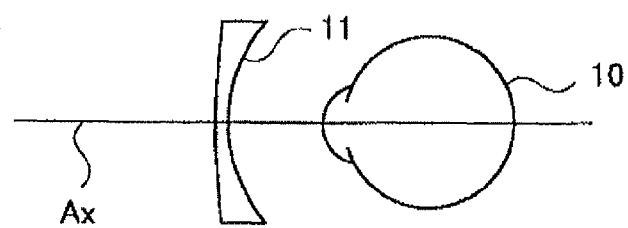
B 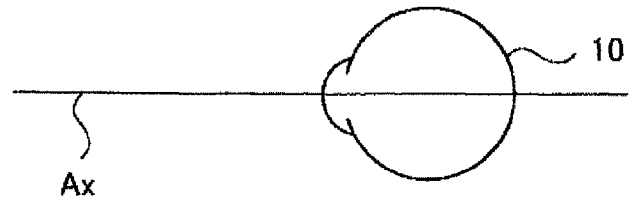
C 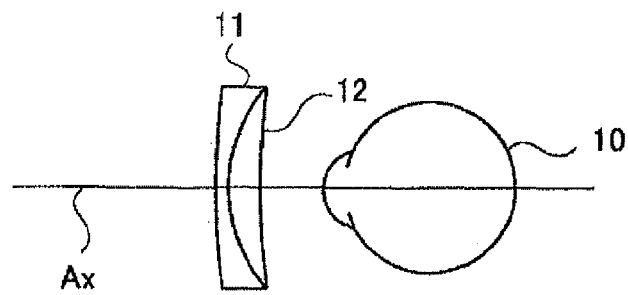
D 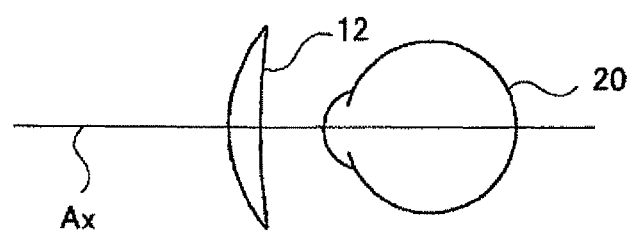
E 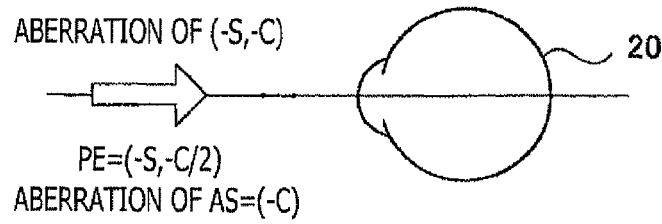

Sph  0dpt
Add + 2dpt
φ 60mm

EYEGLASS LENS EVALUATION METHOD, EYEGLASS LENS DESIGN METHOD, EYEGLASS LENS MANUFACTURING METHOD, EYEGLASS LENS MANUFACTURING SYSTEM, AND EYEGLASS LENS

This is a Continuation-in-Part of International Application No. PCT/JP2010/051267 filed Jan. 29, 2010, which claims priority from Japanese Patent Application No. 2009-024890 filed Feb. 5, 2009. The entire disclosure of the prior application is hereby incorporated by reference herein its entirety.

TECHNICAL FIELD

The present invention relates to an eyeglass lens evaluation method which is used for evaluating performances when eyeglass lenses are designed or manufactured, an eyeglass lens design method using it, an eyeglass lens manufacturing method, an eyeglass lens manufacturing system, and eyeglass lenses.

BACKGROUND

For evaluating or designing eyeglass lenses, various evaluation methods and designing methods are proposed to obtain the optimal visibility, and especially a technique is proposed which is focusing on eyesight in a state in which eyeglass lenses are worn. For example, in patent document 1 (WO2002/088828), a technique for designing eyeglass lenses using a vidual function is disclosed. In patent document 2 (WO2004/018988), eyeglass lenses, which are designed through considering chromatic aberrations of the visual function, are disclosed. Here, the visual function is a function representing eyesight, which is normalized with optical aberrations of the lenses and characteristics of eyeballs (relative accommodation values, relative convergence values, physiological astigmatic quantities), when viewing through eyeglass lenses (normalized eyesight such that, when corrected completely, it becomes 0 in logMAR).

However, in patent document 1 and patent document 2, a binocular function, at a time when eyeglass lenses are worn, is not considered at all. For example, in patent document 1, since the object is to apply for a general-purpose lens, individual elements, for example, such as a relative accommodation or a relative convergence are not considered. Therefore, it is not suitable for designing optimal eyeglass lenses, for which individual information regarding a binocular vision is taken into consideration. Since it is for general-purpose lenses, naturally, a design of eyeglass lenses for both eyes is not considered. In patent document 2, though it is considered with respect to a chromatic aberration portion of the visual function, for other portions, as with the above patent document 1, a technical content is insufficient for an individual design in which a binocular vision is considered.

On the other hand, in patent document 3 (Japanese Published Examined Application No. HEI02-39767B (Japanese Published Unexamined Application No. SHO57-10113A)), patent document 4 (Japanese Unexamined Patent Application Publication (Translation of PCT Application) No. 2008-511033A), and patent document 5 (Japanese Unexamined Patent Application Publication (Translation of PCT Application) No. 2000-506628A), there are references with respect to how it can be seen with left and right eyes, when a pair of eyeglass lenses are worn.

The invention described in patent document 3 is an epoch-making patent as an approach to a binocular function. In patent document 3, a desired condition with which the binocular function is realized is described. Namely, a range of an astigmatism in a progressive band, arrangement of an astigmatism and an alignment error in a whole of a lens, prism ranges of left and right eyeglass lenses, and a condition on directions of skews induced by the prisms are described. However, reevaluated from the present, the invention described in patent document 3 includes some defects.

Firstly, an aberration calculation of a line of fixation emitted from a lens is performed without considering the Listing's law at one eye which is a primary movement of the eyeball. In this case, the calculation of a residual astigmatism becomes uncertain, and it cannot say that there is the predetermined effect described in the document. Further, the movement of an eyeball of one eye can be considered as a rotational movement performed while centered at one point in the eyeball, that is, the center of the rotation. A frontal plane including the center of rotation at a position where the eyeball is gazing front is called a Listing's surface. It is the law of major movements of an eyeball that the rotational axis of the eyeball lies within a Listing's surface, and it is called the Listing's law.

Secondly, it is written that progressive portions of the left and right lenses are within the prism ranges, and that almost the same astigmatism and alignment errors are taken and defocuses are the same, therefore a stereoscopic vision (it seems that a binocular vision) is fine. However, in patent document 3, it is not shown that what balance of an astigmatism and an alignment error is fine for the stereoscopic vision, and the extent of fineness is not quantitatively shown. In this regard, it is not clear how the eyeglass lenses described in patent document 3 are configured.

Thirdly, on page 5, lines 25-44 of patent document 3, the explanation of "FIG. 2" of the document is not for an optical system for a binocular vision. This figure is shown in FIG. 44. In FIG. 44, when eyeballs 57 and 58 look straight at a point $P_p$ on a subject surface 59, lines of sights 50 and 51 are directed to the point $P_p$. Eyeglass lenses 52 and 53 are arranged in front of the eyeballs 57 and 58. By the prism effect of the eyeglass lenses 52 and 53, for a left eye 57, it is seen that the point $P_p$ is placed at an intersection point $P_L$ of the line of sight 54 and the surface 59, and, for a right eye 58, it is seen that the point $P_p$ is placed at an intersection point $P_R$ of the line of sight 58 and the surface 59. It is described in lines 41-42 on the same page that the relationship between the lines of sights shown in FIG. 44 can be deemed as one eyeglass lens which is symmetrical with respect to a prime meridian. However, as it can be seen from Prentice's formula (P=(h×D)/10), a prism effect is proportional to a dioptric power. Therefore, this assertion is valid only for lenses such that the left lens and the right lens are identical.

Additionally, Prentice's formula is an approximation formula which is sufficient for ordinary use, and it means that prism P of a lens is proportional to a distance, h (in unit of mm), from the center and diopter D. In short, since optical powers of a left lens and a right lens are generally different, the above described assertion is not obvious and not established. Further, after the explanation of "FIG. 2" in patent document 3, the explanations are based on one of the left lens and the right lens throughout the document, without specifying a coordinate system and the origin that specify the target point $P_p$. Therefore, the configuration is not suitable for an optical system for a binocular function.

Fourth, the extent of the distortion shown in "FIG. 4" of patent document 3 is difficult to understand. This figure is shown in FIG. 45. The explanation of the figure in patent document 3 is in line 17 on right column on page 5, where it is explained that the figure is an imaging figured of an equidistant and symmetrical lattice. "FIG. 4" in this document is a figure in which, positional differences from a point P is drawn, when a grid point of the lattice is set to the point P, and especially, it can be seen that it is distorted at the lower peripheral part. In lines 25-27 on the same column of patent document 3, it is explained that this is a saddle-shaped distortion or a barrel distortion. Namely, in patent document 1, it is taught that there is a relationship between the positional differences in horizontal direction, $\Delta P_E$, and the distortion. When it is assumed that there is a relationship between the positional differences in horizontal direction, $\Delta P_R$, and the distortion, the lattice must be distorted when all the lines of sights 54 and 55 have intersection points other than the point P on the surface 59. However, in this case, since the positional differences in horizontal direction are 0, a contradiction arises in that the above described "FIG. 4" becomes a figure which is not distorted. Therefore, the positional differences in horizontal direction, $\Delta P_R$, has no relationship with the distortion. Further, it is described that a distorted figure is processed as an image drawn with straight lines by a brain. However, a basis is not described regarding, to what extent the figure is distorted, the figure can be processed as lines, though it is an important matter. Therefore, it cannot be clearly understood whether the distortion shown in FIG. 45 becomes straight lines in a brain or not.

Fifth is that the target is on the surface. Basically, the target is arbitrarily determined by a designer. Therefore, in general, eyeglass lenses are designed so that performance of the eyeglass lenses becomes higher at an arbitrarily target determined by a designer. However, in patent document 3, the evaluation method is limited to candidates of targets which are adopted for eyeglass lenses for reading characters on a tight news paper or on a wall. Points within the target other than fixation point in patent document 3 have big differences in distances from both of the eyeballs. Therefore, it becomes difficult to simultaneously adjust an error in power from the fixation point, a residual astigmatism, and prism. Consequently, the prism becomes bigger. Therefore, in a system in which the target is on a surface, it is difficult to evaluate a binocular vision.

In patent document 4, a design method for eyeglass lenses is proposed. In the design method, a state, in which a front view direction of a person wearing a pair of eyeglasses is shifted toward a side of a dominant eye, is considered. If the shift described in patent document 2 is true for a near vision, then it is an interesting phenomenon and, naturally, there should be an invention which utilizes the physiological phenomenon. However, patent document 4 includes the problems described below.

Firstly, an object to be measured is a living body. Thus, there is a problem on accuracy of measurement. In the example described in paragraph 0030 of patent document 4, it is written that the shift is 2 cm. If there is 2 cm, it is easy to measure, but if the shift is smaller, it becomes difficult to stably measure. It is described in paragraph 0063 of patent document 4 that it can be measured with "an absolute error of less than or equal to 3 mm." However, taking into consideration that an ordinary amount of an inset for near vision in a progressive power lens is 2.5 mm, the amount of the error is very large.

The second problem is that a phenomenon that "a front view direction is shifted toward a side of a dominant eye" contradicts the Hering's law of equal innervations, which is the only one law regarding binocular eye movements. It is difficult to improve a binocular function by designing eyeglass lenses through a measure which is based on a phenomenon contradicting the Hering's law of equal innervations. Additionally, an explanation of Hering's law of equal innervations can be seen in non-patent document 15 (written by Ryoji Osaka, Sachio Nakamizo, and Kazuo Koga, "Binocular Movement and Hering Theory, Experimental Psychology of eye movement", The University of Nagoya Press, (1993), Chapter 3, p. 60-61, written by Sachio Nakamizo). The Hering's theory regarding binocular movement consists of a hypothesis that an innervation of version (ipsilateral binocular movement), which generates binocular movement, and an innervation of vergence (contralateral binocular movement) exist, a hypothesis of equal innervations of both eyes that means amounts of innervations assigned to respective eyes are always equal (Hering's law), and a hypothesis of additivity of innervations that means additivity holds between these two types of innervations.

Further, as a different opinion, it is known that a center of rotation is not fixed and it moves as well as shifts, during ocular movement. It is known that the center of rotation does not rotate while centered by a single point, and it rotates while centered by different points depending on its use. The assertion of "shift of a front view direction" in patent document 4 can be explained from a fact that a center of rotation of an eyeball itself shifts. Namely, when it is considered that centers of rotations move, a midpoint between the centers of rotation of left and right eyeballs also moves, and a front view direction also moves. In this manner, it is considered that an assumption that left and right eyeballs symmetrically move better conforms to the physiological fact than the assumption that left and right eyeballs asymmetrically move, which is insisted by patent document 2.

Thirdly, it is written in paragraph 0039 of patent document 2 that "a superior binocular fusion is brought." However, the extent is not clear. Specifically, it is written that if an occurred astigmatism (it is considered as a residual astigmatism) is less than or equal to 0.5 diopter, then it is a comfortable field of vision. However, an error in power occurs depending on a target distance. A comfortable field of vision is not realized, except for the case in which it is supposed that the target is placed at a position at which the error in power is 0. In an embodiment of patent document 4, two figures, which are a figure of errors in power and a figure of occurred astigmatisms, are shown depending on conditions of observations. However, their balances are not mentioned. Therefore, it can be hardly understood whether comfortable fields of vision can be obtained without showing the balances or a relationship between an error in power and an occurred astigmatism.

Further, it is incorrect to insist that "a binocular fusion becomes better" by diagrammatically showing only errors in power and occurred astigmatisms. A disorder in which a binocular vision is disabled even if left and right eyes are gaining good abilities to see can be found mainly in many squint patients. In a conventional evaluation of an error in power and an astigmatism such as the evaluation in this patent document 4, the evaluation of performances specific to binocular vision is not suitable.

Fourth, as in the case of patent document 3, the object of this patent is a surface, as it is apparent from "FIG. 1" or "FIG. 4" of patent document 4. Namely, things that are similar to the fourth indication regarding patent document 3 can be said.

In patent document 5, a technique regarding an eyeglass lens of so-called a wrap-around type, the lens being curved from its front towards an ear side, is disclosed. Further, on page 13 or page 15 of patent document 5, there are some descriptions regarding an off-axis prismatic disparity. Here, defects regarding a binocular vision, the binocular vision being the thesis in patent document 5, are mainly described.

Firstly, it is written that techniques disclosed in patent document 5 are a technique about an eyeglass lens of wrap-around type or an eyeglass lens of a protective eyewear. However, their configurations are unclear. In the main invention described in patent document 5, it is assumed that there are a prescribed area and a peripheral temporal area. The difference between these two areas lies in shapes of surfaces, as described on pages 28-30 of patent document 5. Here, a method of explaining the difference is not based on evaluations by ray tracing calculations which are commonly used at present, but it is a simplified method which calculates from a shape of a lens surface which has been used for the explanation of a progressive lens in the past. Therefore, the refractive power and the astigmatism are derived values of a curve which are calculated from derivatives of the surface. Thus they are different from those calculated by the ray tracing. Further, similarly, there is no description regarding consideration of the Listing's law of movement of an eyeball, which is usually taken into consideration for designing at present. Therefore, it is different from an evaluation or a design which is based on a physiological basis, such as the Listing's law. Further, the peripheral temporal area is so arbitrarily that the difference from the prescribed area becomes not clear. Thus the peripheral temporal area is not forming a limiting condition. Therefore, it can be considered that the description is only valid for normal design of a lens.

Secondly, regarding the definition of the off axis prismatic disparity described in a lower part of page 13 of patent document 5, it is only described that "a defect on a binocular vision arises when an astigmatism at a temporal part and an astigmatism at a nasal part are not equal." However, the description is insufficient and it cannot be understood what astigmatisms are referred to. Further, as a method of correcting the off-axis prismatic disparity, there is only a description on page 15 of patent document 5 that an aspheric surface is adopted. Thus, the description is insufficient. In addition, though it is clear that the evaluation is performed with a single eye lens, it is concluded on page 13 of patent document 5 that "there is a defect on a binocular vision." The ground of the conclusion is not clear.

Thirdly, on page 15 of patent document 5, an adjustment among a refractive power, an astigmatism, and a disparity of a prism, and a balance of elements for an optical correction are mentioned. However, the description that a defect on a binocular vision is acceptable as long as the defect is within a range of the values of the table on page 15 cannot be understood. It can be read from this table that a correction amount decreases as a prescribed lens power becomes stronger. It can be read that an error is sufficiently corrected with a smaller correction and the defect on the binocular vision is acceptable mean that when the prescribed lens power becomes stronger, a patient's tolerance on a binocular vision becomes greater. The assertion is difficult to understand, since it is a description of a tolerance based on single eye evaluation. With the subject matter of patent document 5, in which even a determination method of a tolerance of a binocular vision is not disclosed, it is hard to predict whether it is possible to design so that a tolerance is less than or equal to this tolerance, as with a standard of normal eyeglass lenses. Namely, it is not easy to apply this tolerance to a lens design of another general prescription, with a description of such a tolerance in a state in which even a binocular vision is not defined.

Here, it seems that the evaluation of a binocular vision through the single eye evaluation is based on a reason that a temporal portion and a nasal portion must be equal, since, when looking right, a right temporal portion is used in a right lens and a nasal portion is used in a left lens. However, this is a case where there is a precondition that a left lens and a right lens are the same, for example, as addressed in third problem of patent document 1. Such a prescription is very rare. Further, suppose a case in which it is asserted that prescriptions for a left eye and a right eye are almost the same. In this case, taking into consideration that the sensitivity limit in an angle of a sensory fusion is about 10 seconds in angle, it is difficult to capture a binocular vision with such a rough concept. Moreover, when applying to general-purpose lenses, it is problematic to apply the evaluation and the design that are based on such a tolerance, which lacks a physiological basis, to a human body, even if left and right prescriptions are not known in advance. As a result, there is a risk that it gives discomfort or it increases tiredness.

SUMMARY

In view of the above problems, it is objectives of the present invention to quantitatively evaluate binocular visual performance based on physiological knowledge, to propose an evaluation function in which the evaluation results are taken into account, and to perform evaluations and to manufacture eyeglass lenses which are superior in the binocular visual performance.

To solve the above described problem, according to the method of designing eyeglass lenses according to the present invention: when a positive relative convergence, a negative relative convergence, a positive relative accommodation, a negative relative accommodation and a vertical fusional vergence, which are individual measurement values relating to binocular vision, are defined as relative measurement values, at least one of or both of the positive relative convergence and the negative relative convergence is included in an individual relative measurement value. The method comprises determining optical design values for eyeglass lenses by optimizing binocular vision while using, as an evaluation function for the optimizing, a function obtained by adding binocular visual acuity functions including the relative measurement values as factors at respective evaluation points of an object.

The eyeglass lens manufacturing method according to the present invention comprises manufacturing the eyeglass lenses based on the optical design values determined by the above described eyeglass lens design method. The eyeglass lens evaluation method according to the present invention evaluates binocular vision while using, as an evaluation function for calculation of the optimizing, a function obtained by adding the above described binocular visual acuity functions including the relative measurement values as factors at respective evaluation points.

An eyeglass lens manufacturing system according to the invention is a system in which an ordering side computer having a function of executing a process for ordering the eyeglass and is installed on an eyeglass lens ordering side, a manufacturing side computer having a function of receiving information from the ordering side computer and executing a process necessary for receiving an order for the eyeglass lens are connected via a network. The ordering side computer transmits information necessary for designing the eyeglass lenses including at least one of or both of a positive relative convergence and a negative relative convergence, to the manufacturing side computer. The manufacturing side computer includes: a data input unit to which data including the relative measurement value transmitted from the ordering side computer is inputted; a binocular visual acuity function calculation unit that calculates optical performance values at a plurality of evaluation points of the eyeglass lenses based on the inputted data; an evaluation value optimization unit that optimizes the optical performance values by using, as an evaluation function, a function obtained by adding binocular visual acuity functions including, as factors, the relative measurement values including at least one of or both of the positive relative convergence and the negative relative convergence; an evaluation function evaluating unit that evaluates the optical performance values by comparing the evaluation function with a predetermined threshold; a design data correction unit that corrects design data when the values of the binocular visual acuity functions do not reach a predetermined convergence condition as a result of the evaluation by the evaluation value evaluating unit; an optical design value determination unit that determines the design data based on a result of evaluation finished for each evaluation point by the evaluation function evaluating unit; a design data output unit that supplies the final design data obtained by the optical design value determination unit, to a device for processing a lens.

The eyeglass lenses according to the invention are manufactured by the above described eyeglass lens manufacturing method and the eyeglass lens manufacturing system.

In the present invention, it is preferable to: classify into a fusion disabled area and a fusional area as threshold values for the binocular visual acuity function including the relative measurement value as a factor; define a smaller value of visual functions of left and right eyeballs, as the binocular visual acuity function in the fusion disabled area; and define a value obtained by subtracting a binocular visual acuity improvement value from the smaller value of the visual functions of the left and right eyeballs, as the binocular visual acuity function in the fusional area.

When a three-dimensional space in which a horizontal axis represents an angle of convergence, a vertical axis represents the vertical fusional vergence of the motor fusion and a depth axis represents the accommodation axis is considered for the classifying into the fusion disabled area and the fusional area, it is preferable that the classifying into the fusion disabled area and the fusional area is executed by using, as criteria, an inside and an outside of a closed surface defined by using the relative measurement values as thresholds.

It is preferable to: define, as a threshold, ⅓ of the positive relative convergence or the negative relative convergence of the relative measurement value on the axis of the angle of convergence; and obtain a convergence aberration defined as a difference between the angle of convergence at the evaluation point and a convergence angle reference value which is the angle of convergence of a line of fixation passing through the design reference points of the eyeglass lenses. Furthermore, it is preferable to: obtain a plane parallel component which includes an median line of the line of fixation by which the angle of convergence at the evaluation pint is obtained and which is a projection to a plane perpendicular to a median plane; define, as a judgment criterion of the relative convergence, a compared value between the plane parallel component value of the convergence aberration and the threshold; and classify into the fusion disabled are and the fusional area. The "median line" as used herein means a line which, if it is represented by the direction cosine, passes through the median point (origin point) of the center of rotation of the left and tight eyeballs on the image side and passes through the evaluation point of the object on the object side. That is, "median line" is a line having an average of the direction cosine of the line of fixation of the left and right eyeballs.

⅓ of the positive relative accommodation or the negative relative accommodation of the relative measurement value may be defined as a threshold on the axis of the accommodation, and a compared value between an average dioptric error obtained at the evaluation point and the threshold may be defined as the judgment criterion to classify into the fusion disabled area and the fusional area.

It is preferable to: define, as the threshold, ⅓ of the vertical fusional vergence of the relative measurement values on the axis of the vertical fusional vergence of the motor fusion; obtain the convergence aberration defines as the difference between the angle of convergence at the evaluation point and the convergence angle reference value which is the angle of convergence at the design reference point; obtain a plane vertical component which includes a median line of the line of fixation for which the angle of convergence of the evaluation point is obtained and which is a projection to a plane parallel with the median plane; define, as a judgment criterion of the vertical fusional vergence, a compared value between a value of the plane vertical component of the convergence aberration and the threshold; and classify into the fusion disabled area and the fusional area. It is preferable to classify into the inside of a motor fusional area satisfying the criterion of the motor fusion when all the judgment criteria of the relative convergence, the relative accommodation and the vertical fusional vergence are satisfied simultaneously; and classify into the fusion disabled area when at least one of the judgment criteria is not satisfied.

As describe above, according to the invention, we focus attention on the binocular visual performance of the binocular visual performance when the eyeglass is worn, and when the measurement value relating to the binocular visual performance is defined as the "relative measurement value", the relative measurement value includes at least one of or both of the positive relative convergence or the negative relative convergence. Thus, the binocular visual acuity function including the relative measurement value as a factor is proposed, and the binocular visual acuity functions are added together at the respective evaluation points of the object. By executing the optimization by using the added functions as the evaluation function, the evaluation and the design of the eyeglass lenses are performed.

As described, for example, in "Relationship between visual fatigue and inconsistency between a focus adjustment and convergence of both eyes in a three-dimensional image vision", Masaki Emoto, visual science, vol. 24, No. 1 (2003) p 13, the relative measurement value deeply relates to the motor fusion and the visual fatigue, and a smaller relative measurement value causes the fatigue. The inventor of the present invention has focused attention on the above described fact, and has found that eyeglass lenses designed not to exceed the threshold of the relative measurement value, the eyeglass lenses become conformable for the wearer. Therefore, according to the invention, the relative measurement values are obtained from an orderer. When the relative measurement value is one of or both of the positive relative convergence or the negative relative convergence, the other values are obtained from one of or both of the positive relative convergence or the negative relative convergence. When the relative measurement value cannot be obtained from the orderer, the relative measurement value may be approximated from the age, and the approximated value may be used as the relative measurement value, which is also within the scope of the invention. By executing the evaluation and design while inputting the relative measurement value obtained as described above into the evaluation function, it becomes possible to improve the binocular visual performance of the eyeglass lenses.

According to the present invention, by using the visual functions of both eyes which incorporates the relative measurement values which are measurement values regarding the binocular vision, it becomes possible to provide eyeglass lenses which improve the binocular visual performance.

BRIEF DESCRIPTION OF THE DRAWINGS

FIG. 35A is a diagram showing a sensory fusion, and FIG. 35B is a diagram showing motor fusion.

FIG. 36A is an example of calculations of angles of convergence when a pupillary distance PD is 60 mm, and FIG. 36B is an example of calculations of angles of convergence when a pupillary distance PD is 65 mm.

FIG. 42A through FIG. 42E are explanatory diagrams showing degradations of eyesight when an examinee, whose Peters diagram is a normal vision, wears eyeglass lenses of a reverse power.

DETAILED DESCRIPTION OF EMBODIMENTS

Figure 1:
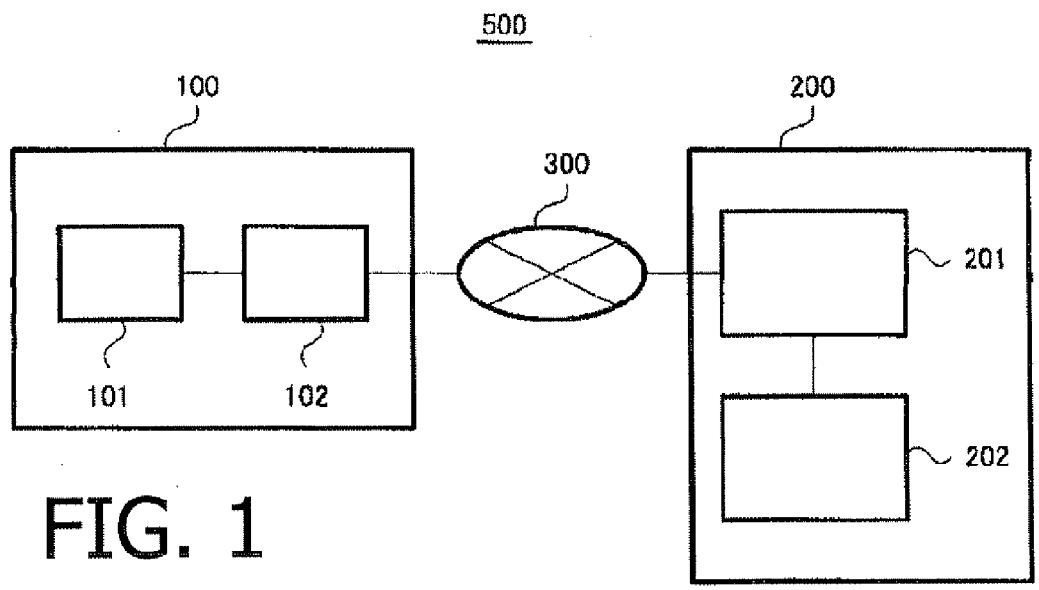
FIG. 1 is a schematic diagram of a manufacturing system according to an embodiment of an eyeglass lens manufacturing method of the present invention.

Embodiments of the present invention are explained below, but the present invention is not limited to the embodiments described below. It is explained in the following order.
[1] Embodiments of eyeglass lens manufacturing system and manufacturing method
[2] Embodiment of eyeglass lens design method
[3] Embodiments Prior to a specific explanation of an embodiment of the present invention, technical assumptions and terms used in the embodiments are explained.

In order to perform an evaluation or design of an eyeglass lens in the embodiment, it is necessary to define a design reference point. This design reference point slightly differs for a single focus lens and for a multifocal lens. Thus, they are separately explained. For a single focus lens, a design reference point is a position at which prescription values (a spherical diopter power, an astigmatism degree, astigmatism axes, a prism value, a prism axis) are measured, and, in addition, at which a line of fixation and a lens crosses. This point is called also as a point of view, an eye point, or an optical centration point. When there is no prism, the design reference point is treated the same as an optical center. In a normal prescription, a design reference point of a lens is matched with a pupillary distance in the horizontal direction, and is matched with slightly below a pupil (about 10 degrees while centered by a center of rotation, about 4 mm) in the vertical direction, then it is put into a frame. For a reading lens, no individual design is specially performed and it is substituted by a general-purpose lens. Thus, for a prescription of a reading lens, a design reference point is provided at a position where a line of fixation from an object distance (25 cm-50 cm) crosses with the lens, and in the horizontal direction, the design reference point is set to slightly shorter distance (by 2-5 mm)(this is called a near pupillary distance and sometimes abbreviated as NPD) than the pupillary distance. In the vertical direction, the design reference point is matched with slightly below a pupil (about 20 degrees while centered by a center of rotation, about 9 mm), and it is put into a frame. For a multifocal lens, such as a progressive lens, reference points are separately provided for points to measure prescription values for far vision (a spherical diopter power, an astigmatism degree, astigmatism axes), an eye point (a point to be matched with a pupil), a prism measurement point, prescription values for near vision (powers added to the prescription values for far vision, namely, an added power). Usually, the eye point is matched with a pupil, and the reference points are put into a frame.

In the embodiment, a lens design is performed using a generally known ray tracing method. For example, in non-patent document 1 (Written by Tomowaki Takahashi, "Lens Design," Tokai University Press (1994)), techniques regarding an optimization design of a lens by a ray tracing method and a wavefront aberration are described. A wavefront aberration is described in non-patent document 2 (Takeshi Noguchi et al, "ACTIVE OPTICS EXPERIMENTS I, SHACK-HARTMAN WAVE-FRONT ANALYZER TO MEASURE F/5 MIRRORS", Publ. Natl. Astrron. Obs. Japan Vol. 1, 1989), p. 49-55), etc. Additionally, in the technical field of eyeglass lenses, for a lens design, a lens measurement device which calculates an aberration (an error in power, an astigmatism, etc.) from a wavefront measurement after passing through an eyeglass lens is used.

An aberration caused by a lens along a principal ray entering a center of rotation of an eyeball from an object, when the object is viewed through an eyeglass lens, can be approximated by low-order aberrations, since an eyeball's pupil diameter is small. Here, the low-order aberrations in the technical field of eyeglass lenses are explained. The low-order aberrations include, for example, an error in power, a residual astigmatism, and a chromatic aberration.

Usually, for a distance lens, it is prescribed such that a refractive power of an eyeball is subtracted from a refractive power of a lens, so that an object in a front distant place can be clearly seen at a design reference point (usually, a position of the lens when an eyeball sees the front distant place through the lens). It can be said that an insufficient refractive power is compensated by a lens. At that time, an aberration is 0. In the prescription, when an astigmatism is at an eyeball at the design reference point, the astigmatism matches with an astigmatic axis of a lens. The astigmatic axis crosses perpendicularly with the principal ray, and, further, the astigmatic axis is a principal meridian of the refractive power. The principal meridian is, as with the eyeball, a path of a ray which is from an object and reaches to the center of rotation of the eyeball through the eyeglass lens. When the eyeball rotates in accordance with the Listing's law, unlike an ordinary coaxial optical system, the eyeglass lens is fixed and a direction of the eyeball relatively changes with respect to the eyeglass. At that time, at a point other than the design reference point, the refractive power of the lens slightly differs from the refractive power at the design reference point, because of a property of the lens. Even at that time, the refractive power of the eyeball is subtracted from the refractive power of the lens. The subtracted value is the aberration of the Lens-Eyeball System.

Regarding subtraction of aberrations, when rotated along an astigmatic axis of a lens in accordance with the Listing's law (there are two directions in the principal meridian direction), since the astigmatic axis of the lens coincide with an astigmatic axis of an eyeball, it suffices to merely subtract in each axis direction. Previously, the aberration at this time used to be called an aberration of a lens. However, if the eyeball rotates in a direction other than the astigmatic axis direction of the lens, the astigmatic axis of the lens becomes different from the astigmatic axis of the eyeball. Thus, a refractive power of a lens is decomposed in the direction of the astigmatic axis of the eyeball, and an average of quantities that are respective decomposed refractive powers subtracted by refractive powers in respective astigmatic axes directions is called a power error. Since this power error is an average, it is unrelated with a difference in the astigmatic axis, and it is equivalent to a power error in a case where the astigmatic axes coincide with each other. However, an astigmatism takes a different value from the value when the axes coincide with each other.

Here, supposing that the above described values subtracted by the refractive powers in the two astigmatic axis directions of the eyeball are an aberration A and an aberration B, the power error is an average of the aberration A and the aberration B, and the residual astigmatism is a difference between the aberration A and the aberration B. When the Listing's law is not required, namely, when the eyeball rotates along with the astigmatic axis of an eyeglass, it was not called as a residual astigmatism and it was called as an astigmatism, before. The power error in this case was called as MOE and the astigmatism was sometimes called as OAE.

Further, when an angle difference between a principal ray from a center of rotation of an eyeball to a rear surface of a lens and a principal ray from a front surface of a lens to an object is denoted by $\delta$ and an Abbe number is denoted by $\nu$, then a chroma aberration is expressed by $100 \times \tan \delta / \nu$.

[1] Embodiments of Eyeglass Lens Manufacturing System and Manufacturing Method

First, an embodiment of an eyeglass lens manufacturing system and manufacturing method of the present invention is explained. FIG. 1 is a schematic diagram of the eyeglass lens manufacturing system according to the embodiment. As shown in FIG. 1, in a system 500, at a side of an eyeglass shop 100, there are a measurement device 101 which measures eyesight and relative measurement values of a customer who has ordered a pair of eyeglass lenses, and an ordering side computer 102 which includes a function to input various information including the values measured by the measurement device, and a function to perform necessary processes for ordering the pair of eyeglass lenses.

On the other hand, at an order receiving side, for example, in a lens manufacturer 200, a manufacturing side computer 201, which is connected to a communication line 300 such as the Internet, is provided, in order to receive the information output from the ordering side computer 102. The manufacturing side computer 201 has a function to perform necessary processes for receiving the order of the eyeglass lenses, and at the same time, has a function to implement the eyeglass lens design method described later. Namely, the information necessary for designing the eyeglass lenses, which has been ordered from the ordering side computer 102, includes, in addition to measured values regarding eyesight, measured values of at least one of or both of a positive relative convergence or a negative relative convergence, among the relative measurement values. When the relative measurement values are not included, information of a customer, such as an age, with which the relative measurement values can be roughly derived, is included. Then, the manufacturing side computer 201 performs an optimization calculation using a function, for which the visual functions for both eyes including the relative measurement values as factors are added at respective evaluation points, as an evaluation function, at a time of the optimization calculation. With this, optical design values are determined, and at the same time, manufacturing information for manufacturing the eyeglass lenses is output to a lens processing device 202, based on the optical design values.

Further, as the information input to the manufacturing side computer 201, in addition to the above described information, such as the measured value or the age of the customer, other information can be input and added for the calculation of the visual functions of both eyes. Also, the eyeglass lenses are produced through processing the lenses based on the determined optical design values, and at this time, shape parameters, such as the manufacturer's own shape parameters or the correction coefficients determined at the factory (manufacturing equipment), may be added.

Here, a lens shape design through a general optimization calculation, which is also used in the embodiment, is outlined. With respect to a lens shape and an object, in general, a surface is expressed with a general free form surface modeling, such as NURBS (Non-Uniform Rational B-Spline), or a known numerical expression. Further, a thickness and an arrangement are expressed in terms of suitable coefficients. In a first step, known parameters are input into a computer. The known parameters include the object, an arrangement relationship of Object-Lens-Eyeball, constrained conditions (for example, achieving a predetermined prescription value at a design reference point, the thickness does not become negative, etc.), the evaluation function for which an aberration of the lens is considered as a factor, etc. In a next step of the optimization calculation, a combination of the coefficients of the lens components, such that the evaluation functions obtained from the evaluation points on the object become less while the constrained conditions are satisfied, are found out. As a condition of convergence, converging calculations are repeated until the minimum value of the evaluation function or a combination of the coefficient for which the evaluation functions become substantially less cannot be found out. When the condition of convergence is satisfied and the iterative calculation is terminated, the coefficients of the lens components are determined. The whole of the steps are called a lens shape determination or a lens design. In such a known optimization calculation, the lens design has an equivalent relationship with a known object, an arrangement relationship, constrained conditions, and evaluation functions. Namely, when the object, the arrangement relationship, the constrained conditions, and the evaluation functions are determined, the lens design is unambiguously determined.

Next, before explaining in detail the binocular visual acuity function, which are used as the evaluation functions of the optimization calculation, a binocular vision is explained.

First, a binocular function and a linkage between a convergence and an accommodation are explained. The binocular functions are classified into a simultaneous viewing, a fusion, a stereoscopic vision, and a binocular visual acuity, in a large way. As documents disclosing these, non-patent document 3 (Written by Masato Wakakura, Osamu Mimura, "All of the vision and eyeball movement," Medical View Co. (2007), p. 147-148, p. 140-143) and non-patent document 4 (Howard, I. P. and Roger, B. J., "Binocular vision and stereopsis," Chapter 2, New York Oxford Press, (1995), p. 1-736) can be considered. It is disclosed on page 142 of non-patent document 3 that fusions are classified into motor fusions and sensory fusions. In non-patent document 4, there are detailed explanations across the board.

In non-patent document 3, it is categorized in a structure such that the fusion is enabled when the simultaneous vision is enabled, and the stereoscopic vision is enabled when the fusion is enabled. In the present invention, the fusion is focused, and explanations of other functions are omitted. However, it is explicitly stated that without the fusion, the stereoscopic vision, which is the highest function of the binocular vision, is not realized. The fusion is visual performance which integrates pieces of visual information separately input to the respective eyes into one. It is the sensory fusion that integrate objects into one, without moving the eyeballs.

A convergence, a divergence movement, and vertical fusional vergence for obtaining the sensory fusion are called motor fusions. The relationships between the convergence or the divergence movement of an eyeball and an accommodation are linked. The linkage has been described as the Donders diagram. Regarding the Donders diagram, there are descriptions in non-patent document 5 (Written by Shinobu Ishihara and Revised by Shinichi Shikano, "Little pupil science," 17th revised version, Kanehara & Co., Ltd., (1925), p. 50) and in non-patent document 6 (Written by Toyohiko Hatada, "Depth information and a characteristic of a vision," Visual Information Research Group, Apr. 23, 1974, p. 12). The straight line of 45 degrees from the origin in the Donders diagram is called the Donders line. The straight line represents the linkage between the accommodation and the convergence, when an examinee who does not have a squint nor a heterophoria is viewing an object with naked eyes. The limit values of the convergence are called the Donders curve. For a value between one point on the Donders line and the left or right Donders curve, the right side (the side on which the angle of convergence becomes large) is classified as a negative relative convergence, and the left side (the side on which the angle of convergence becomes small) is classified as a positive relative convergence. Further, explanations that it can be a cause of a visual fatigue that relative measurement values are significantly smaller than the standard values, that a convergence is easier to measure than an accommodation, and that the Donders line is not true in a precise sense and its gradient is about 0.8, explanations of a lead of an accommodation and a lag of an accommodation are described, in detail, in non-patent document 7 (Written by Kazuhiko Ukai, "Influence of a stereoscopic image on a biological body: What will happen when a stimulation of an accommodation contradicts a stimulation of a convergence" vision, vol. 17, No. 2, p. 113-122), etc.

In general, a positive relative convergence and a negative relative convergence are expressed in terms of prism diopter. On the other hand, when the definitions are in accordance with the definitions of Donders, they are expressed in terms of diopter values. Therefore, sometimes they are called as a positive relative convergence power and a negative relative convergence power. There are no essential difference in these expressions. Thus, for the present invention, they are unified and expressed as a positive relative convergence and a negative relative convergence. Similarly, for a relative accommodation, when the definition is in accordance with the definition of Donders, it is expressed in terms of a diopter value. Therefore, sometimes they are called as a positive relative accommodation power and a negative relative accommodation power. There are also no essential difference in these expressions. Thus, for the present invention, they are unified and expressed as a positive relative accommodation and a negative relative accommodation.

The above described relative accommodations are described in the specification of PCT/JP2008/069791 by the present applicant. In the specification, a method is described in which the relative accommodation, that is an individual element, and an approximated value of the relative accommodation are obtained from an age, and they are set as visual functions. The relative accommodation is a kind of an accommodation, and it has a characteristic similar to that of the accommodation. Regarding the accommodation, the matters described below are known. It is not true that the accommodation works precisely until a limit, and the accommodation does not work at all when it exceeds the limit. For example, in areas close to an accommodation far point and an accommodation near point, accuracies are degraded. Further, it is ambiguous that where the limit point is. Therefore, when viewing far, the focus often matches a point little closer to a target. Conversely, for a close view, the focus matches a point slightly distant from an object. Regarding this incompleteness, the former is called a lead of the accommodation and the latter is called a lag of the accommodation. Since there is the lead of the accommodation, even with a normal vision, the eyesight in far vision is slightly decreased. Conversely, when very good eyesight appears in far vision, then hyperopia is suspected. When such a condition is realized by correcting nearsightedness, then an over correction is suspected. In this way, the major problem for correcting a refraction anomaly is in that an amount of the refraction anomaly depends on a concept of the accommodation far point that includes ambiguity on actual measurements.

Additionally, on pages 147-148 of non-patent document 3, it is described that in a near response, a convergence, an accommodation, and a pupil are closely coordinated. Specifically, there are the following descriptions: "Among the three elements, for the convergence, an amount of a binocular disparity is accurately detected (an error in the convergence is at the extent of 1-2 minutes), and a directionality is clear, as it is a crossed disparity or an uncrossed disparity. Thus, a quick and a highly accurate control is possible. On the other hand, for the accommodation, since a near and far direction is not known only from visual information of blur, the control is difficult. Further, necessity of a response is small corresponding to an amount of a focal depth. Thus it can be said that the accommodation is a relatively rough response with respect to quantity." Thus, the relative accommodation is a measurement value for which it is difficult to maintain accuracy as an individual element of the binocular vision in comparison with the relative convergence. Further, in the above described specification PCT/JP2008/069791, only the eyesight with a single eye is explained. In addition, a compensation of the relative accommodation is performed through an adjustment effect of the eyeglass lens, however, in the example of the above described PCT/JP2008/069791, the compensation is necessary when calculating the relative accommodation for a case in which a pair of eyeglass lenses is wore, from values obtained from the Donders diagram in a state in which no eyeglass lens is wore. Here, for the relative accommodation, it is assumed that a pair of eyeglass lenses, which are corrected so that an object can be clearly seen, is wore. Therefore, the compensation is unnecessary.

Figure 34:
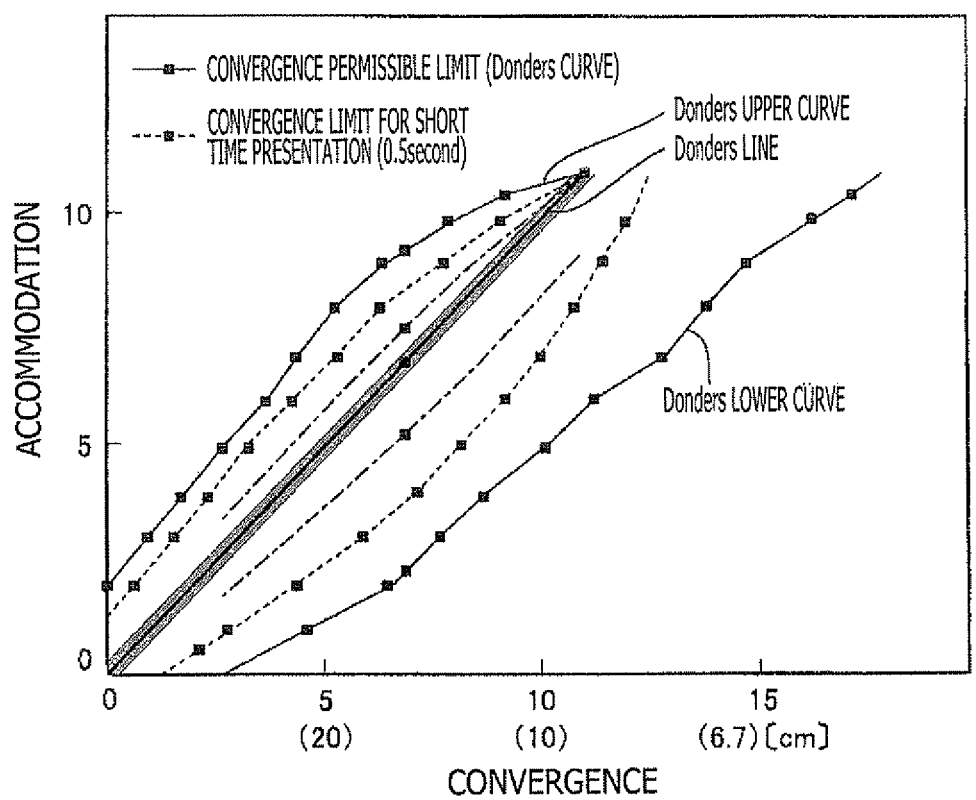
FIG. 34 is a Donders diagram by Hatada.

He re, an example, in which the motor fusion and the sensory fusion are expressed in the Donders diagram, is shown. FIG. 34 is the Donders diagram by Hatada, which is described in non-patent document 6. In FIG. 34, the horizontal axis shows the convergence (unit: meter angle MA), and the vertical axis shows the accommodation (unit: diopter D). In FIG. 34, the motor fusion is shown by the Donders curve and the sensory fusion is shown by a gray area close to the Donders line, on the one Donders diagram.

Figure 2:
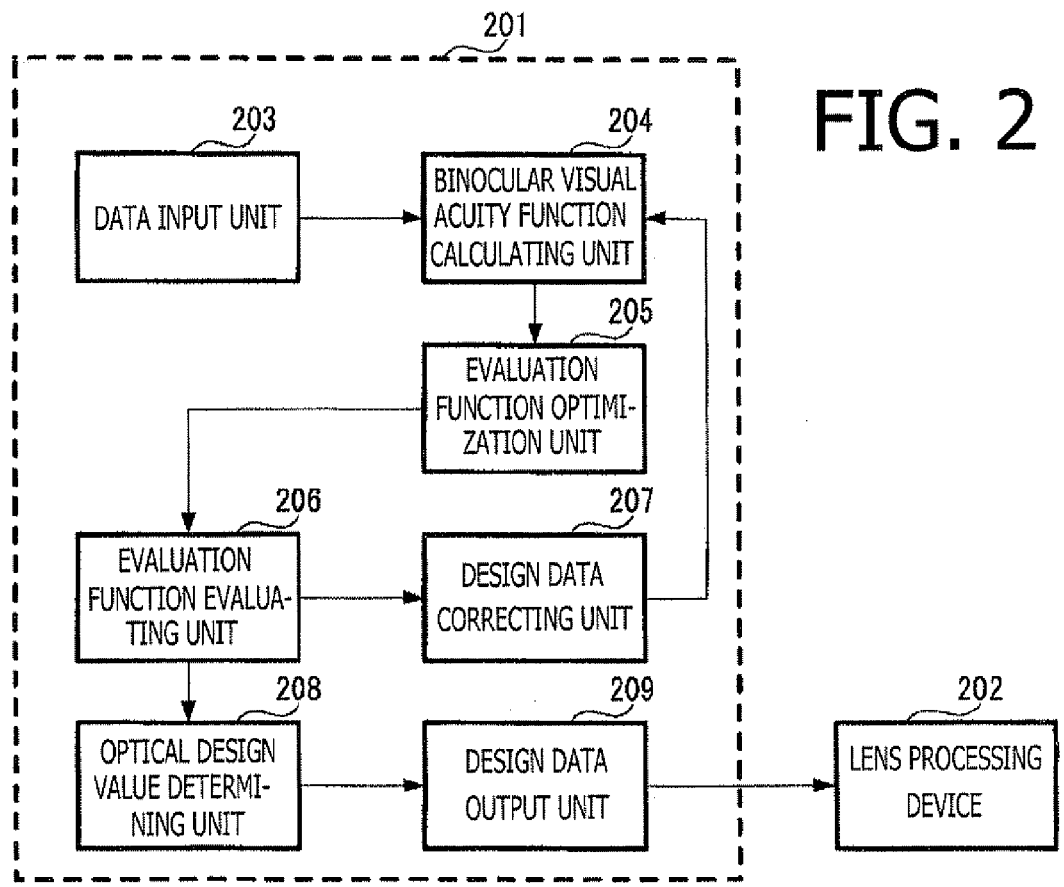
FIG. 2 is a functional block diagram showing a function of a manufacturing side computer in the manufacturing system according to the embodiment of the eyeglass lens manufacturing method of the present invention.

Further, in FIG. 2 of non-patent document 8 (David M. Hoffman, Ahana R. Girshick, Kurt Akeley, Martin S. Banks, "Vergence-accommodation conflicts hinder visual performance and cause visual fatigue," journal of vision, Vol. 8, No. 3, 33, (2008)), the motor fusion and the sensory fusion are separately drawn on two pieces of the Donders diagrams. These are shown in FIG. 35A and FIG. 35B. FIG. 35A shows the sensory fusion, and FIG. 35B shows the motor fusion. As it can be understood from FIG. 35A and FIG. 35B, for the motor fusion, the relative convergence and the relative accommodation are coordinated, and for the sensory fusion, the Panum's fusional area and the area of the focal depth are narrower in comparison with FIG. 35B.

Additionally, a measurement method and standard values for the motor fusion are described, for example, in non-patent document 9 (Written by Yukio Izumi, Toshinari Kazami, "Examination of Binocular Function," Revised Version, Waseda Optometry College (1985) p. 5).

A method of expressing the angle of convergence is explained. By setting a meter angle to MA, a minutes of arc to θ, a prism diopter to P, and a pupillary distance to PD (unit: mm), the equations shown in Expression 1-Expression 3 are satisfied for respective relationships. Here, a is a derived value of PD and MA.

$$a = \frac{PD \times MA}{2000}$$ [Expression 1]

$$\sin\left(\frac{\pi}{180} \times \frac{1}{60} \times \frac{\theta}{2}\right) = a$$ [Expression 2]

$$P = 100 \times \frac{2 \times a}{\sqrt{1 - a^2}}$$ [Expression 3]

Reference examples of numerical computations are shown in FIG. 36A and FIG. 36B. In FIG. 36A, a pupillary distance is PD=0.06 m, and, in FIG. 36B, PD=0.065 m. In each of the numerical examples FIG. 36A and FIG. 36B, as parameters, a distance (cm), a meter angle MA, a minutes of arc (arc min), Δ (diopter) are listed.

Next, explanations are added regarding the sensory fusion and the motive fusion. The sensory fusion is a fusion in which there is no eyeball movement, and the motive fusion is a fusion with eyeball movements. These are different with each other. The sensory fusion is explained in accordance with p. 131-132 of non-patent document 10 (Edited by Keiji Uchikawa, Satoshi Shioiri, "Vision II," Asakura Publishing Co., Ltd. (2007), p. 131-132). In non-patent document 10, the following are described: "In order that two retinal images having binocular disparities are perceived as one, it is necessary that sizes of the disparities are within a certain range. This area is called the Panum's fusional area (or image fusion area), since Panum, for the first time, measured this area through systematic experiments. The fusional area depends on a stimulation condition (such as a spatiotemporal frequency, a position of a retina, existence or non-existence of a peripheral stimulus, a measurement method, or a criterion of determination), and it varies greatly, from a few minutes to a few degrees. Therefore, it cannot be represented by a specific result of an experiment."

Figure 37:
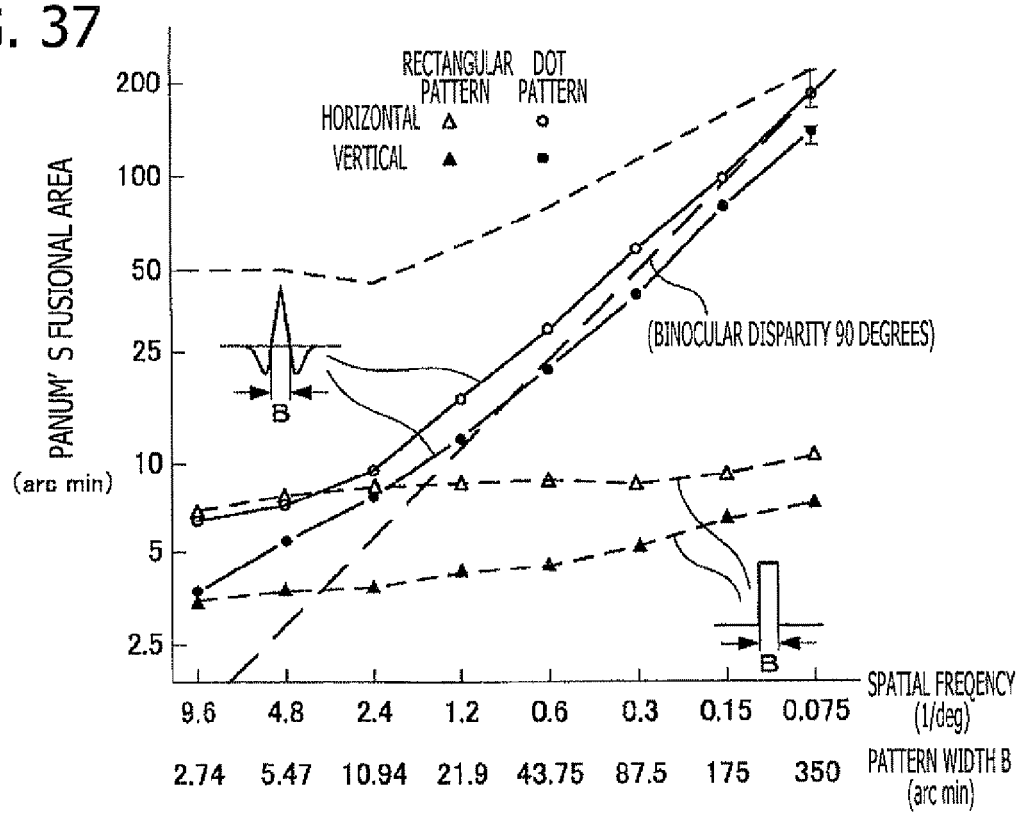
FIG. 37 is a diagram showing the Panum's fusional area with respect to a spatial frequency of an object.

Here, the binocular disparity is a difference between lines of sights pinching nodal points of left and right eyeballs and a fixation point. For a simplified case, a nodal point and a center of rotation may not be distinguished, since the difference between the nodal point and the center of rotation are very small in comparison with a distance in the external world. Though it is in a specific experiment, but with respect to the range of the sensory fusion, it has been measured that it depends on a spatial frequency, that is, it depends on a shape or size of a visual object. The way how it depends is described, for example, in non-patent document 11 (Schor, C. Wood, I. Ogawa J. "Binocular sensory fusion is limited by spatial resolution," Vision Research, 24(7), (1984), p. 661-665). FIG. 37 shows the figure on page 584 of non-patent document 11. This figure is widely used, and it is described on FIG. 8.2 on page 316 of non-patent document 4. In FIG. 37, the horizontal axis shows a special frequency (that is, an inverse of a width of a pattern), and the vertical axis shows the Panum's fusional area. FIG. 37 compares a result where an object is a rectangular pattern and a result where an object is a random-dot pattern.

As shown in FIG. 37, in a state in which an eyesight is strong and the special frequency is high, the fusional area is relatively narrow and almost constant. Further, the fusional area differs in the horizontal direction and in the vertical direction, and there exists a special anisotropy. Where the special frequency is high, namely, viewing at a central fovea, the fusional area in the vertical direction is less than or equal to a half of the fusional area in the horizontal direction. It is known that the Panum's fusional area differs depending on a presentation state of the object. It is widely known that, for example, the Panum's fusional area is wider for the rectangular pattern that appears in daily life than for the dotted pattern.

Figure 38:
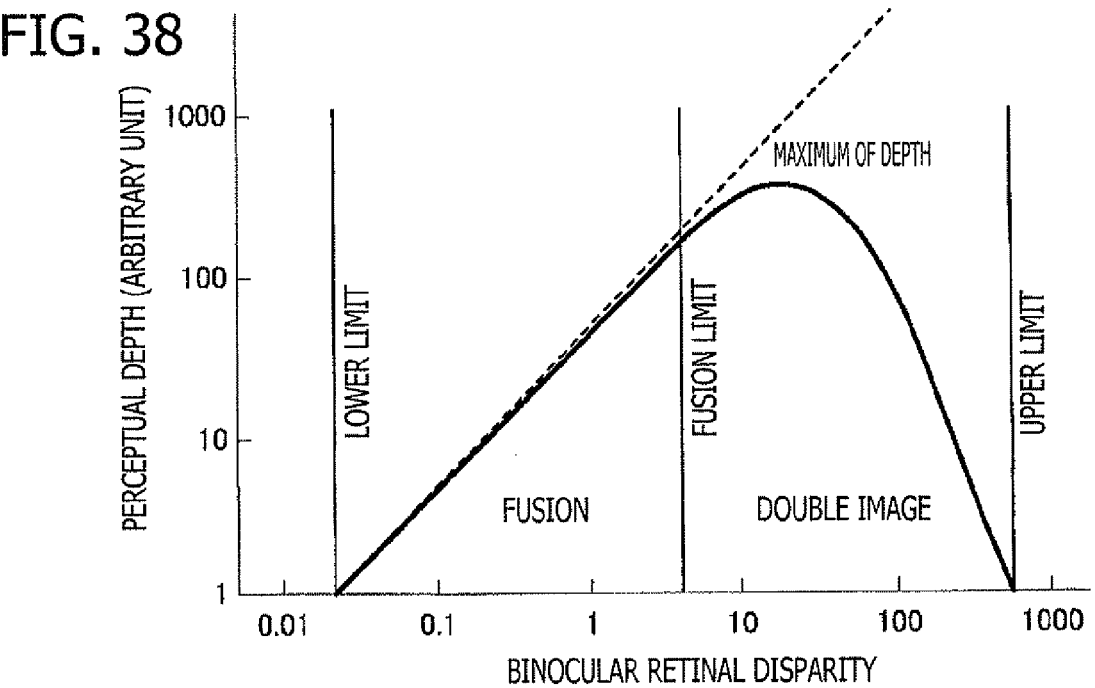
FIG. 38 is a diagram showing a relationship between a horizontal retinal disparity and a perceptual depth.

As for an explanation of a range of disparity in the horizontal direction, a relationship between a horizontal retinal disparity and a perceptual depth is shown in FIG. 38 (page 86 of non-patent document 10). In FIG. 38, the horizontal axis shows a binocular retinal disparity that is a difference between disparities of both eyes in the horizontal direction, and the vertical axis shows a perceptual depth with respect to the binocular retinal disparity. According to FIG. 38, it can be understood that an amount of the depth increases in proportion to an increase in the binocular retinal disparity, but after passing through a fusion limit, they are no longer proportional, and after the depth reaching to its maximum, the depth decreases. In this manner, since the maximum of the depth and the fusion limit are different values, it can be said that a fusion and a stereoscopic vision are different physiological phenomena. There are individual differences in values of the maximum of the depth and the fusion limit, and they vary depending on a condition, such as a spatial frequency or a presenting time. Therefore, a binocular retinal disparity corresponding to a range from the fusion limit to the maximum of the depth can be approximately treated as "the Panum's fusional area."

Next, an explanation regarding a measurement method of the individual relative measurement values is added. A measurement of the relative convergence is often performed at an eye clinic or an eyeglass shop. For example, on pages 49-51 of non-patent document 5, measured values and a measurement method of the relative convergence are described. In non-patent document 5, a Haploscope is used to measure the relative convergence. The unit is meter angle (it is shown with MA, and it may be denoted by MW). The measurement method of non-patent document 5 is as follows. First, in a state in which an object is gazed with both eyes, the state is changed to be a state in which the both eyes are looking outward, using reflective mirrors to the both eyes. Then, the extent of the outward is gradually increased and a meter angle at which the object becomes blurry is set as a positive relative convergence (blur), and a meter angle at which the object is separated into two pieces is set as a positive relative convergence (separation). The measured value of the positive relative convergence (separation) is a limit value of the relative convergence, and in this specification, hereafter, it is called merely as the positive relative convergence. Further, a time when the object is seen as one again, when the outward state is reduced from the state, is called as the positive relative convergence (return). Similarly, when an extent of inward is gradually increased using reflective mirrors to the both eyes, as a state in which the both eyes are looking inward, a meter angle at which the object becomes blurry is set as a negative relative convergence (blur), and a meter angle at which the object is separated into two pieces is set as a negative relative convergence (separation). In addition, a meter angle at which the object is seen as one again, when the extent of the inward is reduced, is called as a negative relative convergence (return). Here, the negative relative convergence (separation) is merely called as the negative relative convergence, in this specification. In an eye clinic, it is possible to measure using a major amblyoscope (synoptophore) which is a similar measurement device as the measurement device described in non-patent document 5, etc.

Further, in non-patent document 12 (written by Setsuya Tsuda, "Introduction to the American 21-item inspection— Examination and analysis of visual performance," Kindai Kougaku Publishing Co. (1983)), test items regarding the above described respective relative convergences are described. Namely, as an item #9, an item #10, and an item #11 of non-patent document 12, measurement methods using an ophthalmometer for measuring the positive relative convergence (blur), the positive relative convergence (separation), the positive relative convergence (return), the negative relative convergence (blur), and the negative relative convergence (return) at a time of distant vision are described. Similarly, as an item #16A, an item #16B, an item #17A, and an item #17B, measurement methods for measuring the positive relative convergence (blur), the positive relative convergence (separation), the positive relative convergence (return), the negative relative convergence (blur), and the negative relative convergence (return) at a time of near vision (40 cm) are described. In a specific measurement method, outward prisms for both eyes are wore, while in a state of gazing an object when the both eyes are under correction. Then, as with the above described method, an extent of outward is varied through gradually increasing the prism values, and the respective values of the positive relative convergences of the blur, the separation, and the return are measured. Additionally, prisms are wore for inward, and similarly, the prism values are gradually increased, and the respective values of the negative relative convergences of the blur, the separation, and the return are measured.

In non-patent document 13 (Masaki Emoto, Sumio Yana, Shojiro Nagata, "Thesis: Distributions of fusional convergence limits, when a stereoscopic image system is observed," Journal of the institute of image information and television engineers, Vol. 55, No. 5, (2001), p. 703-710), a simplified measurement device for the relative convergence of 60 cm in front of eyes is described. The positive relative convergence (separation) and the negative relative convergence (separation) are measured through determining whether a stereoscopic vision is possible, when an image, which includes disparities for the left and right eyes, is shown with a display device. It is a useful method for measuring many people.

Figure 3:
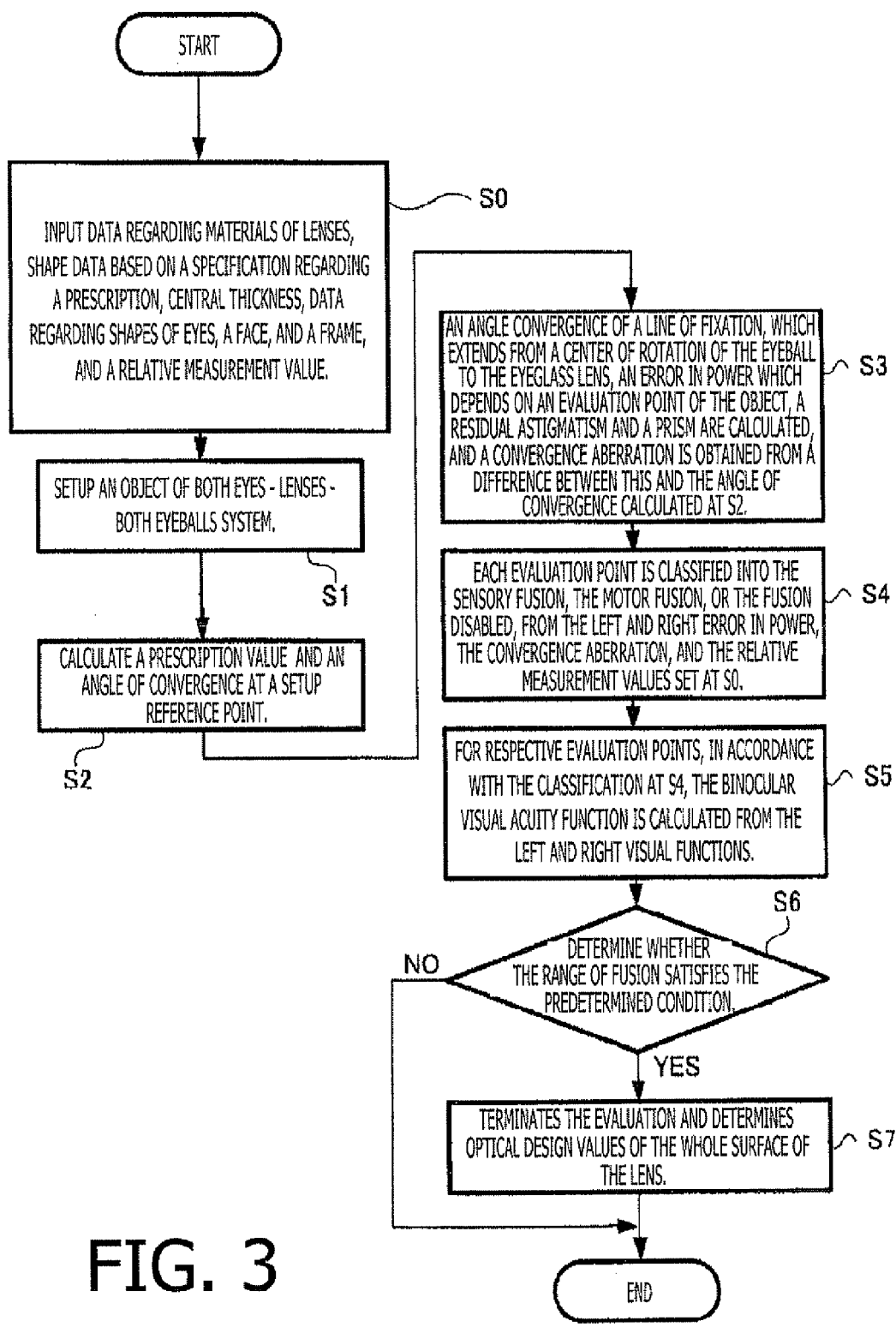
FIG. 3 is a diagram showing a flowchart according to the embodiment of the eyeglass lens manufacturing method.

Further, the measurement device shown in FIG. 3 of non-patent document 8 measures the relative measurement values at three points in front (distances of 31.9 cm, 39.4 cm, and 56.3 cm). Further, in non-patent document 6, the positive relative convergence and the negative relative convergence are measured with an experimental device, which is converted from a stereoscopic scope described in FIG. 1 on page 12 of the document. The actual measured data is FIG. 34 of the present invention. On the other hand, for the relative accommodation, as described below, the measurement accuracy is bad, and there are few examples for which it is directly measured. As one example, a measurement method and standard values are disclosed on page 41 of non-patent document 5. The accommodation has a close relationship with the convergence, and the relative accommodation can be calculated from the relative convergence.

Further, there are very few measurement examples of a vertical fusional vergence, and a measurement method and standard values are only disclosed on page 5 of non-patent document 9. What should be confirmed here is that the relative measurement values should be measured when a corrected pair of eyeglasses is wore. The relative measurement values measured at a time when a pair of eyeglasses is wore are different from the relative measurement values measured at a time of naked eyes. Besides the above, there are some documents describing measurement values of the motor fusion and the sensory fusion. The data is summarized and shown in the table 1 and table 2 described below. Comparing the values of the motor fusion and the values of the sensory fusion, the sensory fusion is about a fraction of the motor fusion. Here, these results are obtained mainly through psychological measurements.

TABLE 1

Standard values of the motor fusion

| Inspection | Distance | Fusional Convergence | | Fusion Dissolution | | Vertical Fusionel | Remarks |
|---|---|---|---|---|---|---|---|
| | | Separation | Recover | Separation | Recover | Vergence | |
| Parks | 6 m | $15\Delta$ | $12\Delta$ | $8\Delta$ | $6\Delta$ | $3\text{-}6\Delta$ | Relative vertical fusional vergence |
| | ⅓ m | $20\text{-}25\Delta$ | $18\text{-}22\Delta$ | $12\Delta$ | $9\Delta$ | | |
| Costenbarder | 6 m | $15\Delta$ | $12\Delta$ | $12\Delta\text{-}14\Delta$ | $8\text{-}10\Delta$ | — | Relative vertical fusional vergence for a child |
| | ⅓ m | $28\Delta$ | $22\text{-}25\Delta$ | $12\Delta$ | $9\Delta$ | — | |
| Duke-Elder | — | $25\text{-}30\Delta$ | — | — | — | — | Absolute vertical fusional vergence |
| Lancaster | — | $25\text{-}50\Delta$ | $2\text{-}4\Delta$ | — | — | — | |

TABLE 1-continued

Standard values of the motor fusion

| Inspection | | Fusional Convergence | | Fusion Dissolution | | Vertical Fusionel | Remarks |
|---|---|---|---|---|---|---|---|
| | Distance | Separation | Recover | Separation | Recover | Vergence | |
| Shirai | | 12.38° | from separation — | 2.93° | — | — | Normal Adult (synoptophore) |
| Inone | 5 m | 20-30△ | | 5-8△ | — | 3-4△ | Relative vertical fusional vergence |
| | ⅓ m | Greater than or equal to 30△ | | 15-20△ | | — | |
| US-style examination of items Standard values of Morgan | Far vision Near vision 40 cm | 19△ 21△ | 10△ 11△ | 7△ 21△ | 4△ 13△ | — — | Horopter |
| Nagata | 60 cm | 4.72° | — | 3.34° | — | — | Stereographic image display device of NHK 392 people |
| Hatada | OD | 2.6 MA | — | — | — | — | Doders Diagram |

TABLE 2

Measured values of the sensory fusion

| | | Horizontal Direction | Vertical Direction | |
|---|---|---|---|---|
| Yasuda | 200 cm | 40' 80' | 5' 10' | Random dots Rectangular pattern |
| Hasse | — | 60' | 30' | |
| Yano | 100 cm | 100"-960" | 120" | Random dots |
| Ogel | — | 15'-30' | — | |
| Schor, Wood, Ogawa | | | | |
| Hadada | — | 15-20' | | |
| Tsou | — | 10' | 4' | Rotational direction 6' |

The above described are the explanations related to the binocular vision and the related techniques. Hereinafter, further explanations are added to the embodiment based on the technological matters explained so far. Here, it is added that none of the non-patent documents 1-15, which have been cited as the references in the specification, consider the binocular visual performance at a time when a pair of eyeglasses are wore.

FIG. 2 is a functional block diagram for explaining the outline of the function of the manufacturing side computer 201, which is the core of the eyeglass lens manufacturing system, according to the embodiment. As shown in FIG. 2, the manufacturing side computer 201 includes a data input unit 203 for inputting various types of data transmitted from the ordering side computer 102, a binocular visual acuity function calculating unit 204 for calculating a binocular visual acuity function, which includes the relative measurement values as factors, based on the input data, an evaluation function optimizing unit 205 for calculating optimization of a function, for which the binocular visual acuity function are added at respective evaluation points, as an evaluation function, and an evaluation function evaluating unit 206 for evaluation whether a convergence condition by the evaluation function holds or not. The manufacturing side computer 201 further includes a design data correcting unit 207 for correcting the design data, for example, the lens shape data, when it is necessary to correct the optical performance as a result of the evaluation at the evaluation function evaluating unit 206, an optical design value determining unit 208 for determining optical design values, when the evaluation at each of the evaluation points are terminated, and a design data output unit 209 for outputting the design data based on the optical design values to the lens processing device 202.

The measurement device 101 at the eyeglass shop 100 shown in FIG. 1 measures eyesight and relative measurement values of a customer who has ordered the eyeglass lenses, or adds a predetermined process to information on the customer, from which the relative measurement values can be calculated, at the ordering side computer 102, and transmits to the lens manufacturer 200 through a communication line 300. The computer 201 (the manufacturing side computer) at the lens manufacturer 200 inputs shape data based on data regarding materials of the lens or a specification, and data regarding shapes of eyes or a face, received at the data input unit 203, and at the same time input the relative measurement values, etc.

Then, the binocular visual acuity function calculating unit 204 calculates each of the visual functions for left and right single eyes at respective evaluation points of an object. The binocular visual acuity function calculating unit 204 calculates optical performance values such as an error in power or a residual astigmatism, and convergence aberrations, which are described later, at the respective evaluation points. The binocular visual acuity function calculating unit 204 calculates the binocular visual acuity function by substituting the respective calculated values and the input data received at the data input unit 203 into an equation of the binocular visual acuity function, which is described later. The evaluation function optimizing unit 205 adds the calculated binocular visual acuity function and set it as an evaluation function, and obtains the optimum optical performance values at the respective evaluation points from the evaluation function.

Figure 39:
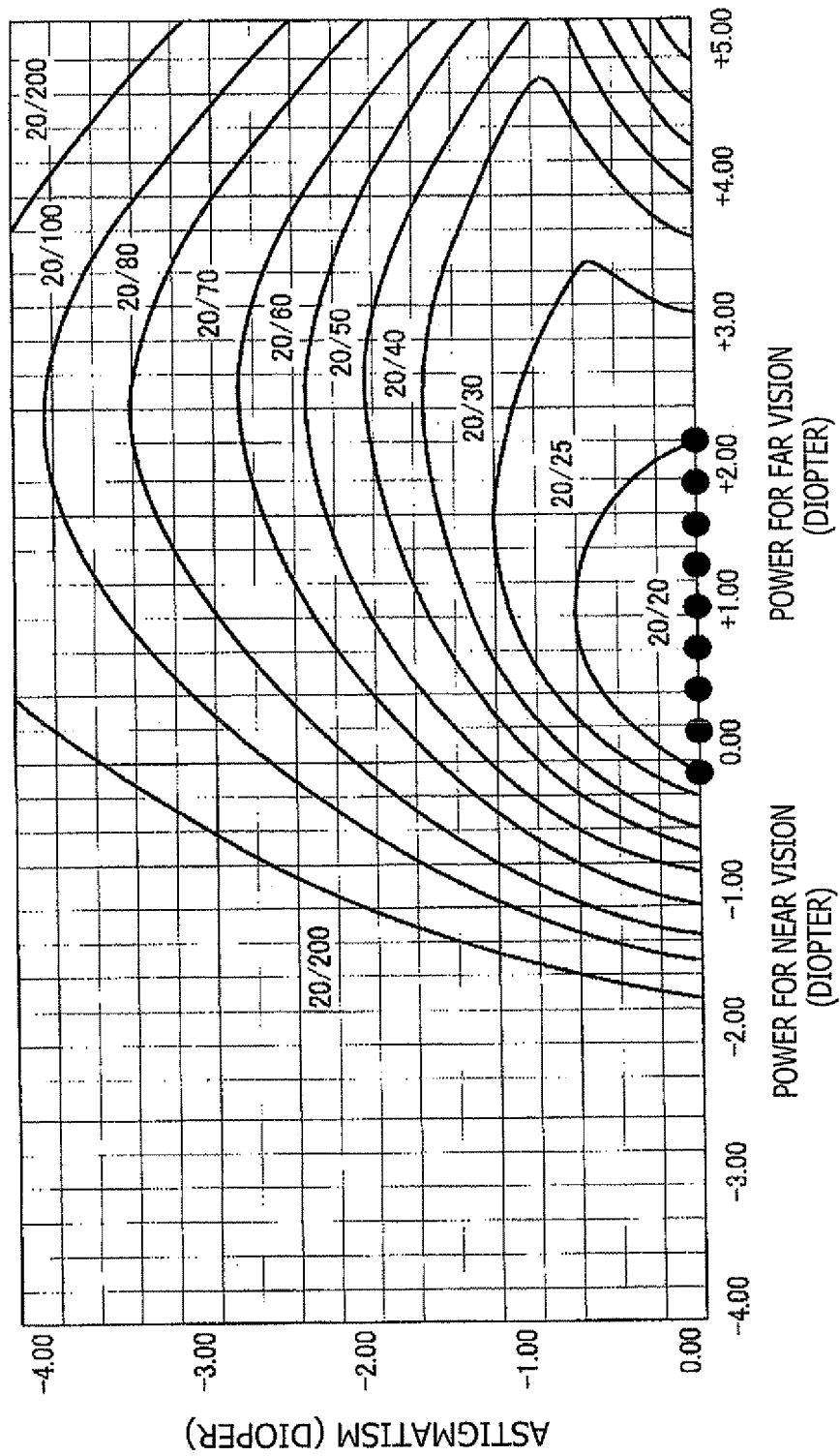
FIG. 39 is a diagram (Peters diagram) showing a relationship between errors in a refractive power of eyeballs and eyesight for examinees of 5-15 year-old.
Figure 40:
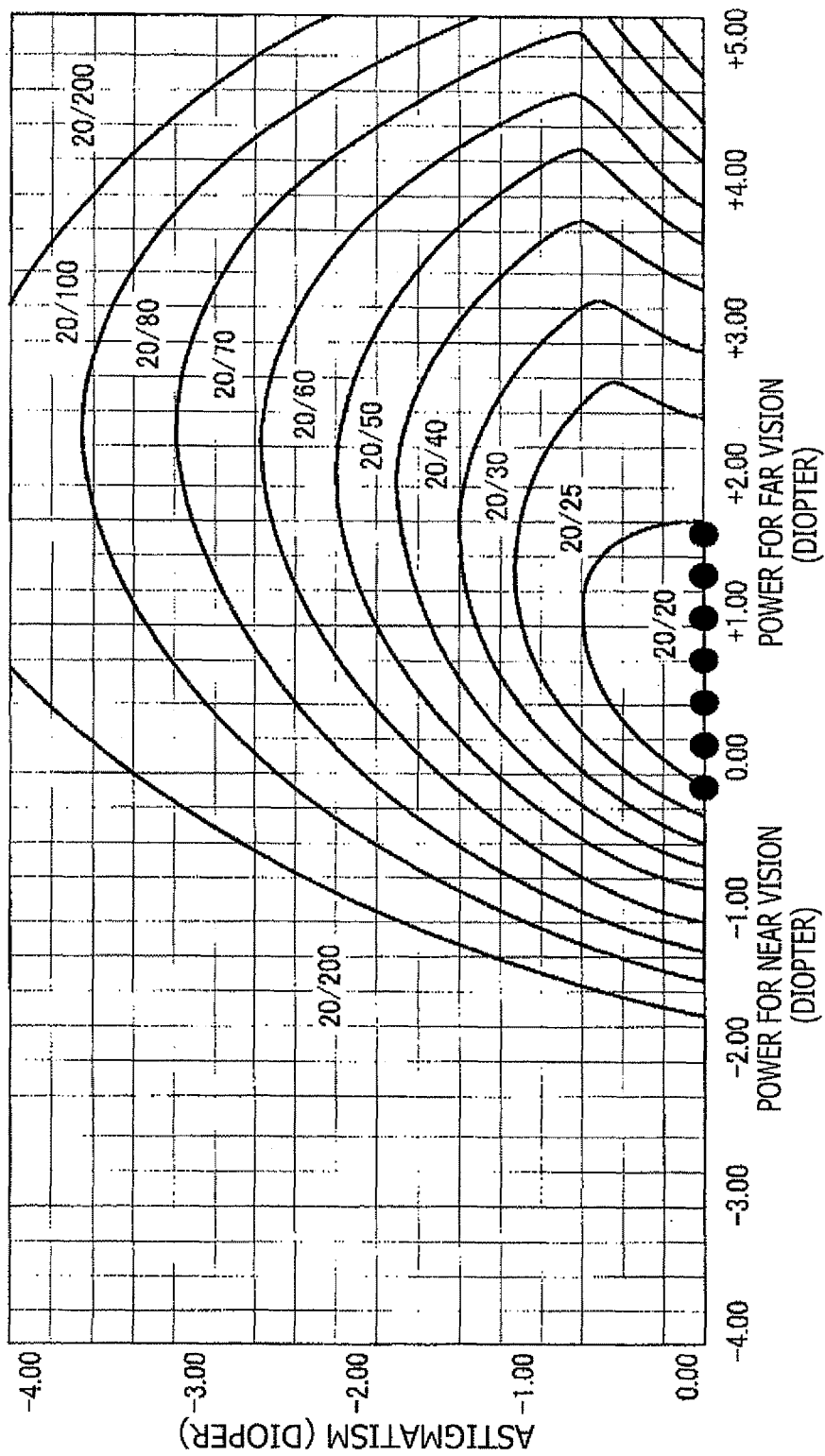
FIG. 40 is a diagram (Peters diagram) showing a relationship between the errors in the refractive power of eyeballs and eyesight for examinees of 25-35 year-old.
Figure 41:
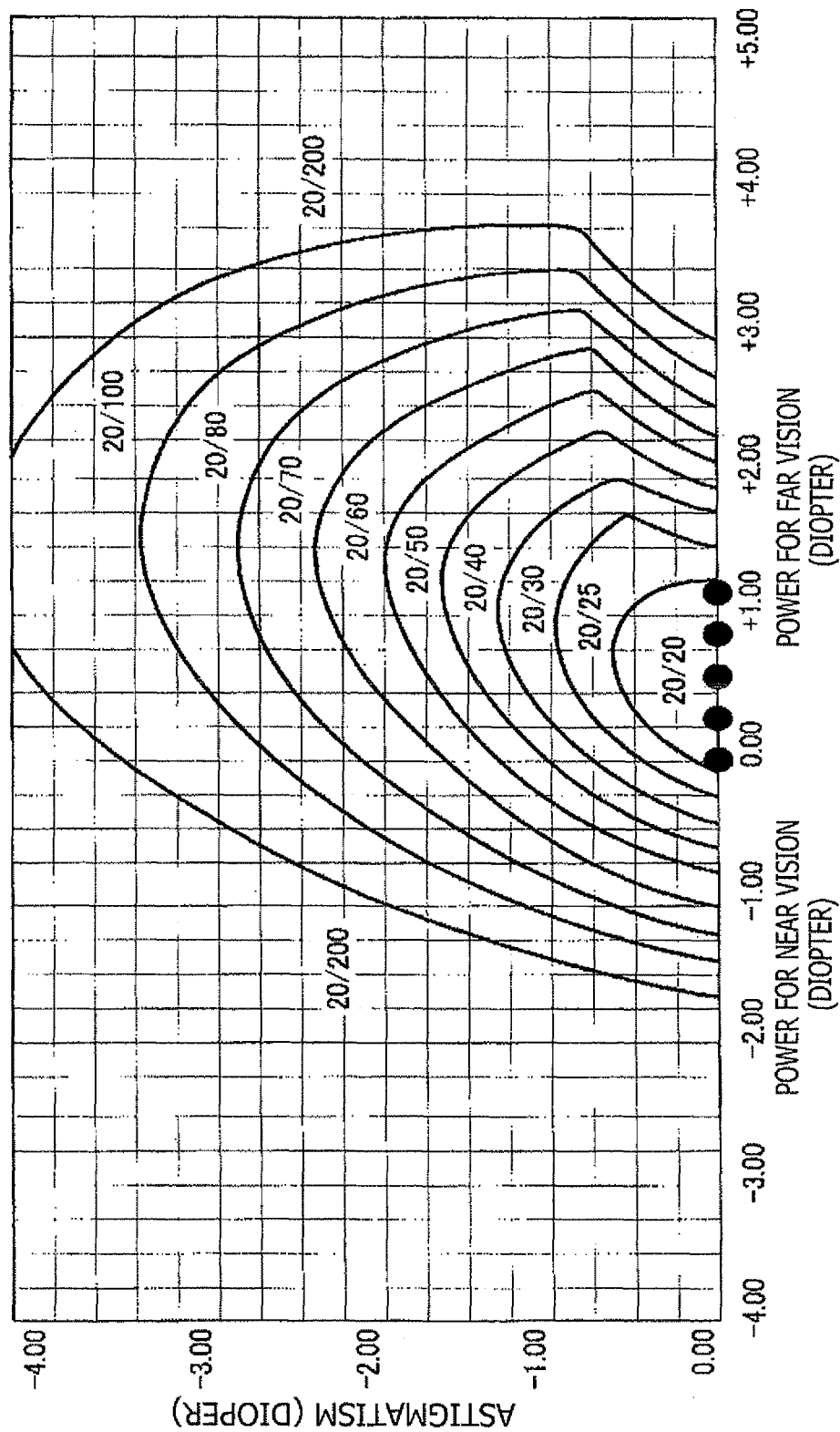
FIG. 41 is a diagram (Peters diagram) showing a relationship between the errors in the refractive power of eyeballs and eyesight for examinees of 45-55 year-old.

Here, a method of producing the visual functions, which are calculated by the binocular visual acuity function calculating unit 204, is outlined. The visual functions are produced through deriving from the graphs in non-patent document 14 (H. B. Peters "THE RELATIONSHIP BETWEEN REFRACTIVE ERROR AND VISUAL ACUITY AT THREE AGE LEVELS," Am. J. Optom. Physiol. Opt., 38(4), (1961), p. 194.498). Figures described in non-patent document 14 are shown in FIG. 39-FIG. 41. These figures are statistical charts for which visual acuities are measured for examinees of 5-15 year-old, 25-35 year-old, and 45-55 year-old, respectively, and, hereafter, these figures are called Peters diagrams. Specifically, these charts are graphs of the measurement values of a spherical diopter power and an astigmatism degree, which are prescribed powers, when they are measured for examinees who are wearers of pairs of eyeglasses, the pairs of eyeglasses completely correcting the spherical diopter power and the astigmatism degree, at a time when the pair of eyeglasses are removed from the examinees. Here, the measured values of visual acuities in FIG. 39-FIG. 41 are represented in a fractional representation of visual acuity. The measured values of the 5-15 year-old shown in FIG. 39 are measured values of 2452 eyes, the measured values of the 25-35 year-old shown in FIG. 40 are measured values of 2616 eyes, and the measured values of 45-55 year-old shown in FIG. 41 are measured values of 2183 eyes, thus, these are an enough amount as an amount of statistics.

The relationship between the Peters diagram and the visual function can be interpreted as follows. First, as shown in FIG. 42A, an eyeglass lens 11 with the prescribed spherical diopter power and astigmatism degree is worn by, for example, an examinee having a near sighted eye 10, then, a state is changed to a state, in which the eyeglass lens is removed, as shown in FIG. 42B. The measurement of a visual acuity at that time is equivalent to a state in which an eyeglass lens such that its spherical diopter power and astigmatism degree are 0 degrees, respectively, is worn. Namely, the state is equivalent to a state in which the eyeglass lens 11 is covered with an eyeglass lens 12 with "—(spherical diopter power), —(astigmatism degree)," which cancels out the spherical diopter power and the astigmatism degree, and the visual acuity is measured, as shown in FIG. 42C. Further, the state of FIG. 42C is equivalent to a state in which a visual acuity is measured for an examinee having a normal vision eye 20 at a time when the eyeglass lens 11 is removed from the eyeglass lens 12, as shown in FIG. 42D. Or, the state of FIG. 42C is equivalent to a state in which the visual acuity is measured for the examinee having the normal vision eye 20 with an object having aberrations of "—(spherical diopter power), —(astigmatism degree)" as an index, as shown in FIG. 42E. Namely, the eyeglass lens 11 with the prescribed spherical diopter power and astigmatism degree cancels out a state of the eyeball of the eye 10 whose visual acuity is degraded and which requires the spherical diopter power and the astigmatism degree, and the eyeglass lens 11 causes the state to be a normal state.

Figure 43:
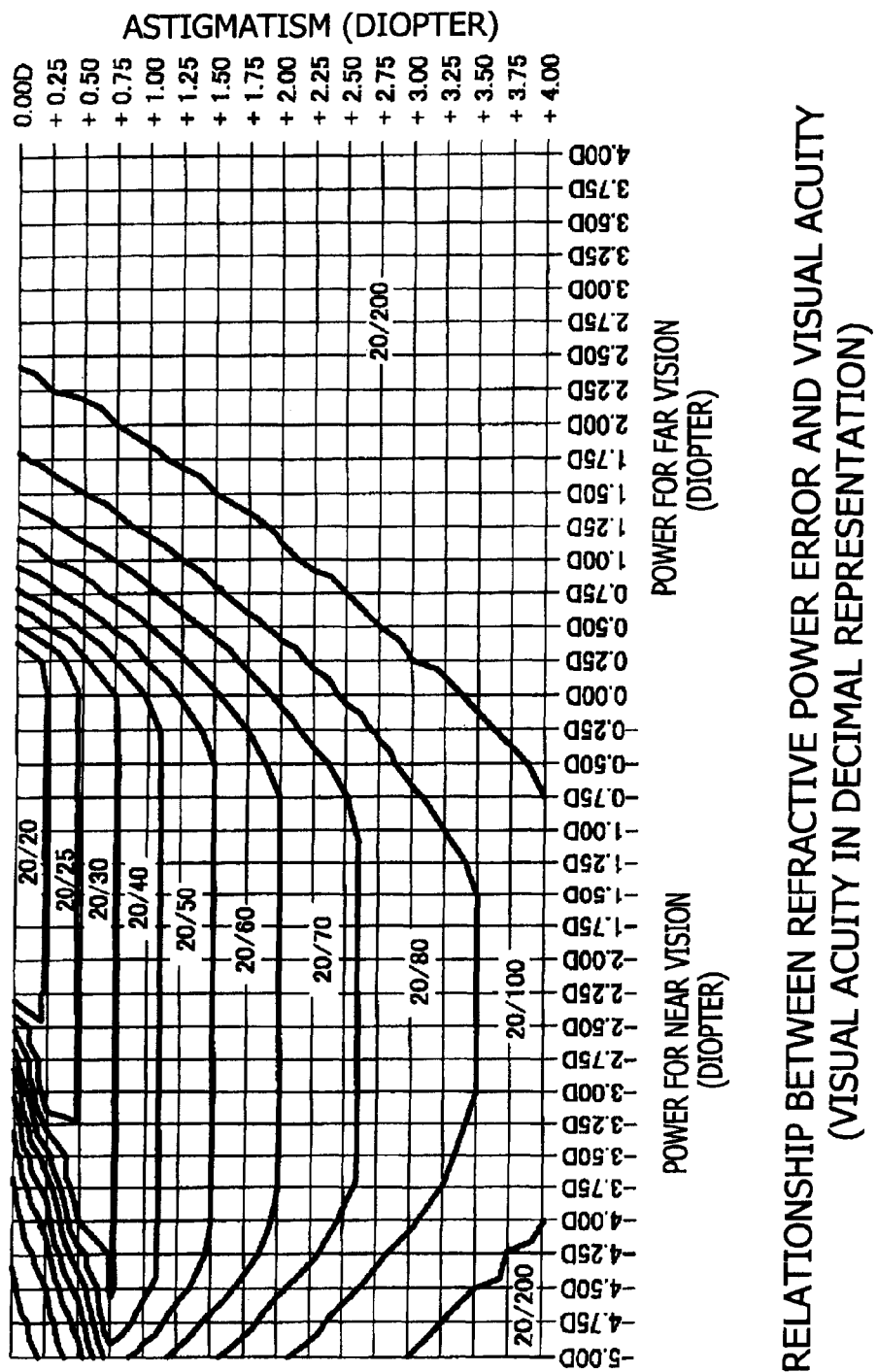
FIG. 43 is a diagram showing a visual function for a single eye which is derived from the Peters diagram for 5-15 year-old.

Therefore, a function for which the values of the Peters diagrams are made to be symmetrical with respect to an origin is called the visual function. FIG. 43 shows the visual functions produced from the Peters diagram for 5-15 year-old, which is shown in FIG. 39. The visual functions show values of degradation of the visual acuity, when an examinee having a normal vision wears the lens 12 with—spherical diopter power and—astigmatism degree. It is added that the visual functions are results of measuring many examinees, whose directions of astigmatic axes vary, as such, the functions have no relationship with an astigmatic axis.

Here, the above described aberration A and aberration B are deemed to be degrees of an eyeglass which has a refraction aberration A and an aberration B along each principal meridian, and a relationship between the aberration and the visual function is explained. At that time, an astigmatism degree of the eyeglass lens is a difference between the aberration A and the aberration B, and the spherical diopter power is a refractive power of one of the refractive powers, which is to be a reference. These are physically the same, but the sign of the astigmatism is different depending on which one is set as a reference axis. Since both can be expressed unambiguously, the selection is arbitrary.

In the Peters diagram, negative values are adopted for all the astigmatisms. For the sake of simplicity of the explanation, a reference axis is taken so that the difference between the aberration A and the aberration B becomes a positive value. For example, when the aberration B—the aberration A is a positive value, then the astigmatism degree becomes the aberration B—the aberration A, and the spherical diopter power becomes the aberration A. Conversely, when the aberration B—the aberration A is a negative value, then the astigmatism degree becomes the aberration A—the aberration B, and the spherical diopter power becomes the aberration B. Specifically, calculating the value of degradation of the visual acuity using the Peters diagram, for example, when it is 10 years old and both of the aberrations A, B at the lens reference point are 0, both the astigmatism degree and the spherical diopter power are 0. Referring to FIG. 39, which shows the measured values for 5-15 year-old, the normalized visual acuity of 20/20 is obtained. When the aberration A is 1.00 and the aberration B is 2.00 at a periphery of the lens, the astigmatism degree is 2.00-1.00, so it is 1.00, and the spherical diopter power is 1.00. Referring to FIG. 43, for which the Peters diagram is converted to be symmetrical with respect to the origin, the degradation of the visual acuity of 20/80 can be read.

In the explanation so far, the visual function is a function of the spherical diopter power and the astigmatism degree, or, the aberration A and the aberration B. On the other hand, when expressing in terms of an average refractive power and a residual astigmatism, which are normally used aberrations of an eyeglass lens, the average refractive power is an average of the aberration A and the aberration B, and as a positive value, the residual astigmatism is the absolute value of the difference between the aberration A and the aberration B. Therefore, the visual function can be expressed in terms of the average refractive power and the residual astigmatism, with simple transformations.

On page 39 of non-patent document 5, there is a description regarding quantitative data of a visual acuity with both eyes (binocular visual acuity), which is one of the binocular visual performances. Here, it is described as follows: "The visual acuity with both eyes is often equal to a visual acuity of one of the eyes, which is better than the other one, or it is slightly better than the visual acuity of the one of the eyes. When the visual acuities of the both eyes are equal, then the binocular visual acuity increases by about 10% with respect to the single eye visual acuity." This 10% is a numerical value for a visual acuity expressed in the decimal point representation, which has been used from that time (1925, Japan). It is an approximate value, but, after that, this 10% is followed in Japanese ophthalmic books as a value of a ratio of increase of a binocular visual acuity with respect to a single eye visual acuity. Therefore, it is valid even at the time of this application. Further, in an objective type, there are many documents in which the visual acuity is derived from a contrast sensitivity, an RMS of an wavefront aberration, etc., but still it is difficult to adopt. Namely, the logic is that if it is possible to measure in the object type, then a measurement of the visual acuity with a subject type is not necessary. At any rate, the visual acuity is an individual element which is difficult to determine acculately, since various kinds of factors, such as a pupil diameter or an opacity of an eyeball system, are connected with each other.

Here, the explanation is returned to the explanation of the block diagram of FIG. 2. When the calculation of the optimum optical performance value is performed by the evaluation function optimizing unit 205, the evaluation function evaluating unit 206 evaluates whether a convergence condition by the optimized evaluation function holds or not. Based on the evaluation result of the evaluation function evaluating unit 206, shape data is corrected or determined. Specifically, when the convergence condition does not hold, the design data correcting unit 207 corrects the shape data of the eyeglass lens, so that desired values of the evaluation function are obtained. When the convergence condition holds, the optical design value determining unit 208 determines the design value at the evaluation point. When the convergence condition holds at all the evaluation points, the determined optical design values for all the lens surface are transmitted from the design data output unit 209 to the lens processing device 202, which is shown in FIG. 1.

As the lens processing device 202, a normal eyeglass lens manufacturing device, which, for example, automatically applies a cutting process and a polishing process to a lens, shapes of a front surface or a rear surface of a lens, or the shapes of both of the surfaces of the lens, based on input data, is used. Since the lens processing device 202 is a known device as an eyeglass lens manufacturing device, a concrete explanation of the device is omitted.

[2] Embodiment of Design Method of Eyeglass Lenses

Next, the data input unit, the binocular visual acuity function calculating unit, and the evaluation function optimizing unit in the manufacturing side computer 201 are explained in detail. Among the above functions, since the optimization, such as the ray tracing in communication, or in calculation, has been described. Thus a new explanation is omitted.

(1) Outline of Each Step of the Design Method

One example of a flowchart for implementing the eyeglass lens design method according to the embodiment is shown in FIG. 3. First, at 0th step S0, inputting of various types of data is performed with the data input unit 203. Namely, data regarding materials of a lens, shape data based on a specification regarding a prescription, a central thickness, data regarding shapes of eyes, a face, and a flame, and relative measurement values are input.

Speaking in the broad sense, all the measurement values for designing an eyeglass for a person who has ordered the eyeglass can be said to be individual elements. For example, conventional individual elements includes, spherical diopter powers of left and right eyes, the astigmatism degree, the astigmatic axis, the prism, the prism axis, the progressive lens, individual elements specific to a multifocal lens (for example, an added power), the pupillary distance, a distance from an apex on rear of an eyeglass to an apex of a cornea (usually about 14 mm, it is also called a coroneal vertex distance), a distance from an apex of a cornea to a center of rotation of an eyeball (usually about 13.5 mm), a lens front tilt angle (usually approximated with a frame front tilt angle), and a lens elevation angle (usually approximated with a frame elevation angle). Here, in the present invention, the above described "relative measurement values" are newly added to the individual elements. The relative measurement values are obtained from a person who has ordered, in accordance with a lens to be designed. If the relative measurement values are a part of the relative measurement values, then the remaining relative measurement values are calculated from a method described below. Even when the relative measurement values cannot be measured at all, the relative measurement values are calculated from an age, etc.

Next, as a first step S1, the binocular visual acuity function calculating unit 204 setups an Object of both eyes—Lenses—Both Eyeballs System. This system includes an object to be seen, eyeglass lenses, and left and right eyeballs, for optical calculations. In this system, it is not necessary that the centers of rotations of the eyeballs are fixed points in movements of the eyeballs in the system.

As a second step S2, the binocular visual acuity function calculating unit 204 setups a lens shape so that predetermined prescription values can be obtained at design reference points, in order to set the design reference points (usually, positions at which lens powers are obtained) of the eyeglass of the Object of the both eyes—Lenses—Both Eyeballs System to be references, which are described below. At the design reference points, the prescription values and the angles of convergence from the centers of rotations of the eyeballs to the eyeglass lenses are calculated. These values are reference values of the angles of convergence.

Further, as a third step S3, the binocular visual acuity function calculating unit 204 calculates the average refractive powers, the residual astigmatisms, the prisms, the angles of convergence from the centers of rotations of the eyeballs to the eyeglass lenses, which depend on the evaluation points of the object in the Object—Lens—Both Eyeballs System. Next, the binocular visual acuity function calculating unit 204 obtains differences between the reference values of the angles of convergence and the angles of convergence at the evaluation points, as convergence aberrations.

Next, as a fourth step S4, the binocular visual acuity function calculating unit 204 classifies the respective evaluation points into the sensory fusion, the motor fusion, and out of the fusion, from left and right errors in power, the above described convergence aberrations, and the relative measurement values which have been set at the 0th step S0.

Further, at the fifth step S5, the binocular visual acuity function calculating unit 204 calculates the visual functions for the left and right single eyes at the respective evaluation points through a calculating process including the relative measurement values for the left and right eyes. The binocular visual acuity function calculating unit 204 further calculates the binocular visual acuity function from the visual functions for the left and right single eyes, in accordance with the branches of the fourth step S4. The binocular visual acuity function calculating unit 204 further modifies the binocular visual acuity function by subtracting the minimum value of the binocular visual acuity function from the binocular visual acuity function, which includes the relative measurement values as the factors on all the lens surface, so that the binocular visual acuity function becomes positive values. And the binocular visual acuity function calculating unit squares the binocular visual acuity function and adds it to the binocular visual acuity function at the respective evaluation points. If necessary, the binocular visual acuity function is multiplied by a weighting factor and added over all the lens surface. The result of the addition is the evaluation function of the present invention.

At the fifth step S5, the evaluation function optimizing unit 206 evaluates whether a convergence condition for the evaluation function, the evaluation function at the time of the optimization calculation being the optimization function of the present invention, holds or not. When the convergence condition does not holds at the evaluation point, for which the calculation is being performed, the design data correcting unit 207 slightly corrects shapes of the left and right lenses so as to compensate optical aberrations including the above described convergence aberrations and values of the binocular visual acuity function, and repeats the second step S2—the fifth step S5. On the other hand, when the convergence condition holds, the optical design value determining unit 208 determined the design values at the evaluation point. Then, the calculation is performed for the next evaluation point. When the calculation has been performed for all the evaluation points, the process proceeds to a sixth step S6.

At the sixth step S6, the optical design value determining unit 208 determines whether a range of the sensory fusion in a neighborhood of the lens design reference point satisfies a predetermined condition or not, based on the determined optical design values for all the lens surface. When the predetermined condition is not satisfied (when the determination at the sixth step S6 is "NO"), it is not suitable for the eyeglass lenses and the design is impossible. Thus, the flowchart is terminated after executing a predetermined error process. When the predetermined condition is satisfied (when the determination at the sixth step S6 is "YES"), the process proceeds to a seventh step S7.

Figure 4:
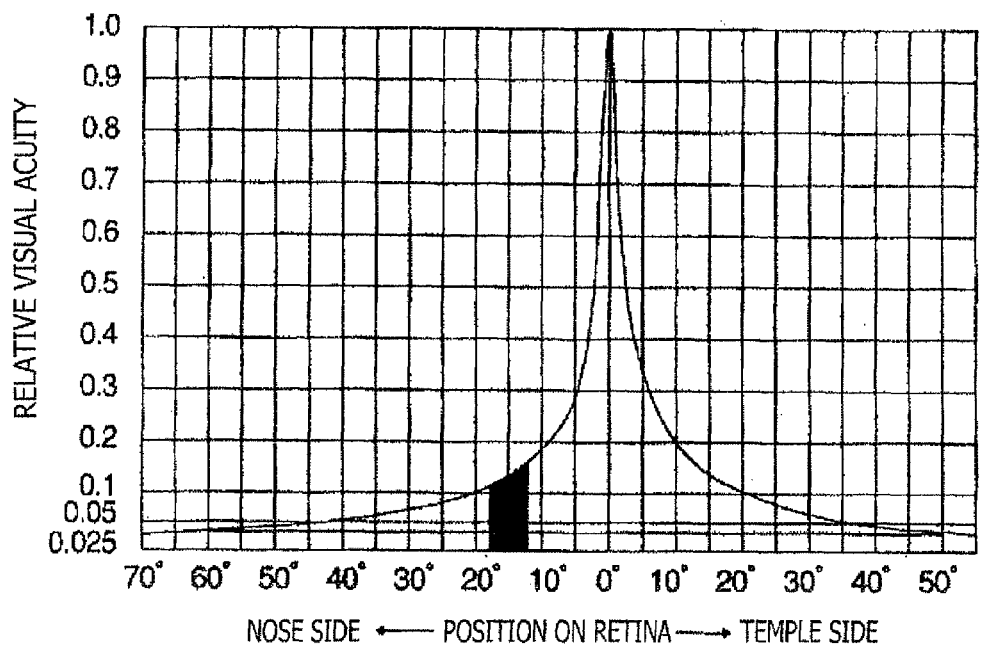
FIG. 4 is a diagram showing a relative eyesight with respect to a position on a retina.

At the seventh step S7, the optical design value determining unit 208 determines the evaluation of the eyeglass lenses with the binocular visual acuity function and shapes of the eyeglass lenses. It is explained that, through the above steps, it becomes possible to improve the binocular visual acuity. The simultaneous viewing, the fusion, and the stereoscopic vision in the binocular visual performance and the binocular visual acuity have a configuration such that the fusion becomes possible when the simultaneous viewing becomes possible, and the stereoscopic vision becomes possible when the fusion becomes possible. Further, the fusion has a configuration such that the sensory fusion becomes possible when the motor fusion is possible. Here, it is not necessarily clear how the binocular visual acuity and the simultaneous viewing, the fusion, and the stereoscopic vision are related. This relationship is explained with FIG. 4 which shows a relationship between an eccentricity and a relative visual acuity, the relationship being known to the eyeglass industry with respect to the property of the normal visual acuity. In FIG. 4, the horizontal axis is the eccentricity, that is, a position on the retina, and the vertical axis is the relative visual acuity. The eccentricity is said to be an angle spanned by an object other than a fixation point from nodal points of the eyeballs, when the fixation images are placed at central foveae of the eyeballs at a time when the eyeballs are not rotated, namely when fixating somewhere. Further, the relative visual acuity is said to be a normalized visual acuity, since visual acuities differ from person to person. In FIG. 4, the visual acuity expressed in the decimal point representation is used, and the visual acuity at the fixation point is set to 1.0. Further, the blackened portion in the figure is a blind spot. As it is clear from FIG. 4, the relative acuity with respect to the eccentricity forms a very sharp curve. From FIG. 4, a range where the visual acuity expressed in the decimal point representation is 0.7, which is a boundary of an area of clear vision, is about P. According to another expression, the visual acuity expressed in the decimal point representation becomes 0.7, when it is separated from the fixation point by 1°. To supplement the explanation, the relative visual acuity becomes 1.0, when the eyeball is rotated by 1° toward an object, the object separating from the nodal point of the eyeball by 1°.

Here, it can be understood that threshold values of a state in which the both eyes are simultaneously gazing at a fixation point resemble the threshold values of the sensory fusion, namely, the Panum's fusional area (about 0.15°–1°). Further, when an eyeball of a single eye is rotated only by 1° from that state, the visual acuity expressed in the decimal point representation of the single eye is significantly degraded to 0.7. In this case, the visual acuities of the left and right eyes differ, and it follows that the increase by about 10% of the binocular visual acuity does not occur. Further, when the sensory fusion is established and a condition for enabling the binocular visual acuity of the binocular visual performance is satisfied, a condition for enabling the stereoscopic vision is satisfied, at the same time. Namely, the binocular visual acuity is a function in a category of the stereoscopic view, which is the highest function of the binocular view functions. Here, the optimization steps for improving the evaluation function with the binocular visual acuity function have effects such that it expands areas of the motor fusion and the sensory fusion, it improves the binocular visual acuity which is the highest function of the binocular view functions, and at the same time, it improves the stereoscopic view, according to the reason described above. Namely, through the above steps, the relative measurement values, which have been adopted while focusing on the above described binocular view functions, can be reflected in the binocular visual acuity. With this, it becomes possible to obtain the superior optical design values for the eyeglass lenses, which quantitatively evaluates and improves ease of the fusion with the both eyes, and which improves the binocular visual acuity, which is the highest function of the binocular view functions, and at the same time, improves the stereoscopic view, and which helps reducing the visual fatigue described above.

Next, more detailed design contents of the above described 0th—sixth steps are described in detail.

(2) Detailed Explanation of the 0th Step S0 (Calculation Process of the Relative Measurement Values)

The relative measurement values obtained from the person who has ordered are further explained. Now, when a pair of eyeglasses is wore, a space between the pair of eyeglasses and the centers of rotations of the eyeballs is called an image side, and a space between the pair of eyeglasses and the object is called an object side. Regarding the relative measurement values at the image side and at the object side, since the relative measurement values are having proportional relationships such that their respective proportionality coefficients are approximately proportional to a lens power, the values at the object side vary depending on the shapes of the lenses. Therefore, for the present invention, the relative measurement values by lines of fixations at the image side are more preferable.

Further, it is the same for the sensory fusion. The method of compensating the differences between the relative measurement values at the position of the pair of eyeglasses and the relative measurement values at the centers of rotations of the eyeballs is described in the above described specification of PCT/JP2008/069791 by the present applicant. Namely, for the purpose of comparing the values of the Peters diagram, which are originally values at the positions of the pair of eyeglasses, it discloses a method of compensating the values of the Donders diagram obtained at the centers of rotations of the eyeballs to obtain the values at the positions of the pair of eyeglasses. In the present invention, both of the relative measurement values can be used, but in the embodiment, it is explained mainly with the lines of fixations on the image side. Further, it is not mentioned that, even if the values are values at the centers of rotations of the eyeballs, the values are compensated to be values at the positions of the pair of eyeglasses, and the explanations are omitted.

When the relative measurement values are measured on almost entire area, as with non-patent document 5 and non-patent document 6, since the relative measurement values have been directly obtained, the process proceeds to the second step S2. As with non-patent document 13 and non-patent document 8, when only one of or both of the positive relative convergence or the negative relative convergence are measured at an arbitrary distance, if it is measured at one point at the arbitrary distance, then, in general terms, a curve is estimated under a certain assumption, such that another curved portion is a line. In the present invention, accurate measurement values are obtained with one prescribed angle of convergence, if it is a single focus lens, and accurate measurement values are obtained with, preferably, at two distances (for example, when the angles of convergence are 0, 40 cm, then the angle of convergence is 1/0.4), if it is a progressive lens, etc. Here, the reason for the "preferably" is that for a progressive lens, when it is a single relative measurement value at a distant point, an age is estimated from an added power to a certain extent, and the measurement values for closer points than that point are calculated with an estimate calculation of the relative measurement values through age, which is described below. When the information from the person who has ordered is information which does not include all the measured values among the relative measurement values, other relative measurement values are calculated from one or both of the positive relative convergence and the negative relative convergence under an assumption such as the following. For example, using the values of the positive relative convergence of the Donders diagram by Hatada, which is shown in FIG. 34, these can be calculated by prorating from the real relative convergence received from the person who has ordered. Namely, data of the negative relative convergence, data of the positive relative convergence, and data of the negative relative accommodation are extracted from FIG. 34, and they are calculated through multiplying these values by "ratio"=(the positive relative convergence of the person who has ordered/the positive relative convergence of FIG. 34). Further, when the angle of convergence is 0, then the negative relative convergence is almost 0, and the negative relative convergence is not adoptable. When the angle of convergence is not 0, the negative relative convergence is adoptable, and they can be calculated through multiplying these values by "ratio"=(the negative relative convergence of the person who has ordered/the negative relative convergence of FIG. 34). Further, the data from which the ratio is calculated is not limited to the Donders diagram by Hatada, which is shown in FIG. 34. When there is more accurate data, for example, when there is data which is measured through narrowing the condition, such as the age and the usage condition of the examinee, then that data may be adopted.

Further, when there is no relative measurement value of the person who has ordered, which is directly measured, it is possible to estimate the positive relative convergence and the negative relative convergence, or the positive relative accommodation and the negative relative accommodation from the age, and it is the second best method of the present invention. As it is described in "FIG. 3" on page 242 of "Distributions of "Vergence Fusional Stereoscopic Limit (VFSL)" of Disparity in a Stereoscopic Display," (written by Shojiro Nagata, TVRSV, Vol. 7, No. 2, (2000), p. 239-246), it is because of the very large individual differences. There, variations for 392 examinees with a visual distance of 60 cm are such that, from 0 to −27.6 degrees for CROSS (the positive relative convergence), and from 0 to 13.9 degrees for UNCROSS (the negative relative convergence). It can be seen from this data that how large the individual differences are. The average for CROSS is −4.72 degrees and the average for UNCROSS is 3.34 degrees. Conversely from these facts, it can be said that the relative measurement values are suitable as individual elements.

A method of obtaining convergence-accommodation information from an age, namely, a method of obtaining the positive relative accommodation and the negative relative accommodation at an arbitrary angle of convergence has been described in detail in the specification of PCT/JP2008/069791, but it is described here once again. Here, if there exists statistically sufficient measured data to show the relationship among the age—the positive relative accommodation and the negative relative accommodation, then it is not necessary to produce the below. However, it is considered that such data does not exist at the time of the present application. In this regard, qualitatively, it is known that for the relative convergence and the relative accommodation, self-adjustments easily occur dynamically or statically, and that there is a tendency that the Donders line descends as age rises. The positive relative accommodation and the negative relative accommodation obtained by the method described in the specification of PCT/JP2008/069791 are, of course, the average values for ages, and they are not for limiting the individual elements. First, a method of obtaining averages of the positive relative convergence and the negative relative convergence through an age is described. It is described according to the specification of PCT/JP2008/069791.

Figure 5:
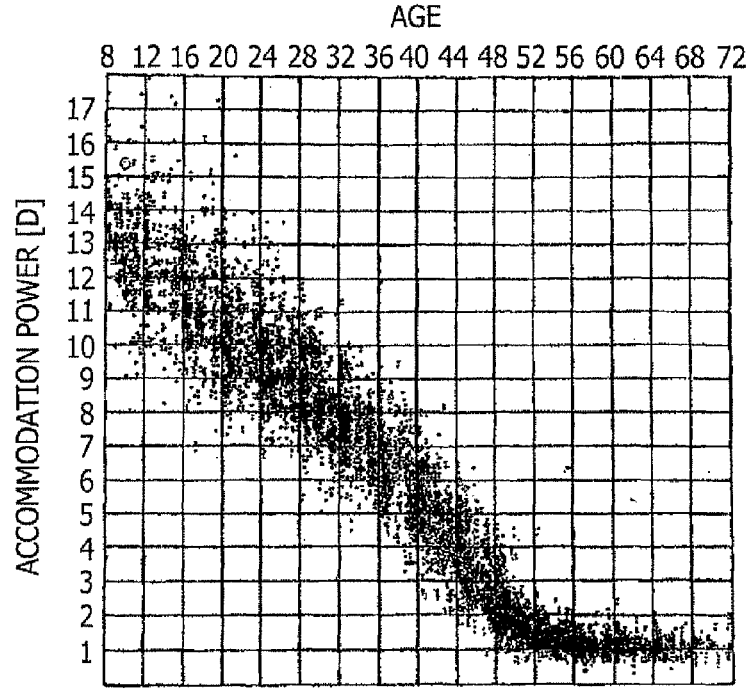
FIG. 5 is a diagram (a Duane diagram) showing a relationship between an age and an accommodation by Duane.

The method of generating the age-positive relative accommodation, which is suitable for using the embodiment, is as follows. First, the horizontal axes of the Peters diagrams according to ages shown in FIG. 39-41, namely, ranges on the right side of the origin of the spherical diopter power having a value of 20/20 are focused. These ranges are values of the positive relative accommodations, based on the measurement method. Then, from the three pieces of graphs, the positive relative accommodations for 5-15 year-old, 25-35 year-old, and 45-55 year-old are obtained. These are supposed to be the positive relative accommodations for central ages, namely, for 10 year-old, 30 year-old, and 50 year-old. Further, it is supposed that the positive relative accommodation shows the similar behavior as that of the known age-accommodation relationship. One example of this is shown in FIG. 5 (for example, "History of eyesight. Transition of age and adjustment curve," written by Tadao Tsuruta, Japanese journal of visual science, Vol. 19, No. 3, p. 103). FIG. 5 is the result of the measurements by Duane, and the result is such that the degrees (coefficient) of the descending of the amplitude of accommodation differ between a range of from 0 to 53.3 year-old and a subsequent range. Further, in the above document by Tsuruta, the similar results are obtained through measurement results with a figure produced by Hofstetter (the same, p. 101) and a figure produced by Landolt (the same, p. 102), etc. Further, it is assumed that the positive relative accommodation becomes 0 at the age of 75. Even if it is different, this assumption approximately holds.

Then, the age-positive relative accommodation relationship, such that there is a linear variation from 0 to 53.5 year-old and there is a linear variation from 53.5 to 75 year-old, is obtained. Since this relationship is the measured values for which the rear apex of a lens is the reference, a compensation is performed to adjust the reference to a reference of the center of rotation of the eyeball, which is a reference of data described below. The compensation is tiny. Further, a prescription distance and a positive relative accommodation at a prescription angle of convergence for each age are produced using the above described age-positive relative accommodation relationship. Measured value of the positive relative accommodation at each angle of convergence for each age does not exist so far.

Figure 6:
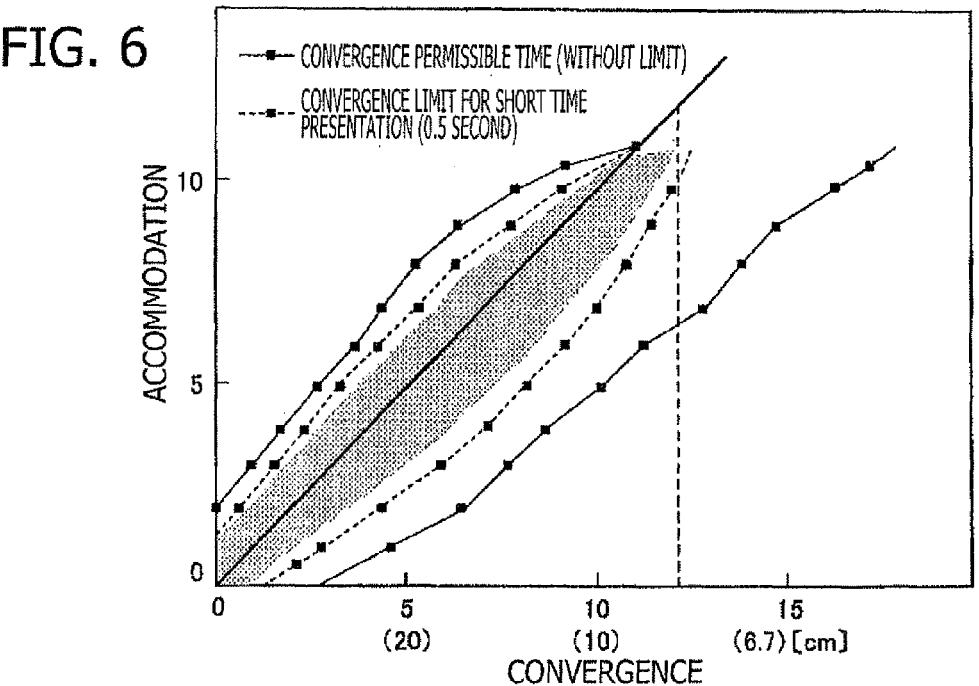
FIG. 6 is a diagram showing an area of comfort derived from a Peters diagram for 5-15 year-old.
Figure 7:
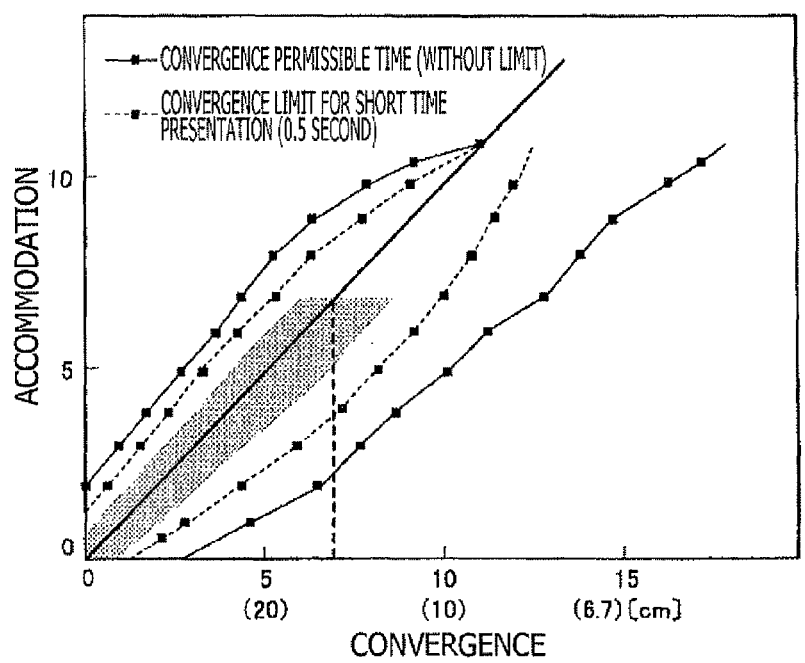
FIG. 7 is a diagram showing an area of comfort derived from a Peters diagram for 25-35 year-old.
Figure 8:
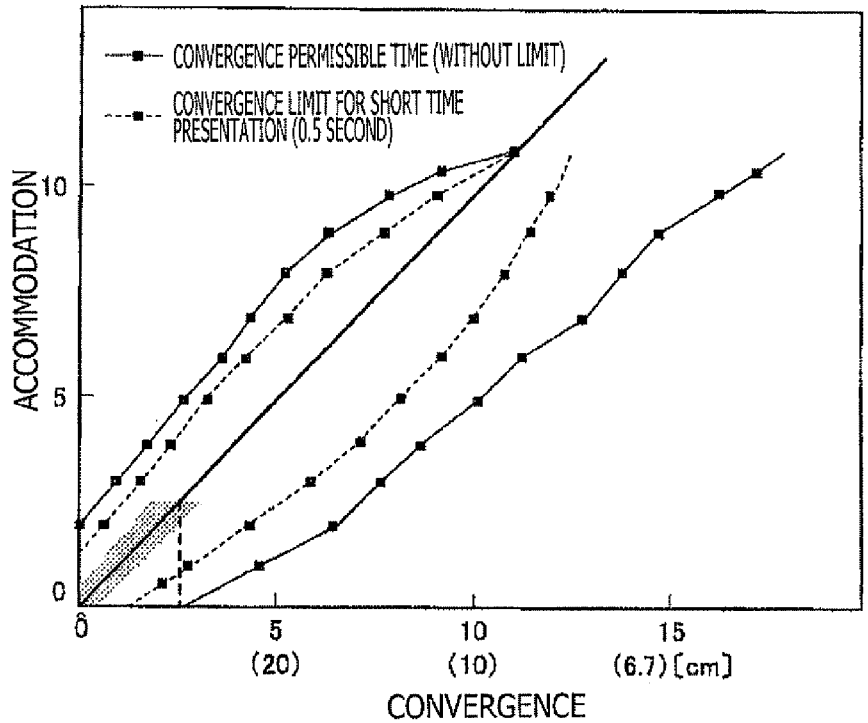
FIG. 8 is a diagram showing an area of comfort derived from a Peters diagram for 45-55 year-old.
Figure 9:
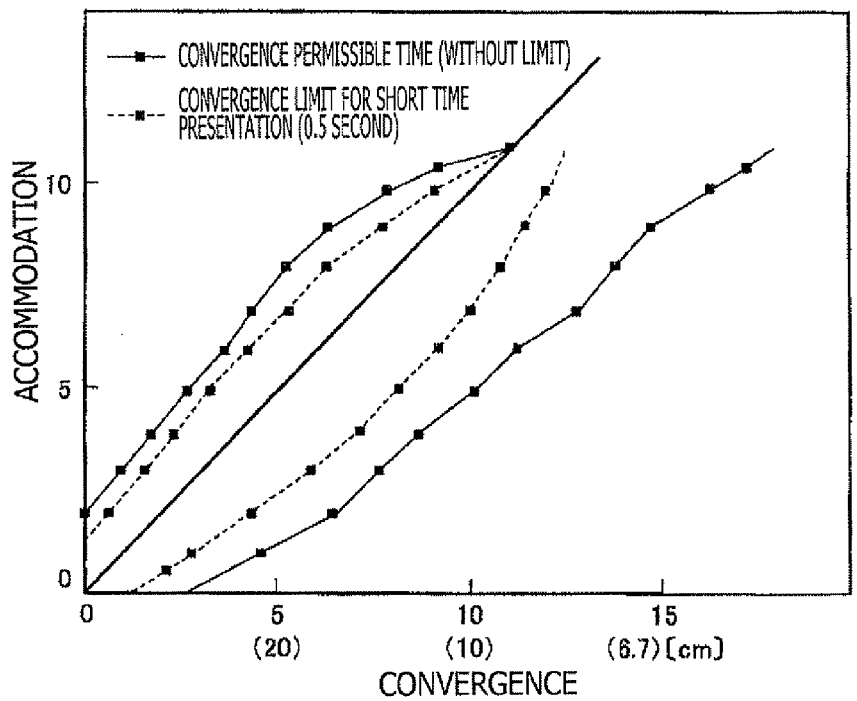
FIG. 9 is a diagram showing an area of comfort derived from a Peters diagram for 75-year-old.

Therefore, first, the actual measured data of the Donders diagram by Hatada, which is shown in FIG. 34 is set as a reference. The positive relative accommodation at the angle of convergence of 0 in FIG. 34 is about −2 D (diopter). Here, the positive relative accommodation is calculated from a given arbitrary age, based on the above described age-positive relative accommodation relationship. This is the positive relative accommodation for the arbitrary age, the each of the relative measurement values in FIG. 34 is prorated with −2D, which is the positive relative accommodation in FIG. 34. Specifically, each of the positive relative accommodation and the negative relative accommodation in FIG. 34 is multiplied by a ratio=(the above calculated positive relative accommodation)/(−2). Further, upper limits of the Donders line and the Donders curve are determined through the previously described known age-accommodation relationship. The calculated Donders curves, which are separated by respective ages, are shown in FIG. 6-FIG. 9. FIG. 6 shows a case for 5-15 year-old, FIG. 7 shows a case for 25-35 year-old, FIG. 8 shows a case for 45-55 year-old, and FIG. 9 shows a case for 75 year-old. Each of them is an area which is one third of a range in which the relative accommodation is enabled, and the Percival's area of comfort, which is suitable for a fusion, is calculated, and shown as gray area in the figure. Here, for 75 year old, there is almost no area of comfort, and the result is such that it almost does not appear with the scale size of the figure. It means that the amplitude of the accommodation becomes 0, and the visual function in the present invention and the visual function described in patent document 2 become equivalent. Even in this case, the design of the present invention is performed through the binocular visual acuity function, and it is not limited by patent document 2. Further, the ranges of 15-25 year-old, 35-45 year-old, 55-75 year-old may be calculated from the averages of FIG. 5 and FIG. 6, FIG. 6 and FIG. 7, and FIG. 7 and FIG. 8. The Donders curves for arbitrary ages obtained so far are convergence-relative accommodation relationships. These relationships are also convergence-relative convergence relationships for arbitrary ages. From these relationships, the positive relative convergence, the negative relative convergence, positive relative accommodation, and the negative relative accommodation at an arbitrary angle of convergence for an arbitrary age can be obtained.

For other input data, threshold values for evaluating the sensory fusion are required, but for these the Panum's fusional area and the focal depths of eyeballs can be considered. However, as it has already been described, their quantitative measurements require precise and careful measurements, depending on a fusion stimulating condition. In addition, since their nature is such that they cannot be represented by a specific measurement, they are set without depending on a measurement. As a setting method, they can be arbitrarily selected from known measured values through designer's discretion, while considering a condition of use of the eyeglass lens. Specifically, for the horizontal direction of the Panum's fusional area, a middle of an interval from the fusion limit of the binocular retinal disparity to the maximum of the depth is suitable. For the horizontal direction, judging from FIG. 38, a half of the binocular retinal disparity is suitable. Further, regarding the focal depth, the present applicant could not find a reliable measured value. Daringly describing numerical values, based on the representative values among the measured values shown in Table 2, as a values derived from a horizontal retinal disparity of 15'-60', a diopter width of about 0.06-0.3 is suitable. Further, 4'-30' is suitable for the vertical retinal disparity. Namely, as the threshold value of the sensory fusion, it can be set to 0.06-0.3 diopter in the horizontal direction and 0.016-0.15 diopter in the vertical direction. Further, for a case of a squint, in principle, the relative measurement values are measured in a corrected condition, and the above present invention can be applied without any change.

(3) Detailed Explanation of the First Step S1 (a Setting Step of an Object—Eyeglass Lens—Binocular Eyeball System)

Next, as the first step S1, the Object—Eyeglass Lens—Binocular Eyeball System is set. Basically, the object is arbitrarily determined by a designer. Therefore, the eyeglass lens is designed so that performance of the eyeglass lens becomes higher at the arbitrary object determined by the designer. The present invention is not limited by any object. In order to clarify a feature of the present invention, the object is described in detail.

Figure 44:
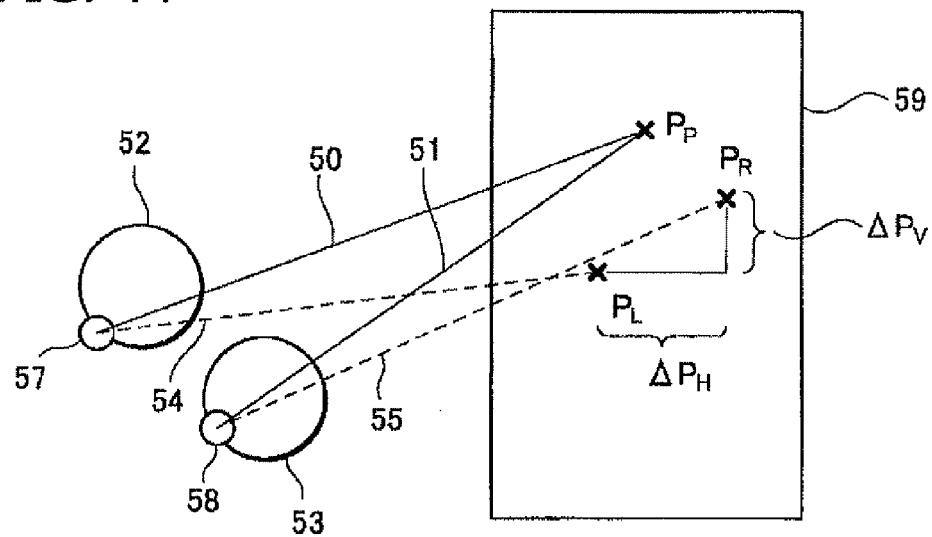
FIG. 44 is a diagram showing a disparity on an object surface in a conventional technique.
Figure 45:
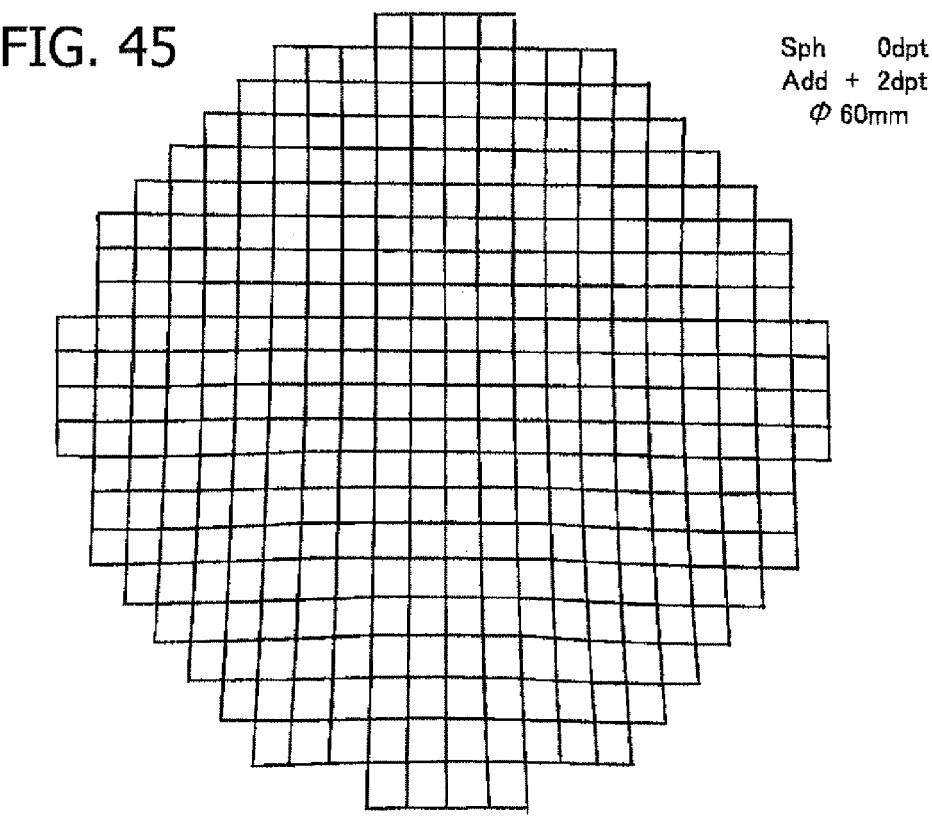
FIG. 45 is a diagram showing a distortion in a conventional technique.

Here, the object in FIG. 44 which is "FIG. 2" of patent document 1 or the object in "FIG. 1" of patent document 2 lie on a flat surface. The eyeglass design for which the object is a flat surface is one of candidates of objects which are adopted for an eyeglass lens for reading character on a tight news paper or on a wall. As it has already been described, the object is arbitrarily selected by the designer. However, in a case where the object is like a flat surface, the points within the object other than the fixation point have big differences in distances from both of the eyeballs. Therefore, it has a disadvantage such that it becomes difficult to simultaneously adjust an error in power from the fixation point, a residual astigmatism, and a prism. Consequently, the prism becomes bigger. This does not bring a good result for the binocular view functions.

Figure 10:
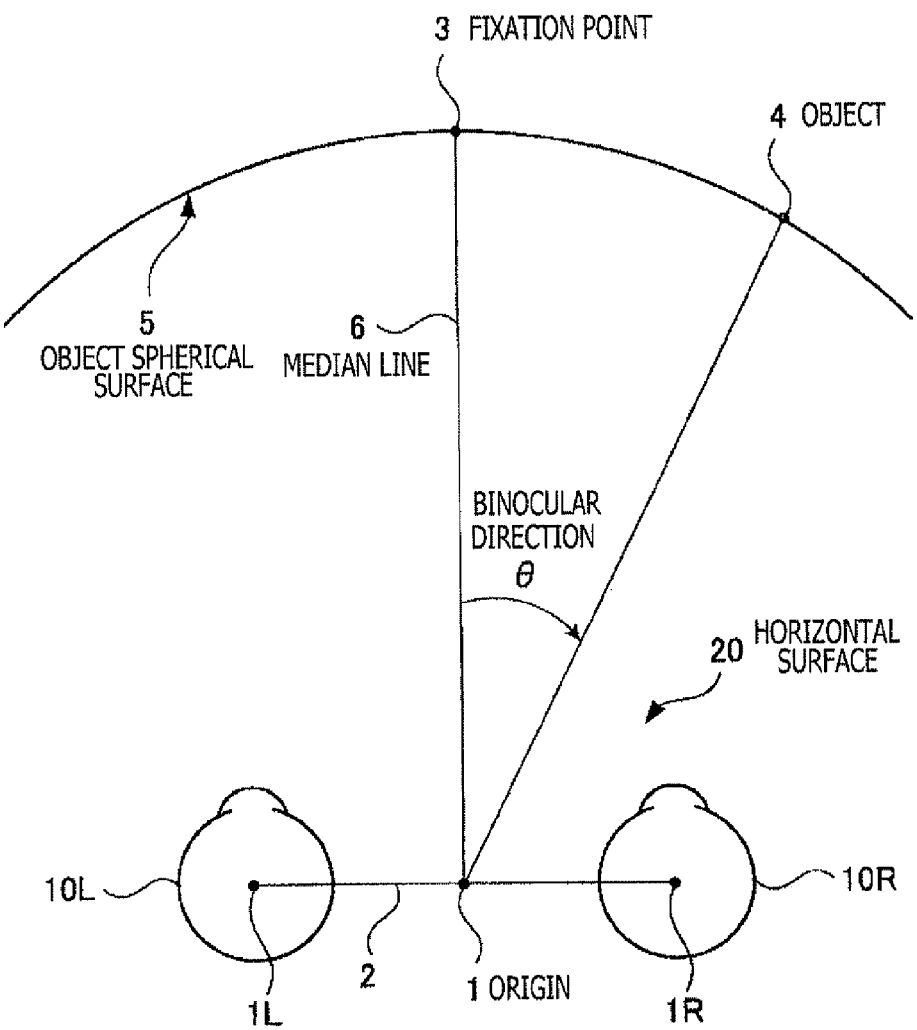
FIG. 10 is a diagram showing an Object—Eyeglass Lens—Eyeball System for explaining "an object" used in an embodiment of an eyeglass lens evaluation method of the present invention.

A preferable object as an object used for the eyeglass lens evaluation method of the present invention is shown in FIG. 10. The explanation below is an explanation based on a line of fixation at a side of an image, and since everything are the same except for an explanatory diagram, an explanation based on a line of fixation at a side of an object is omitted. As shown in FIG. 10, firstly, a center of rotation of a right eyeball 1R and a center of rotation of a left eyeball 1L are set. In FIG. 10, an arrangement on a horizontal surface 20 which includes both the centers of rotations of the eyeballs 1L and 1R is shown. In FIG. 10, a middle point of both the centers of rotations of the eyeballs 1L and 1R is set to an origin 1 in a coordinate system in the Object—Eyeglass Lenses—Binocular Eyeball System. Then, an object 4 is defined on an object spherical surface 5 which is a hemisphere of the front eye centered by the origin 1 with a radius defined by a distance from the origin 1 to a fixation point 3. The centers of rotations of both the eyeballs 1L and 1R are placed within a frontal plane. When an object 4 is placed at infinity, it is considered as a limit where a radius of an object spherical surface 5 is enlarged. Further, a location of the object 4 is defined using an angle from a middle line 6, the middle line 6 passing through the origin 1, as a variable, instead of a view angle at a side of an image extending from the centers of rotations of both the eyeballs 1L and 1R to the eyeglass lenses, or a view angle at a side of the object extending from the eyeglass lenses to the object, as with a conventional optical system. Namely, an arbitrary position of the object 4 is defined as a function of an angle, the angle being based on the middle line 6 from the origin 1 of the system. This angle θ is defined to be a direction of a binocular vision. Further, the direction of the binocular vision θ may be divided into a horizontal direction and a vertical direction. Additionally, a straight line connecting the centers of rotations of both the eyeballs is set as a line segment between eyeballs 2.

Next, a position of the eyeglass lenses is explained. The eyeglass lenses are placed between a fixation point of a prescription value for a far point and the respective centers of rotations of the eyeballs 1L and 1R at that time. The eyeglass lenses have a prescription value at a lens design reference point, and they have arbitrary tilts with respect to a horizontal surface and a frontal plane (a front tilt angle, an elevation angle), and eccentricities (an eccentricity in a vertical direction, an eccentricity in a horizontal direction). A distance from a rear apex of a lens to the center of rotation of the eyeball is usually 27 mm, or 24-36 mm as described in lines 4-5 from the bottom in the right column on page 2 of Japanese Published Examined Application No. 42-9416. It is better to design as an individual element for a case where the distance is greater than or equal to 27±1 mm.

Next, with respect to an eyeball movement, it is assumed that a single eye obeys the Listing's law and binocular eyes obey the Hering's law of equal innervations. The centers of rotations of the eyeballs 1L and 1R move when rotate in up and down or in right and left, so that distances from the centers of rotations to apexes of corneas vary. Namely, when the left and right eyeballs view a near point, they converges because of an accommodation-convergence relation, however, it is known that the centers of rotations 1L and 1R moves at that time. Further, as a phenomenon which is different from the Hering's law but similar to that law, there is a property such that, as with the light reflex, the same amounts of the accommodation responses are performed, even if the refractive powers of the left and right eyes are different. This property does not contradict the definition that the relative convergence is one value for the both eyes, and it is very convenient for calculating the left and right visual acuities with the relative accommodation. Since there is no problem in approximate sense, in the present invention, it is explained with a system for which the centers of rotations of the eyeballs 1L and 1R are fixed.

(4) Detailed Explanation of the Second Step S2 (a Process of Calculating a Reference Aberration)

In the second step, in order to make design reference points of a pair of eyeglasses of an Object of both eyes—Lenses—Binocular Eyeball System as references of calculating aberrations as described below, lens shapes are set so that they provide predetermined prescription values at the design reference points. Further, in general, the design reference points indicate points where the prescribed values are obtained. They are placed in front surfaces of the eyeglass lenses, but they may be placed in rear surfaces. In a progressive lens, the design reference points are usually separated at different lens positions such as a far vision power measuring point, a near vision power measuring pint, and a prism measuring point. Further, for a single focus lens that is a near vision lens, in principle, various quantities for optical calculations are calculated along a principal ray extending from the fixation point on the object to the center of rotation the eyeball and passing through the near vision power measuring point. On the other hand, there is a case in which it is prescribed by defining a near vision PD by simply subtracting 2 mm from a pupillary distance (it is called PD) and setting it as a view point.

In any case, the lens shapes are formed so that the prescribed values are provided at the design reference points. The lens shapes are formed when they converge to the prescribed values, during the process of an optimization calculation. Additionally, for cases of evaluations in which a pair of eyeglass lenses, that are general-purpose lenses, are wore, there are some cases in which the eyeglass lenses and lines of sights passing through the design reference points are not perpendicular. In these cases, slight aberrations occur at the design reference points because of the tilts, but the prescription values are attained in an approximation sense.

Figure 11:
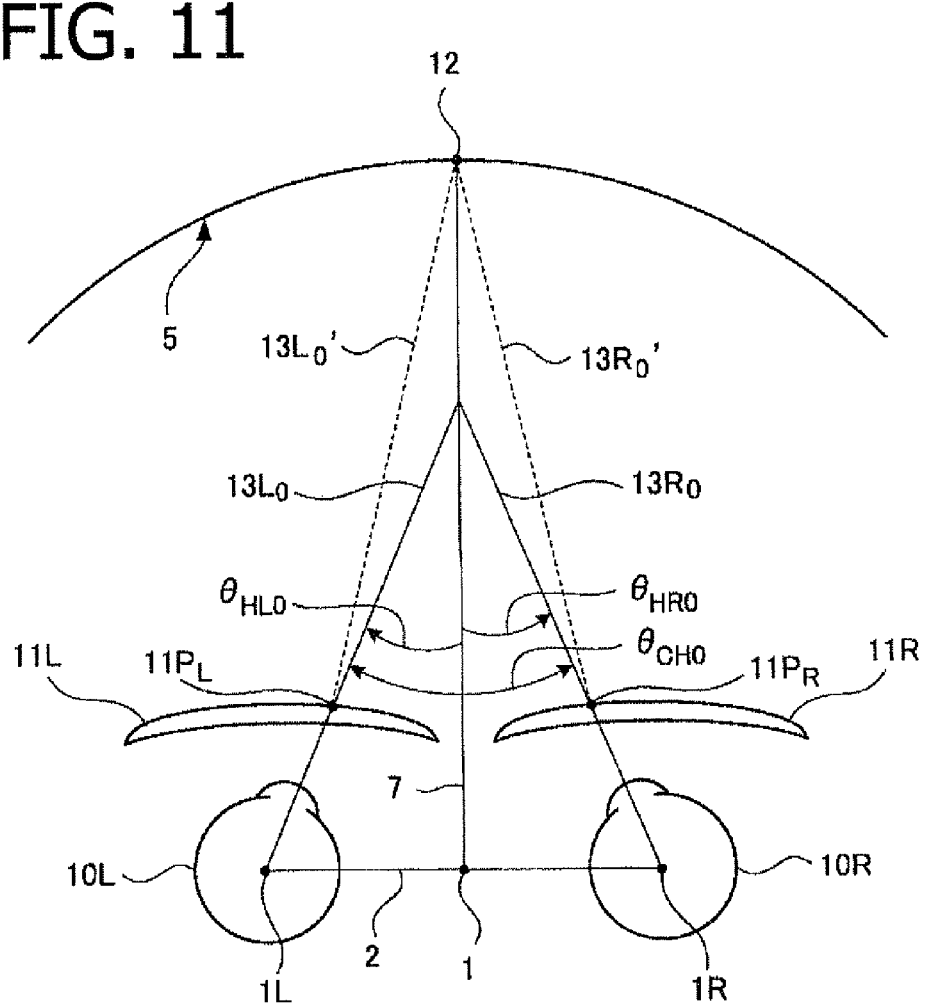
FIG. 11 is a diagram showing a reference value of an angle of convergence on an image side in the Object—Eyeglass Lens—Eyeball System used in the embodiment of the eyeglass lens evaluation method of the present invention.

Here, the prescription values are, a spherical diopter power, an astigmatism degree, an astigmatic axis, a prism, a prism axis, and an added power. Since an aberration is defined to be a difference from a reference, these prescription values become references. FIG. 11 shows a states in which both eyeballs 10L and 10R are viewed from above. In FIG. 11, portions corresponding to FIG. 10 are provided with the same reference numerals, and an overlapped explanations are omitted. Lines of fixations 13L0 and 13R0 which pass through respective reference points of a left eyeglass lens 11L and a right eyeglass lens 11R from a left eye 10L and a right eye 10R, respectively, are refracted by the eyeglass lenses 11L and 11R, become eye directions 13L0' and 13R0', and intersect with each other on an object 12 on a median plane 7 on the object spherical surface 5. Namely, it is configured so that the object 12 (an object disposed at a position where the lines of fixations 13R0 and 13L0, from the respective centers of rotations of eyeballs 1L and 1R and passing through the design reference points 11PL and 11PR, intersect on the object spherical surface 5 after passing through the lenses, by use of a normal ray tracing method) is disposed on the median plane 7. Even if it is not disposed on the median plane 7, it is attained while converging during an optimization calculation process. Here, the reason why the object 4 in FIG. 10 and the object 12 in FIG. 11 are assigned the different reference numerals is that, in general, the design reference points 11PL and 11 PR are not on the horizontal surface 20 shown in FIG. 10.

Here, in order to define an angle of convergence, for convenience of a later explanation, a projection component in a direction perpendicular to the median plane of a median line of the lines of fixations 13L0 and 13R0 of the left and right eyes 10L and 10R is defined to be "a surface parallel component," and a component in a direction parallel to the median plane is defined to be "a surface perpendicular component." Further, surface parallel components of angles between the left and right lines of fixations 13L0, 13R0 and the median lines of the lines of fixations 13L0, 13R0 are defined to be $\theta_{HL0}$ and $\theta_{HR0}$, respectively. Additionally, surface perpendicular components of angles between the left and right lines of fixations 13L0, 13R0 and the median lines of the lines of fixations 13L0 and 13R0 are set to be $\theta_{VL0}$ and $\theta_{VR0}$, respectively. Then, an angle of convergence in the surface parallel direction $\theta_{CH0}$ is defined to be the sum of $\theta_{HR0}$ and $\theta_{HL0}$. Signs of $\theta_{CH0}$, $\theta_{HR0}$, and $\theta_{HL0}$ are arbitrary as long as they have consistency, but in the present invention, when the eyeballs are in a convergent state, all of them are set to positive values. Positive and negative are reversed, when the eyeballs are in a diverged state. Similarly, the surface perpendicular component is denoted by $\theta_{CV0}$, and it is defined to be the sum of $\theta_{VR0}$ and $\theta_{VL0}$. Usually, the centers of rotations of the left and right eyeballs are almost on the same horizontal surface, but there are some cases in which there are slight deviations. Therefore, as with the surface horizontal direction, $\theta_{CV0}$ is set to a positive value during in a convergent state, and it is set to a negative value during a diverged state. Representing with formulas, the surface horizontal component $\theta_{CH0}$ and the surface perpendicular component $\theta_{CV0}$ of the angle of convergence which is to be a reference (a reference value of the angle of convergence) become as follows:

$$\theta_{CH0} = \theta_{HR0} + \theta_{HL0}$$

$$\theta_{CV0} = \theta_{CR0} + \theta_{VL0}$$

In general $\theta_{CV0}$ is 0 and the lens shape and the reference point are set so that it becomes 0.

Figure 12:
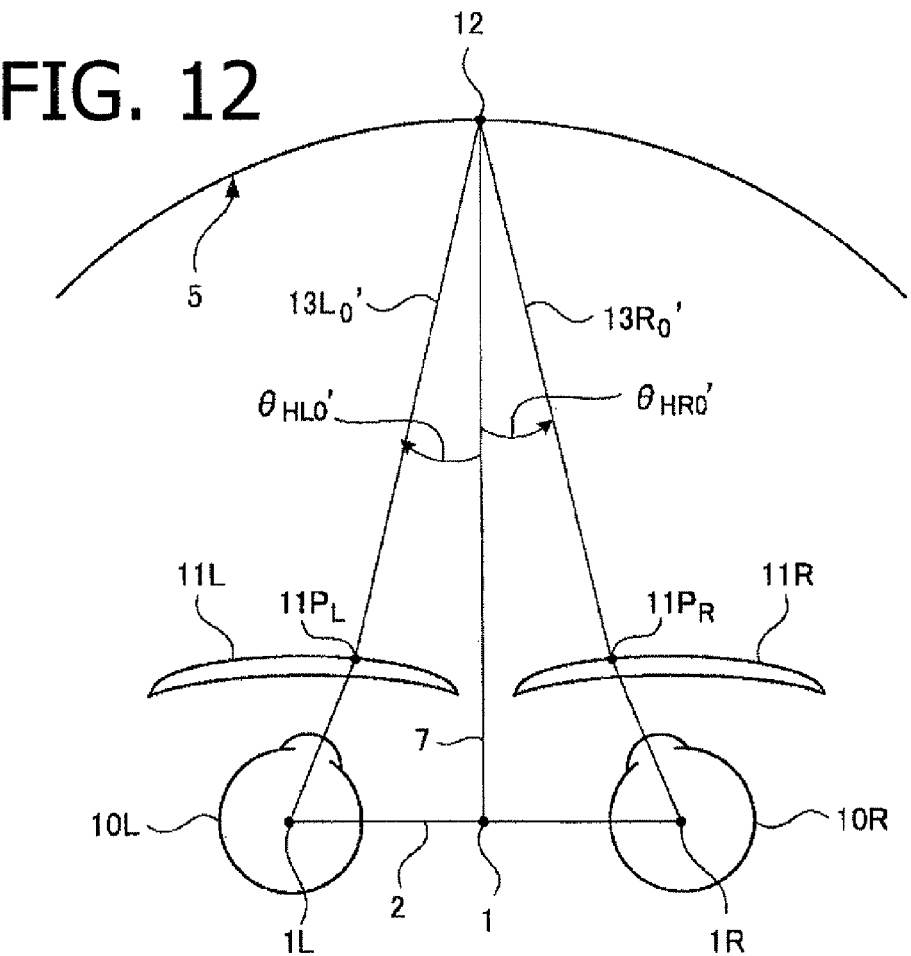
FIG. 12 is a diagram showing a reference value of the angle of convergence on an object side in the Object—Eyeglass Lens—Eyeball System used in the embodiment of the eyeglass lens evaluation method of the present invention.
Figure 13:
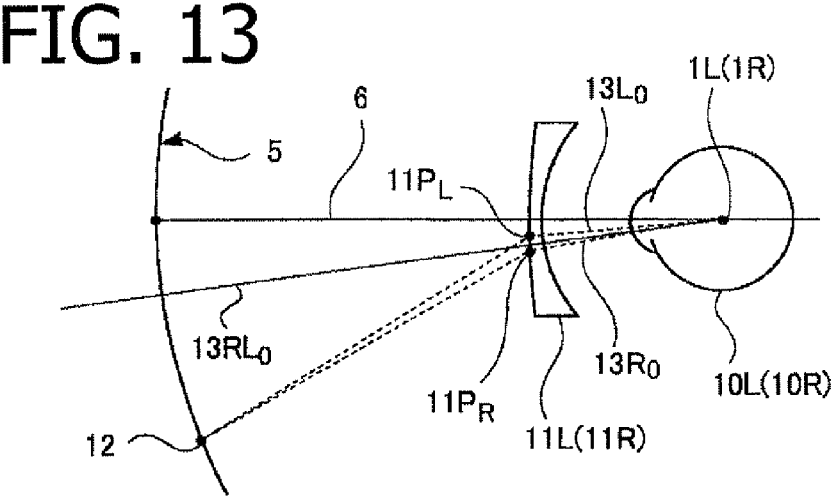
FIG. 13 is an explanatory diagram of a surface perpendicular direction of a convergence aberration defined on the image side, the explanatory diagram viewing the Object—Eyeglass Lens—Eyeball System shown in FIG. 11, which is used for the embodiment of the eyeglass lens evaluation method of the present invention, from a perpendicular direction with respect to a median plane.
Figure 14:
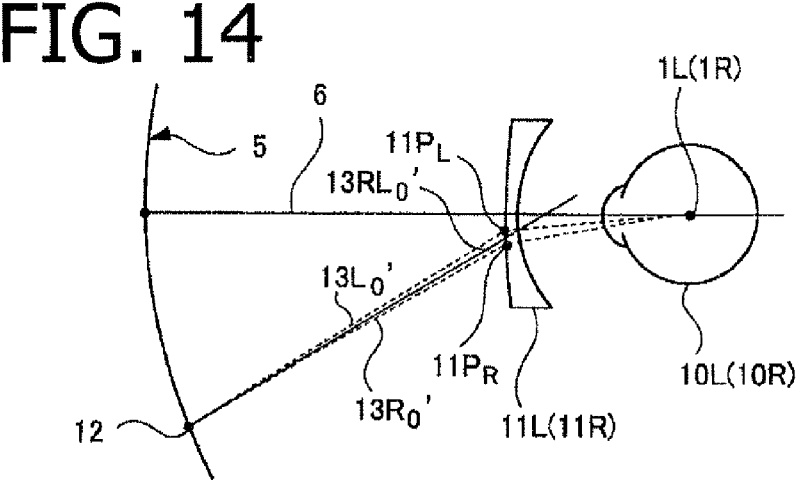
FIG. 14 is an explanatory diagram of a surface perpendicular direction of a convergence aberration defined on the object side, the explanatory diagram viewing the Object—Eyeglass Lens—Eyeball System shown in FIG. 12, which is used for the embodiment of the eyeglass lens evaluation method of the present invention, from the perpendicular direction with respect to the median plane.

FIG. 12 is a figure which shows that the angle of sights $\theta_{HL0}$ and $\theta_{HR0}$ defined on the side of the image in FIG. 11 are set to angles of sights $\theta_{HL0}$ and $\theta_{HR0}$ by the lines of fixations 13L0' and 13R0' on the side of the object. FIG. 13 and FIG. 14 are figures viewing FIG. 11 and FIG. 12 from the side, respectively. It can be seen that the median line 13RL0 of the lines of fixations 13L0 and 13R0 on the side of the image and the median line 13RL0' of the lines of fixations 13L0' and 13R0' on the side of the object pass through the origin 1 and incline from the median line 6 that extends to the object 12. Additionally, as with the definition on the side of the image, the following are obtained on the side of the object $$\theta_{CH0}' = \theta_{HR0}' + \theta_{HL0}'$$

$$\theta_{CV0}' = \theta_{VR0}' + \theta_{VL0}'$$

Here, signs of the relative measurement values, the errors in power, and the convergence aberrations are explained. Firstly, the signs are not directly related to the present invention, even if the signs are assigned in any way, they are within the scope of the present invention, as long as they have a logical consistency. Next, a usual way of assigning the signs and the explanation in the present invention are described. The normal signs of the relative measurement values assumes a state in which the object is fixated. The sign of the relative accommodation is indicated depending on the positive or negative power of the inserted lens, and the sign of the motor fusion is indicated depending on the direction of the inserted prism and the measured value of the prism diopter.

For example, when a spherical negative lens is inserted and an accommodation limit value is measured, the positive relative accommodation is indicated in a value corresponding to the power of the lens, namely, in a negative value. For the positive relative convergence, a prism is inserted in a base-out direction and a convergence limit value is measured and a prism degree and a direction are indicated, namely, the unit is in prism diopter and indicated by base-out. For the relative convergence, there is no sign and directional indication only. To summarize, the signs are convenient for the side of a measurer. Further, a vertical fusional convergence is an ability to cross the eyeballs in the vertical direction, and conversely, an extending direction is not observed. For the measurement of the vertical fusional convergence, there are few examples in the past, and there is no standard value for the measurement value. The measurement results are merely called as the vertical fusional convergence, and they are indicated in positive values. On the other hand, in the Donders diagram, the positive accommodation and the positive convergence are placed in a mathematically positive direction from the Donders line, but their usual display method is based on negative values, or based on a base-out indication. The relative measurement values do not match well with the Donders diagram, and they are not expressed mathematically.

In the present invention, the following explanation is added so that the signs of the relative measurement values are consistent with the signs of the average refractive power and the convergence aberration. Firstly, the state in which the surface parallel component of the convergence aberration is a negative value is a state where an outward prism is wore in front of an eye. This is the same state as the measurement method of the positive relative convergence. Therefore, in the present invention, the positive relative convergence is treated as a synonym for the outward prism and the negative value. Further, the negative relative convergence is treated as a synonym for an inward prism and a positive value. Next, the state in which the average refractive power is negative is a state where a spherical negative lens is wore in front of an eye. This is the same state as the measurement method of the positive relative accommodation. The positive relative accommodation is expressed in a negative value, but, this agrees to the definition of the average refractive power. Similarly, when the average refractive power is a positive value, its sign agrees to the sign of the negative relative accommodation. For the vertical fusional vergence, since there is no sign for conventional measured values, a sign is assigned arbitrarily. It is preferable that the vertical fusional vergence is matched with, for example, the definition of the surface perpendicular direction of the convergence aberration. In general, the centers of rotations of the left and right eyeballs are on the same horizontal plane. In this case, the changes of the lines of fixations by anisotropic rotations in the vertical direction of the left and right eyes are always in extending directions. However, there is a case where the left and right eyeballs are slightly deviated in the vertical direction. In this case, the changes of the lines of fixations by the anisotropic rotations in the vertical direction of the left and right eyes can be not only in the extending directions, but also in the narrowing directions. The surface perpendicular component of the convergence aberration is expressed with a positive value in the directions in which the eyeballs are narrowing, and is expressed with a negative value in the directions in which the eyeballs are expanding. Therefore, it is preferable that the sign of the vertical fusional vergence is negative, when it is compared with the surface perpendicular component of the convergence aberration. Of course, the anisotropic rotations, with which the eyeballs expand in the vertical direction, is not observed. Thus, it should not be a positive value, and it is preferable that a threshold value in that direction is always 0.

(5) Detailed Explanation of the Third Step S3 (an Aberration Calculating Process at an Arbitrary Object Evaluation Point)

Figure 15:
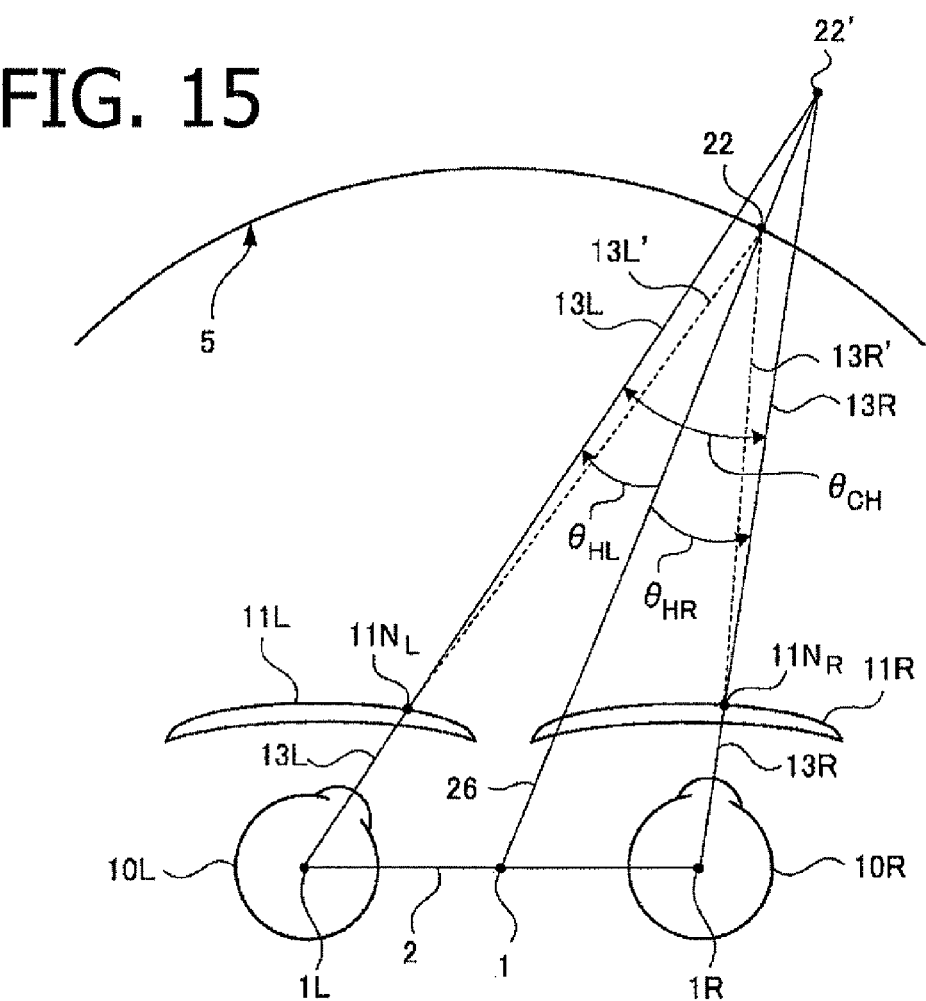
FIG. 15 is a diagram showing an angle of convergence on the image side at an evaluation point of the Object—Eyeglass Lens—Eyeball System used in the embodiment of the eyeglass lens evaluation method of the present invention.

The definitions of the optical calculations, etc., of the binocular system explained in the second step are further described in detail, and an optical evaluation is performed at an arbitrary lens evaluation point. In the present invention, the binocular system for which the object distance is infinite is defined to be a binocular system for near view in which the object distance is set to infinite. Therefore, it can be shown in a figure. A schematic configuration of a binocular system in an arbitrary binocular direction is shown in FIG. 15. Details of the optical calculation are explained with reference to FIG. 15. An arbitrary position of an object in an arbitrary binocular direction from the origin 1 of the binocular system is set to an evaluation point 22. Among the lines of fixations starting from the centers of rotations of the left and right eyes 1L and 1R, passing through evaluation points 11NL and 11NR of the left and right eyeglass lens 11L and 11R, refracting and passing through the evaluation point 22, by using the ray tracing method, the extension lines on the side of the image of the lines of fixations are set to 13L and 13R. Here, in the example shown in the figure, the case is shown in which the intersection point 22' of the lines of fixations 13L and 13R are disposed outside of the object sphere 5. Even if the intersection of the lines of fixations 13L' and 13R' are not able to pass through the evaluation point 22 with a single trial, the optical rays which converges at the evaluation point 22 can be calculated with a required precision by changing the angles of the rays emitted from the centers of the rotations of the eyeballs 1L and 1R.

Here, as a surface horizontal component of an angle of convergence $\theta_{CH}$ at the evaluation point 22 is defined as below:

$$\theta_{CH} = \theta_{HR} + \theta_{HL}$$

Similarly, the surface vertical component of the angle of convergence $\theta_{CV}$ at the point 22 can be defined as below:

$$\theta_{CV} = \theta_{VR} + \theta_{VL}$$

Here, surface parallel components of the angles pinched by the median line 26 of the lines of fixations 13L and 13R and the lines of fixations 13L and 13R, that include the median line 26 of the lines of fixations 13L and 13R, and that are parallel to a surface perpendicular to the median surface, are set to $\theta_{HL}$ and $\theta_{HR}$, and similarly, in the vertical direction, surface perpendicular components, that include the median line 26, and that are parallel to a surface parallel to the median surface are set to $\theta_{VL}$ and $\theta_{VR}$.

Figure 16:
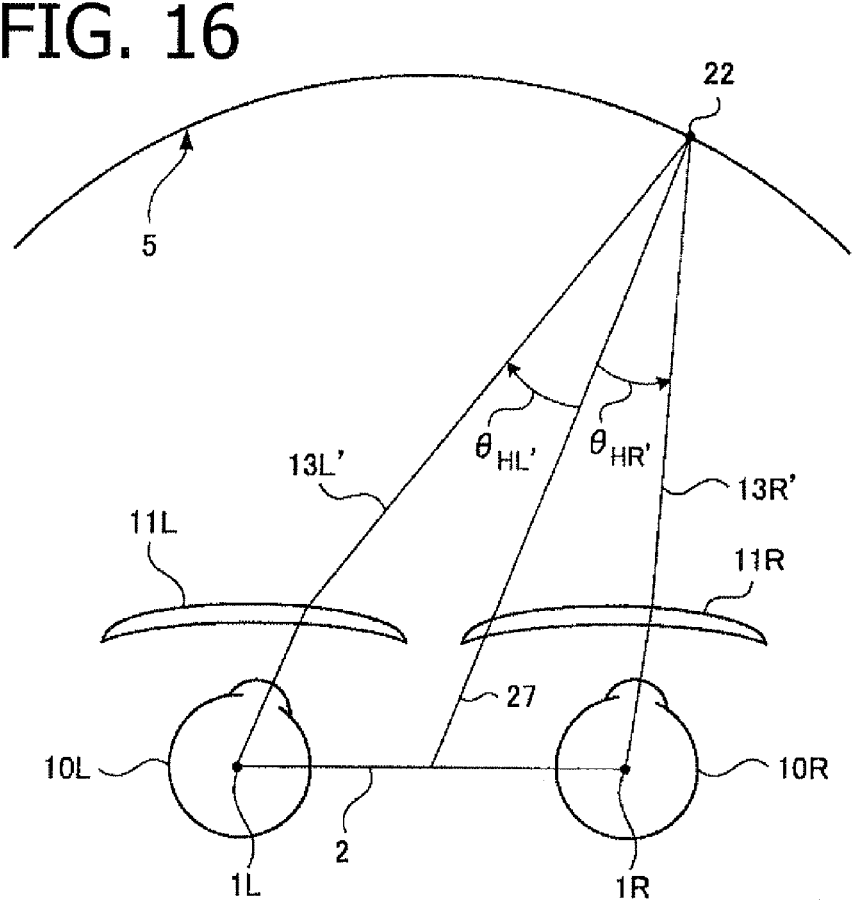
FIG. 16 is a diagram showing an angle of convergence on the object side at the evaluation point of the Object—Eyeglass Lens—Eyeball System used in the embodiment of the eyeglass lens evaluation method of the present invention.

Namely, a surface parallel component and a surface perpendicular components of a convergence aberration at the evaluation point 22 are represented as follows:

(the surface parallel component of the convergence aberration): $\theta_{CH} - \theta_{CH0}$ (the surface perpendicular component of the convergence aberration): $\theta_{CV} - \theta_{CV0}$ FIG. 16 is a diagram showing angles of convergence $\theta_{HL}'$ and $\theta_{HR}'$, when they are defined be the lines of fixations 13L' and 13R' at the side of the image. In this case, surface parallel components of the angles pinched by the median line 27 of the lines of fixations 13L' and 13R' and the lines of fixations 13L' and 13R', that include the median line 27 of the lines of fixations 13L' and 13R', and that are parallel to a surface perpendicular to the median surface, are set to $\theta_{HL}'$ and $\theta_{HR}'$, and similarly, in the vertical direction, surface perpendicular components, that include the above described median line 27, and that are parallel to a surface parallel to the median surface are set to $\theta_{VL}'$ and $\theta_{VR}'$. At this time, as with the above described definitions on the side of the image, a surface parallel component and a surface perpendicular component of a convergence aberration defined at the side of the object at the evaluation point 22 are, based on the following:

$$\theta_{CH}' = \theta_{HR}' + \theta_{HL}'$$

$$\theta_{CV}' = \theta_{CV}' + \theta_{VL}',$$

represented as follows:

(the surface parallel component of the convergence aberration): $\theta_{CH}' - \theta_{CH0}'$ (the surface perpendicular component of the convergence aberration): $\theta_{CV}' - \theta_{CV0}'$ Differences of optical values along the lines of fixations 13L and 13R shown in FIG. 15, with reference to optical values along the lines of fixations 13L0 and 13R0 described in FIG. 11, are aberrations. Namely, the spherical diopter power, the astigmatism degree, the astigmatism axes, and the angle of convergence, that are calculated at the second step S2, are set as references, and at the third step S3, an error in power and a residual astigmatism are calculated from differences of the spherical diopter power, the astigmatism degree, and the astigmatism axes. With respect to the angle of convergence, when the reference value of the angle of convergence obtained at the second step S2 is set as a reference as described above, the convergence aberration is defined to be a difference between the reference and the angle of convergence (the surface parallel component is $\theta_{CH}$ which is the sum of $\theta_{HR}$ and $\theta_{HL}$ of FIG. 15) which is the angle between the lines of fixations 13L and 13R from the both eyeballs 10L and 10R. To define further in detail, the convergence aberration is a difference in the angle of convergence, when setting an optical quantity along the principal ray, the principal ray extending from an object to a center of rotation of an eyeball and passing through a design reference point, as a reference.

The convergence aberration defined in the present invention is different from an ordinary binocular retinal image disparity. Specifically, the convergence aberrations are measured values of the relative measurement values which are measured in front of the eyes, when correcting glasses are worn. Therefore, a convergence aberration is different from an ordinary binocular retinal image disparity in a point that it is an aberration in an angle of convergence in a state in which left and right correcting glasses are worn in accordance with a state of the measurement, in a point that it is an aberration when an object defined in a binocular direction (the arbitrary evaluation point 22 on the object spherical surface 5 including the median surface is viewed) is viewed, and in a point that it is defined, not with nodal points, but with the fixation lines passing through the centers of rotations of the eyeballs. Further, it is different from the binocular retinal image disparity in a point that there are movements of the eyeballs. For the terms of the binocular retinal image disparity, "Handbook of Visual Information Processing," Edited by The Vision Society of Japan, (Asakura Publishing Co., Ltd (2000), p 283-287) is referenced.

Further, the convergence aberration defined in the present invention is further different from an angle of convergence, which is appeared in psychology. Regarding the "angle of convergence" defined in psychology, there is a description, for example, in "Vergent Movement and Binocular Stereopsis" (Optical Review, Vol. 23, No. 1 (January 1994), p. 17-22). In this description, it is said that "an angle between a fixation point (an intersection point of visual axes) and a point of rotation of each of eyes (the centers of rotations)." Differences between the convergence aberration and the angle of convergence are in a point that it is an aberration of an angle of convergence in a state in which left and right correcting lenses are wore, in a point that it is an aberration when an object, which is defined in a binocular vision direction, is viewed, and in a point that an angle between lines of fixations passing through left and right reference points of a pair of eyeglasses is set to a reference value for obtaining a difference in aberrations. It can be seen that the value is completely different from the convergence aberration of the present invention which is defined from viewing angles of the lines of fixations which pass through the pair of eyeglasses and reach to the evaluation point.

Here, the differences between a difference in the horizontal direction or a difference in the vertical direction described in patent document 3 and the convergence aberration defined in the present invention are considered again. The following 5 points are considered as the differences of the convergence aberration:

a. The definition is based on a vergence (contralateral binocular movement) of the Hering's law of equal innervations that is a law of motion of a binocular vision, namely, the definition is based on a physiological knowledge derived from a convergent movement.
b. It is possible to use an arbitrary object defined with a binocular vision direction.
c. Evaluations based on a same basis can be performed throughout the whole field of vision, since there is one basis for evaluations.
d. By inventions of the surface parallel component and the surface perpendicular component, it is physiologically an appropriate definition when it is divided into components and when it displaces from a horizontal surface.
e. A position of an object is not defined on a surface, but it is defined stereoscopically.

Figure 17:
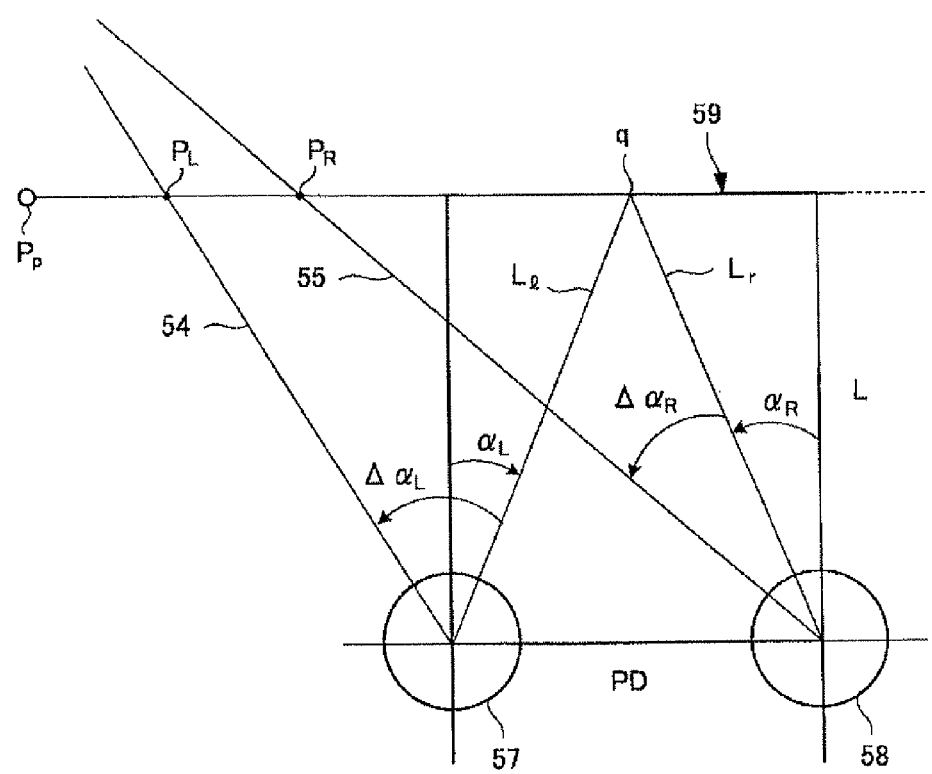
FIG. 17 is a diagram showing a configuration of the Object—Eyeglass Lens—Eyeball System in a comparison example.

Here, the difference in the horizontal direction and the difference in the vertical direction described in patent document 3 are analyzed in detail. The horizontal component in "FIG. 2" of patent document 3 is shown in FIG. 17. Since the vertical direction is similar, only a position difference $\Delta P_H$ in the horizontal direction described on page 5, line 35 of patent document 3 is explained below. As shown in FIG. 17, a distance between the centers of rotations of both the eyeballs is set to PD and a distance from the centers of rotations of both the eyeballs to the surface 59 including a point P is set to L. Further, it is not shown in figures in patent document 3, but an equal dividing point of the centers of rotations of both the eyeballs, which also is a point on the object surface 59, is set to a point q. The point q is defined to be an intersection point where lines of fixations Lr, Ll from the centers of rotations of both the eyeballs in a front direction and the surface 59 cross. Viewing angles of the lines of fixations Lr and Ll are set to $\alpha_R$ and $\alpha_L$, and viewing angles of lines of fixations 54 and 55, from the lines of fixations Lr and Ll, are set to $\Delta\alpha_R$ and $\Delta\alpha_L$, respectively.

Then, the position difference $\Delta P_H$ in the horizontal direction is expressed as follow:

$$\Delta P_H = L \times \tan(\alpha_R + \Delta\alpha_R) - L \times \tan(\alpha_L + \Delta\alpha_L) - PD$$

Further, a distance between the centers of rotations of both the eyeballs PD has the following relation, when using $(\alpha_R)$, $(\alpha_L)$, and L:

$$PD = L \times \tan(\alpha_R) - L \times \tan(\alpha_L)$$

The difference in the horizontal direction is described as dividing the positional difference in the horizontal direction by an object distance L. Thus the following formula is established:

The difference in the horizontal direction=$\tan(\alpha_R+\Delta\alpha_R)-\tan(\alpha_L+\Delta\alpha_L)$ PD/L By substituting PD, the following is obtained:

The difference in the horizontal direction=$\tan(\alpha_R+\Delta\alpha_R)-\tan(\alpha_L+\Delta\alpha_L)-(\tan(\alpha_R)-\tan(\alpha_L))$ Here, only when $\Delta\alpha_R$ and $\Delta\alpha_L$ are sufficiently small at a center portion of the field of vision, the following approximation formula is established:

The difference in the horizontal direction=$\Delta\alpha_R-\Delta\alpha_L$

Therefore, "the difference in the horizontal direction" in patent document 3 represents, in a very limited narrow area of the center portion of the field of vision, a difference in an angle of convergence when the point P on the same surface 59 is viewed while making the angle between the lines of fixations Lr and Ll as a reference. However, this becomes a quantity which has no relationship with the angle of convergence in an area other than the center portion where $\Delta\alpha_R$ and $\Delta\alpha_L$ are large, and this becomes a value which has no basis in physiology.

If the difference in horizontal direction, which has no physiological basis, is used as-is as an evaluation function, it can be understood that it has the following problems for an evaluation of a performance of a pair of eyeglasses.

1. The point P and the point q must be on the same object surface 59 as with the explanation figure of Zeiss. Therefore, except for a surface for which the object surface is parallel to the frontal plane, for the difference in the horizontal direction, the reference point changes for each of the distances to the object and it cannot be an evaluation method for a whole of the lens. Namely, it does not have a property as an aberration.
2. When the object is the same object surface 59 as with the Zeiss patent, it becomes a single basis, and it has a property as an aberration. However, when $(\alpha_R)$, $(\alpha_L)$, $(\Delta\alpha_R)$, and $(\Delta\alpha_L)$ become large, since the tangent has a non-linearity with respect to an angle, it does not match with the angle of vergence that is represented by the difference of the angles $\Delta\alpha_R-\Delta\alpha_L$. Therefore, the difference in the horizontal direction does not have a physiological basis in a periphery of the visual field.
3. Similarly, when the lines of fixations 14 and 15 shift from the horizontal surface, it becomes different from the original angle of convergence.

According to the above explained definition of patent document 3, it cannot be a single uniform definition throughout the whole of the object surface, and it becomes an evaluation function having no physiological basis around the periphery of the visual field. It is improper to evaluate a binocular vision using an unclear definition which does not have any basis.

Next, differences between a fixation line according to the ray tracing method in the present invention and an actual fixation line are explained in detail. With respect to the surface parallel direction, there is an arbitrary correspondence relationship within divergence boundaries and convergence boundaries of eyeballs. Therefore, it is possible that, in the surface parallel direction of the lines of fixations 13L0' and 13R0' in FIG. 11 and FIG. 12, they always pass through the evaluation point 12. Here, it is explained in accordance with non-patent document 15. When setting an ipsilateral binocular movement to $\theta$, a contralateral binocular movement to $\mu$, a momentum of the right eye to $M_R$, a momentum of the left eye to $M_L$, the Hering's law of equal innervations can be expressed by the following formulas:

$$\theta + \mu/2 = M_R$$

$$\theta - \mu/2 = M_L$$

Then, within the divergence boundaries and the convergence boundaries of the eye balls, arbitrary $M_R$ and $M_L$ can be expressed in terms of $\theta$ and $\mu$. Namely, by arbitrarily moving the left and right eyeballs through the ipsilateral binocular movement and the contralateral binocular movement, in the surface parallel direction, it is possible to pass through the evaluation point 22.

However, in the surface perpendicular direction, actually, the left and right eyeballs cannot rotate independently. Therefore, it seems that the eyeballs cannot rotate in accordance with the calculation method of the lines of fixations according to the present invention, at a glance. However, a vertical fusional vergence of a motor fusion is possible through a motion, and it is possible through a sense in the surface perpendicular direction in the Panum's fusional area. A fusion in the surface vertical direction has a threshold value, but it is possible, if it is involuntary. Therefore, by the lines of fixation through the ray tracing method, a convergence aberration in the surface perpendicular direction does not contradict with the actual lines of fixations. However, if the vertical fusional vergence that is greater than or equal to the threshold value becomes the surface perpendicular component, then of course, it cannot be realized. The calculation method by the lines of fixations with the ray tracing method in the present invention is a means to determine whether it is possible or not.

In this embodiment, the above error in power, the residual astigmatism, the convergence aberration and the prism value as a scalar quantity that does not include a vector as a direction are calculated as aberrations belonging to the evaluation point (usually every pitch of 1-10 degrees in the binocular vision direction in the whole lens surface, and there are some cases in which the lines of fixations exist only one of the left direction and the right direction, but the points are also reference points) of the object in the binocular vision direction in the Object—Eyeglass Lenses—Binocular Eyeballs System. For the prism, since a degradation of the visual acuity by a chroma aberration is in proportion to an amount of the prism, not to a difference of the prism, it is not regarded as an aberration and it is used as-is. Further, the reason why there is no binocular prism aberration can be easily understood through interpreting that they are substituted by the convergence aberration.

The convergence aberration is considered from a functional aspect of living systems, for example, from the facts that a vergence latency is 150-200 ms, an impulsive eyeball movement is for 200 ms and about 800 times/sec, a movement control is 350-400 ms, and a pupillary near response is 400-450 ms. In this case, among the movements of lines of fixations of an object, during a disparity-induced convergence movement which is a combination of the convergence and the impulsive eyeball movement, the control and the pupillary near response are constant or almost do not change in comparison with the convergence and the impulsive movement. Therefore, the convergence aberration is considered as an aberration having a higher priority than other aberrations, the error in power, and the residual astigmatism, except in a line of intersection which passes through a reference point, namely, at an arbitrary lens evaluation point. Regarding the disparity-induced convergence movement, it is described in detail in "Adaptive change in dynamic properties of human disparity-induced vergence," Takagi M, et al., Invest Ophthalmol. Vis Sci, 42, (2001), P. 1479-1486. Namely, during a time between the object 12 in FIG. 11 and the object 22 in FIG. 15, a suppression during jumping works and it is a state in which it is not possible to see. Therefore, these are related in a short time difference with each other, and the relation of the aberration holds.

(6) Detailed Explanation of the Fourth Step S4 (Categorization of Fusional State Based on the Convergence Aberration and the Error in Power)

It is determined whether the error in power and the convergence aberration obtained through the third step S3 are within the relative accommodation, the relative convergence and the vertical fusional vergence. Further, as a unit of the error in power, diopter is used. Additionally, the convergence aberration defined in the present invention is in unit of the angle of convergence, and a meter angle (M.A.), a unit in minute (arcmin), or prism diopter ($\Delta$ in symbol) is used. When the error in power and the convergence aberration are within the relative accommodation, the relative convergence, and the vertical fusional vergence, it is the motor fusion or the sensory fusion, and the fusion is possible.

Specifically, for the motive fusion, when the convergence aberration at a time when the line of fixation moves from the design reference point 12 of the object to the arbitrary object 22 is within the positive relative convergence, the negative relative convergence, and the vertical fusional vergence, it means that a fusion condition is satisfied with respect to the convergence. At the maximum value in the range, since it is the limit of the motor fusion, there is a risk of fatigue. Therefore, it is preferable that a standard range within which the fusion is possible with comfort is set to the Percival's zones of comfort (within one third of a center of a range of a relative convergence, the relative convergence being the sum of the positive relative convergence and the negative relative convergence, and within 3 prism diopter for the angle of convergence). Further, it is preferable that the positive relative convergence and the negative relative convergence, which are approximately equivalent, are within one third of themselves. The same can be said for the error in power. Namely, when it is within the positive relative convergence and the negative relative convergence, and further, within the positive relative accommodation and the negative relative accommodation, then the fusion is possible. The Percival's zones of comfort are valid for the error in power. Namely, the ranges of $\frac{1}{3}$ are preferable. For the vertical fusional vergence, it is only measured in the vertical direction in which the eyeballs cross, and it is preferable that it is $\frac{1}{3}$ of itself, in accordance with the relative convergence and the relative accommodation. As above, when the error in power and the convergence aberration are within the relative measurement values, preferably, within $\frac{1}{3}$, it is categorized as the fusion, and if any one of them is greater, then it is categorized as the fusion disabled.

Here, the relative measurement values are affected by many factors. The relative measurement values may vary depending on, for example, brightness, the convergence, static or dynamic self-adjustment of the accommodation, and a spatial frequency of the object to be measured. Therefore, they should be measured under a condition which is equivalent to a main environment of usage of the eyeglasses.

Further, the motor fusion and the sensory fusion have spatial anisotropies. Therefore, they are different depending on a position of the eyes, namely, among a first position of the eyes, a second position of the eyes, and a third position of the eyes. Especially, at the third position of the eyes, when the eyeballs move according to the Listing's law, horizontal axes of the eyeballs are not parallel to a surface including a middle line between the lines of fixations 13R and 13L and a line segment 2 between the eyeballs. Therefore, for the motor fusion and the sensory fusion, which are properties of the binocular vision, the relative convergence, the vertical fusional vergence, and the shape of the Panum's fusional become slightly different, logically and mathematically. Further, it is logically and mathematically predicted that, at the third position of the eyes, they become different between an ipsilateral binocular eyeball movement and a contralateral binocular eyeball movement. However, when the rotational movements of the eyeballs occur concurrently with the movements according to the Listing's law, then the logical and mathematical conclusion described above does not hold. The above measurement of the change in the shape of the area is not performed at the time of the present application. Therefore, in the present invention, the relative measurement values at the other positions are represented by the relative measurement value at the first eye position.

Furthermore, at the third position of the eyes, there is an element of an eyeball rotation. Presently, quantitative understanding of this effect is insufficient. However, it is observed that it rotates so that the motor fusion becomes easy. Naturally, as an effect of the rotation, the Listing's law itself does not change (the Listing's law has nothing to do with the eyeball rotation, in the first place), but it affects the subsequent calculations of the residual astigmatism and the calculations of the values of the relative convergence and the relative accommodation, and the calculation of the visual acuity described below. In the present invention, the effect of the rotation is not explained. In the present invention, individual relative measurement values may be used, but a standard motor fusion and a standard sensory fusion may be utilized.

An area of the motor fusion and an area of the sensory fusion have been measured by many researchers, and they are as the Table 1 and the Table 2. Further, these results depend on the spatial frequency of the object, the object distance, the age, and the position of the eyes. Since the individual difference is very large, they are reference values. However, from these results, it can be understood that the motor fusion and the sensory fusion differ about 10 times in the horizontal direction and about 5 times in the vertical direction.

That the error in power and the convergence aberration become within the relative accommodation and the relative convergence means that, by moving the both eyeballs rapidly, ranges are set to the ranges within which the sensory fusion is enabled. Next, when the error in power becomes within the focal depth and the convergence aberration is in the Panum's fusional area, then the sensory fusion becomes possible. Both the focal depth and the Panum's fusional area depend on the spatial frequency and a viewing angle of the object. Usually, the focal depth is 0.3 diopters, and it is $2\Delta$ in the horizontal direction and $1\Delta$ in the vertical direction. When the above fusional conditions are satisfied, a sense of depth, namely, a condition of the binocular stereoscopic view is satisfied.

To summarize the classification of the motor fusion (fusion disabled, motor fusion, sensory fusion), the areas of the fusion disabled and the fusion are classified using the relative measurement values. Specifically, a three dimensional space, such that the horizontal axis is set to the relative convergence, the vertical axis is set to the vertical fusional vergence, and the depth is set to the relative accommodation, can be considered. At that time, for the relative convergence, the positive relative convergence and the negative relative convergence are set to the threshold values, and these are compared with the surface parallel component of the convergence aberration. And, if the surface parallel component of the convergence aberration is within the threshold values of the positive relative convergence and the negative relative convergence, then it is within the area of the motor fusion in the horizontal axis. At the same time, for the vertical fusional vergence of the motor fusion, the surface perpendicular component of the convergence aberration is compared while setting the vertical fusional vergence as a threshold value. And, if the surface perpendicular component of the convergence aberration is within the threshold value of the vertical fusional vergence, then it is within the area of the motor fusion in the vertical axis. At the same time, for the relative accommodation, the error in power is compared while setting the positive relative accommodation and the negative relative accommodation as threshold values. And, if the error in power is within the threshold values of the positive relative accommodation and the negative relative accommodation, then it is within the area of the motor fusion in the axis of depth. Namely, when the error in power and the convergence aberration are simultaneously within the three threshold values of the relative measurement values, the area is the area of the motor fusion. The area becomes the area of the fusion disabled, if any one of the conditions is not satisfied. Further, when the respective axes have mutual relationships, for example, inside of a region surrounded by a polyhedron, for which apexes are the relative measurement values, means a region where the motor fusion is possible. Further, because of the characteristic of the vertical fusional vergence, a phenomenon of diverging the eyeballs in the vertical direction is not observed. Therefore, in the axis of the vertical fusional vergence, the threshold value in the divergent direction is 0. Hence, there are five relative measurement values in total, inside of a closed surface of a pentahedron is the region of the motor fusion. Additionally, since it is a living body, it is expected that these apexes are not strictly a polyhedron, but an ellipsoidal body.

Further, the closed surface, which shows a space of the threshold values of the motor fusion, varies depending on the position of the eyes. The first and the second positions of the eyes are the same, and for the case of the third position of the eyes, the closed surface is approximately equal to the closed surfaces of the first position and the second position. For the closed surfaces of the first and the second positions of the eyes, the respective axes (the respective axes of the relative convergence, the vertical fusional vergence, and the relative accommodation) have mutual relationships. For the closed surfaces of the first and the second positions of the eyes, the relative measurement values are the threshold values of the respective axes. Preferably, from the view point of the visual fatigue, they are the closed surfaces which are seen to be almost ellipses, when viewing from any axis, for which the maximum value is the one third of the measurement value.

Similarly, in the focal depth and the Panum's fusional area, the area of the motor fusion may further be classified into the area of the motor fusion and the area of the sensory fusion. For example, when a component perpendicular to the median surface of the Panum's fusional area is set to a surface parallel component, the surface parallel component of the convergence aberration is within the surface parallel component of the Panum's fusional area, and at the same time, when a component parallel to the median surface of the Panum's fusional area is set to a surface perpendicular component, the above described surface perpendicular component of the convergence aberration is within the surface perpendicular component of the Panum's fusional area, and at the same time, the error in power is less than or equal to the focal depth, then it is set to an area of the sensory fusion. And, if any one of the threshold values is not satisfied, then it can be set to an area of the motor fusion. In the area of the sensory fusion, by the definition, there is no eyeball movement. Therefore, the area of sensory fusion is not symmetrical in the vertical direction as with the area of the motor fusion, and it is substantially an octahedron, or it forms a closed surface, which is seen to be almost an ellipse, when viewing from any of the axes.

(7) Detailed Explanation of the Fifth Step S5 (Addition Processes for Respective Evaluation Points)

At the fourth step S4, the classification into the fusion disabled, the motor fusion, or the sensory fusion, has been performed at an evaluation point. At the fifth step S5, the respective visual functions of the left and right eyes are calculated using the relative measurement values.

Even if the fusion is impossible, it is possible to see in a diplopia condition. Namely, a ray emitted from an evaluation point of the object passes through the lens and reaches to the central fovea on the retina through the center of rotation of the eyeball. The respective visual functions of the left and right eyes are calculated, while taking the positive relative accommodation, the negative relative accommodation, and preferably a physiological astigmatism, which are the error in power occurred at the lens at that time, the residual astigmatism, the prism, and characteristic values of the eyeballs, and which have been defined as the relative measurement values of the individual elements in the present invention, as factors. Here, the physiological astigmatism is a slightly added astigmatism degree in a phenomenon such that the visual acuity is improved when the small astigmatism degree is added separately from the subscribed astigmatism degree, when the eyeball is in an adjustment state. This astigmatism degree is −0.75 diopter, when it is derived from the Peters diagrams of FIG. 39-FIG. 41. Further, since the visual functions take the measured eyesight value derived from the Peters diagrams and the optical aberration occurred at the lens, and the characteristic values of the eyeballs as factors, they are not the functions which are merely obtained from the optical quantities. In addition, by the definition, the positive relative accommodation and the negative relative accommodation are the same for the left and the right eyes.

Next, as it has already been described, a value of the binocular visual acuity function is equal to the better one of the visual acuities of the left or right eyes, or if the visual acuities of the left and right eyes are the same, then it increases by 10% from them. The visual acuity here is the visual acuity expressed in the decimal point representation. It is preferable that the visual function in the present invention is expressed in terms of the normalized logMAR unit. A value increased by 10% in the decimal point representation is equivalent to a value subtracted by a value of $\log_{10}(1.1)$ in logMAR representation. In the present embodiment, when the fusion is impossible, then it is better one of the left and right eyes (the smaller value, since they are expressed in the normalized logMAR). Further, in the range within which the motor fusion and the sensory fusion are possible, it is a value close to the value of the design reference point, and the corrected visual acuities of the left and right eyes become almost the same values. Therefore, it is the value which is increased by 10% from the better one of the visual acuities, namely, a value subtracted by $\log_{10}(1.1)$. With respect to the above state of the convergence, the respective values are defined to be the values of the binocular visual acuity function.

Here, a relationship among the evaluation function, the binocular visual acuity function, and the visual function is as follows. Namely, the function, for which the binocular visual acuity function which includes the relative measurement values as factors is modified by subtracting the minimum value of the binocular visual acuity function so that it becomes positive values, and it is squared and added at the evaluation point of the object, is set to the evaluation function at the time of optimization calculation. Hereinafter, this evaluation function is called the evaluation function of the present invention. This relationship is expressed using a formula (1) shown in Expression 4 described below.

[Expression 4]

$$\text{Evaluation function} = \Sigma^n_{i=1}[W_i \times (B_i - \min B)]^2 \quad (1)$$

In the formula (1), $W_i$ represents a weight at the i-th evaluation point of the object represented in the binocular view direction. Hereafter, the suffix i means the i-th evaluation point. The weight varies depending on importance of a usage condition at respective position (evaluation point) within the eyeglass lens. Naturally, the weight is large at the design reference point, and the weight is small at the lens periphery. Further, usually, the frame is deformed in accordance with the lens, using heat or a pincer for an eyeglass. However, there are some frames which are not deformable, namely, there are frames that define shapes of lenses. In this case, it becomes easier to deform by reducing the weight $W_i$ at the lens periphery. For the weight of the deformation, it is preferable that the weight is large at the design reference point and the weight is small at the lens periphery. $B_i$ is an i-th binocular visual acuity function, and minB is an arbitrary constant which is smaller than the minimum value of n pieces of binocular visual acuity functions. Preferably, since the rate of improvement of the binocular vision is 10%, it should be $-\log_{10}(1.1)$. The binocular visual acuity function B, is expressed by a formula (2) shown in Expression 5 described below.

[Expression 5]

$$B_i = \min(AVR_i, AVL_i) + C \quad (2)$$

Here, $AVR_i$ and $AVL_i$ represent the right and left visual functions at the i-the evaluation point. C is a value such that, if the right and left convergence aberrations and the errors in power are within the tolerances of the relative measurement values explained in the fourth step, then the fusion is possible and the value becomes minB, which is the constant of the improvement of the binocular visual acuity, and if the right and left convergence aberrations and the errors exceed the relative measurement values, it becomes 0.

Here, the tolerances are said to be a closed surface such that the values of the binocular visual acuity function, the binocular visual acuity function including the above described relative measurement values as factors, are set to threshold values, when a three dimensional space, such that the horizontal axis is set to the relative convergence, the vertical axis is set to the vertical fusional vergence of the motor fusion, and the axis of depth is set to the relative accommodation, is considered as the tolerances. Additionally, it is a similar expression, but, as the tolerances, they can be a closed surface resembling to an ellipse, such that the respective axes have mutual relations and a coordinate component of each axis is one third of the relative measurement value, for the reason of comfort.

Next, $AVR_i$ and $AVL_i$ are i-th visual functions for single eye described in the background art. Simply describing, they become a formula (3) shown Expression 6 described below.

[Expression 6]

$$AVR_i = ak \times \sqrt{(PE_i - AA)^2 + \left(\frac{bk \times AS_i}{2}\right)^2} + ck \times \frac{P_i}{v} \quad (3)$$

In the above described formula (3), ak and bk are coefficients calculated from the Peters diagrams, and it can be read from the Peters diagrams shown in FIG. 39-FIG. 41, that their numerical ranges are:

$0.25 \leq ak \leq 0.65$ $0.7 \leq bk \leq 1.1$

Further, ck is a value calculated by an experiment and it is as follows:

$$0.2 \leq ck \leq 1.2$$

$PE_i$, $AS_i$, and $P_i$ are an error in power, a residual astigmatism, and a prism of i-th lines of fixation. ν is the Abbe number of the lens material.

AA is a function which includes the relative accommodation. The explanation of the formula (3) is omitted, since the explanation exists in the specification of PCT/JP2008/069791. This formula (1) is set to the evaluation function and the minimum value is calculated by an optimization calculation which repeats the second step S2—the fifth step S5, while shapes of the left and right lenses are slightly modified. When a desired convergence condition is satisfied, as a result of the optimization calculation, the setting value at the evaluation point is determined. And, the process proceeds to the calculation of the next evaluation point. When the calculations for the all evaluation points are done, the process proceeds to the sixth step S6.

The effect of the repeating of the steps is simply explained. The evaluation functions becoming lower is equivalent to that the binocular visual acuity functions become smaller in the repeating process of the steps. That the binocular functions become smaller means that the range of the fusion is expanding. Namely, the formula (2) affects such a way that they become so small that the binocular vision is enabled. Consequently, the improvement of the binocular visual acuity enlarges the range of the fusion and causes the condition of stereoscopic view to be satisfied. Therefore, it becomes difficult to cause the visual fatigue, and it becomes easier to recognize the object.

(8) Detailed Explanation of the Sixth Step S6 (Review Process of the Optimized Solution)

Here, the lens shape obtained at the fifth step S5 is reviewed. Especially, when the range of the sensory fusion at a neighborhood of the lens design reference point is small, then the eyeballs must always be in motion and there is no rest. Therefore, the visual fatigue tends to occur, and as an eyeglass, it is not suitable. Specifically, in the binocular view direction, for example, it is greater than or equal to 3 degrees. When projecting on the lens, for example, it is about 5 mm or more in diameter with its center at a design standard point. Such an extent of breadth is necessary for a stable prescription measurement of the design standard point of the eyeglass lens. Therefore, for example, when a condition of 3 degrees or 5 mm is not satisfied (when the determination at the sixth step S6 is "NO"), then it is determined that the lens is not suitable as an eyeglass lens and it is determined that the design is not possible, and the flowchart is terminated. When the condition is satisfied (when the determination at the sixth step S6 is "YES"), the process proceeds to the seventh step S7. At the seventh step S7, the shapes of the left and right eyeglass lenses are determined.

After determining the design values in this manner, the eyeglass lens according to the embodiment of the present invention can be provided through performing normal lens processing based on the optical design values.

[3] Embodiment (an Example of an Astigmatism Degree of 0D)

Next, an embodiment, for which an evaluation is performed in accordance with the eyeglass lens evaluation method according to the above embodiment, is explained.

(1) Embodiment 1

In this example, an example of a calculation of the binocular visual acuity for a case in which both left and right eyeglass lenses have the spherical diopter power of −4D and the astigmatism degree of 0D is considered. The results of the calculation are shown in FIG. 18-FIG. 21. This example is an example of an evaluation for a single focus eyeglass lenses, and no iteration calculation is performed for optimization. An object is set to a hemisphere surface of an infinite radius which is centered by the origin 1 in a viewing direction, in the coordinate system explained in the above described embodiment. Namely, the evaluation is performed for far view. The eyeglass lens is a general-purpose bilateral aspheric lens, and it is successfully corrected by a visual function according to patent document 2. In this example, in order to clarify the effect of the evaluation method of the present invention, a front tilt angle, an elevation angle, and an eccentricity of the lens are set to 0. The distance from the apex of a cornea to the center of rotation of the eyeball is 27.7 mm, the Abbe number is set to 32, the lens radius is set to 75 mm, and the pupillary distance is set to 62 mm. For the relative measurement values, the average value for 30 year-old is used.

Figure 18:
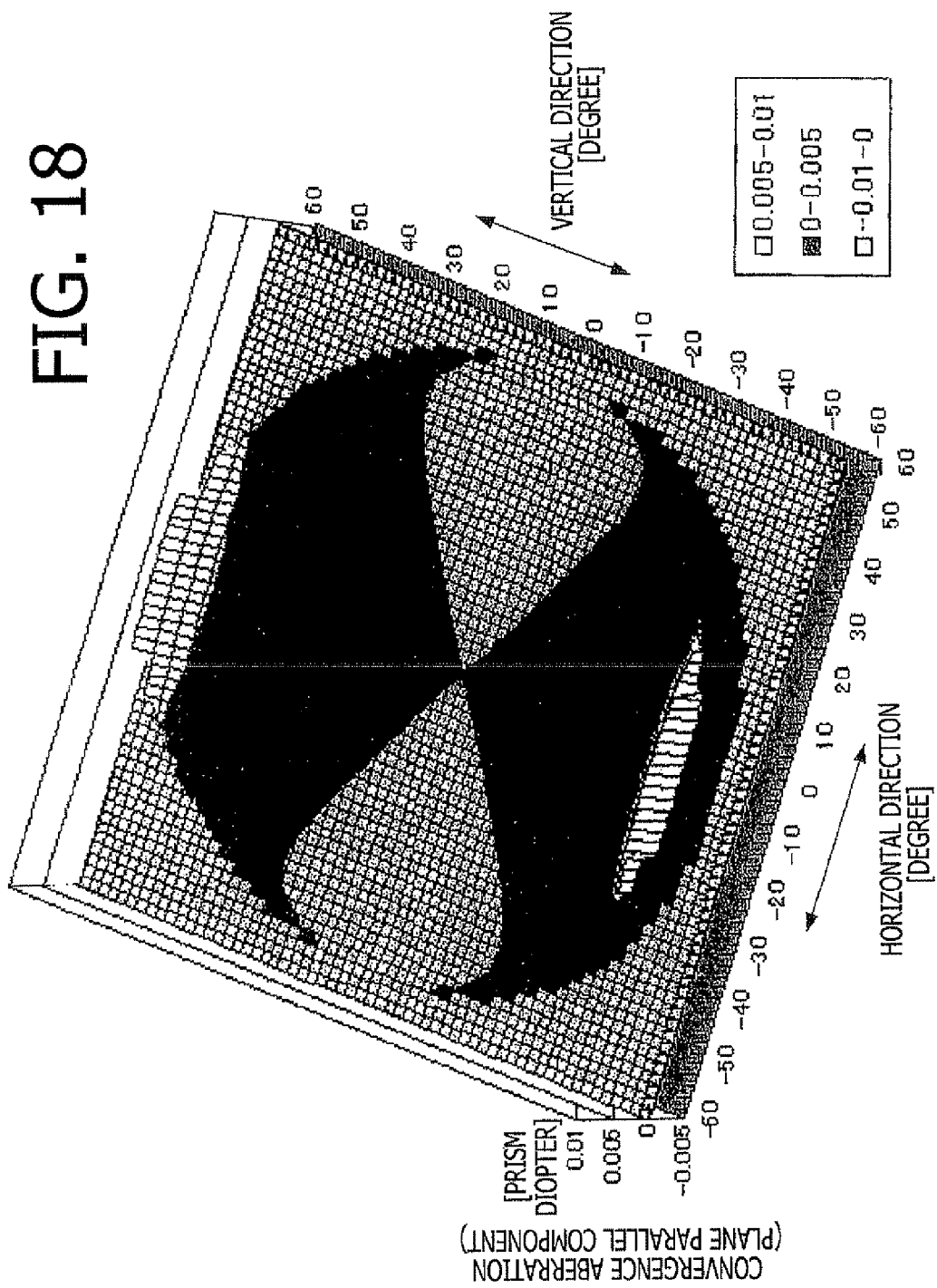
FIG. 18 is a diagram showing a surface parallel component of a convergence aberration of embodiment 1 in the eyeglass lens evaluation method of the present invention.
Figure 19:
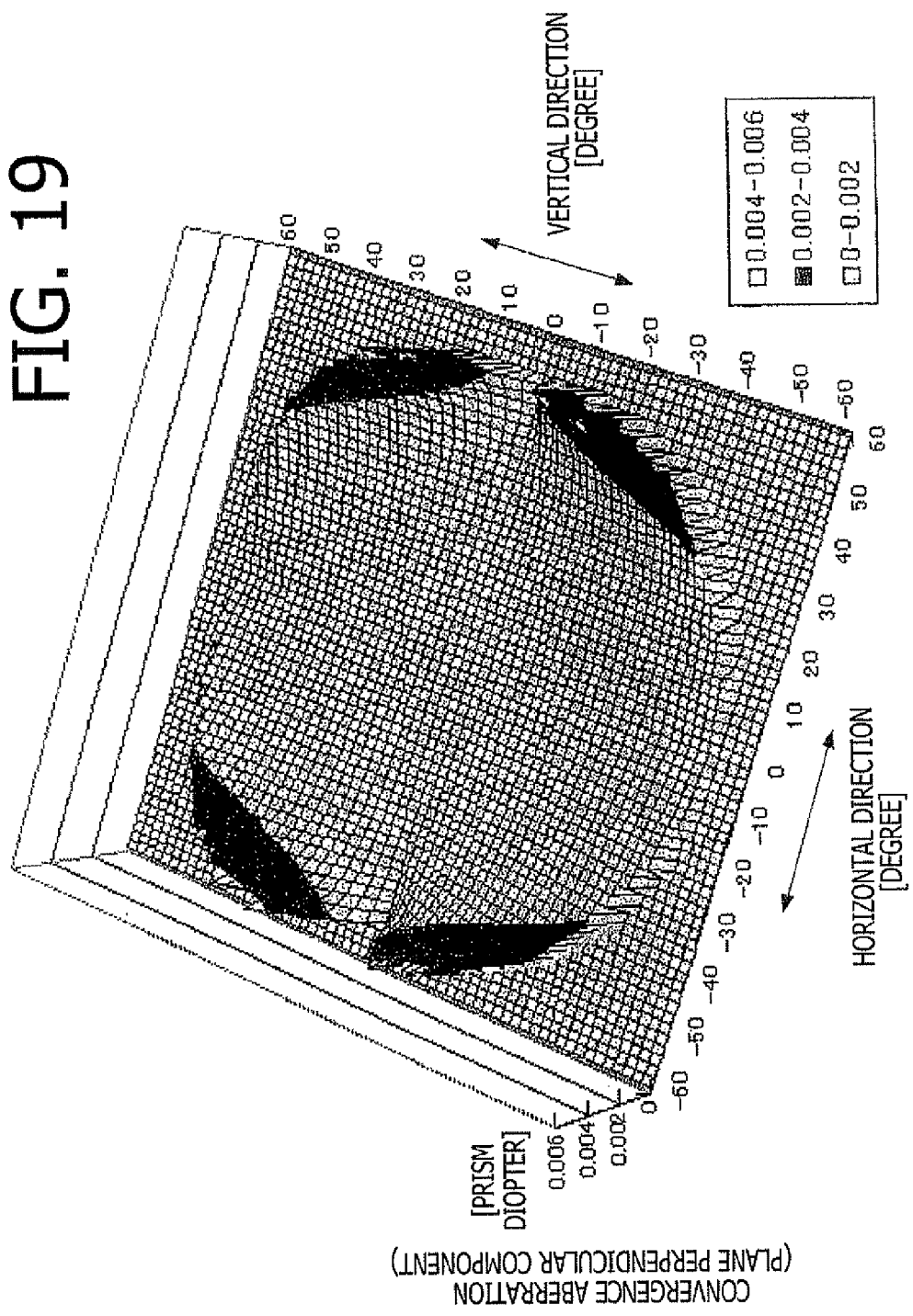
FIG. 19 is a diagram showing a surface perpendicular component of the convergence aberration of embodiment 1 in the eyeglass lens evaluation method of the present invention.
Figure 20:
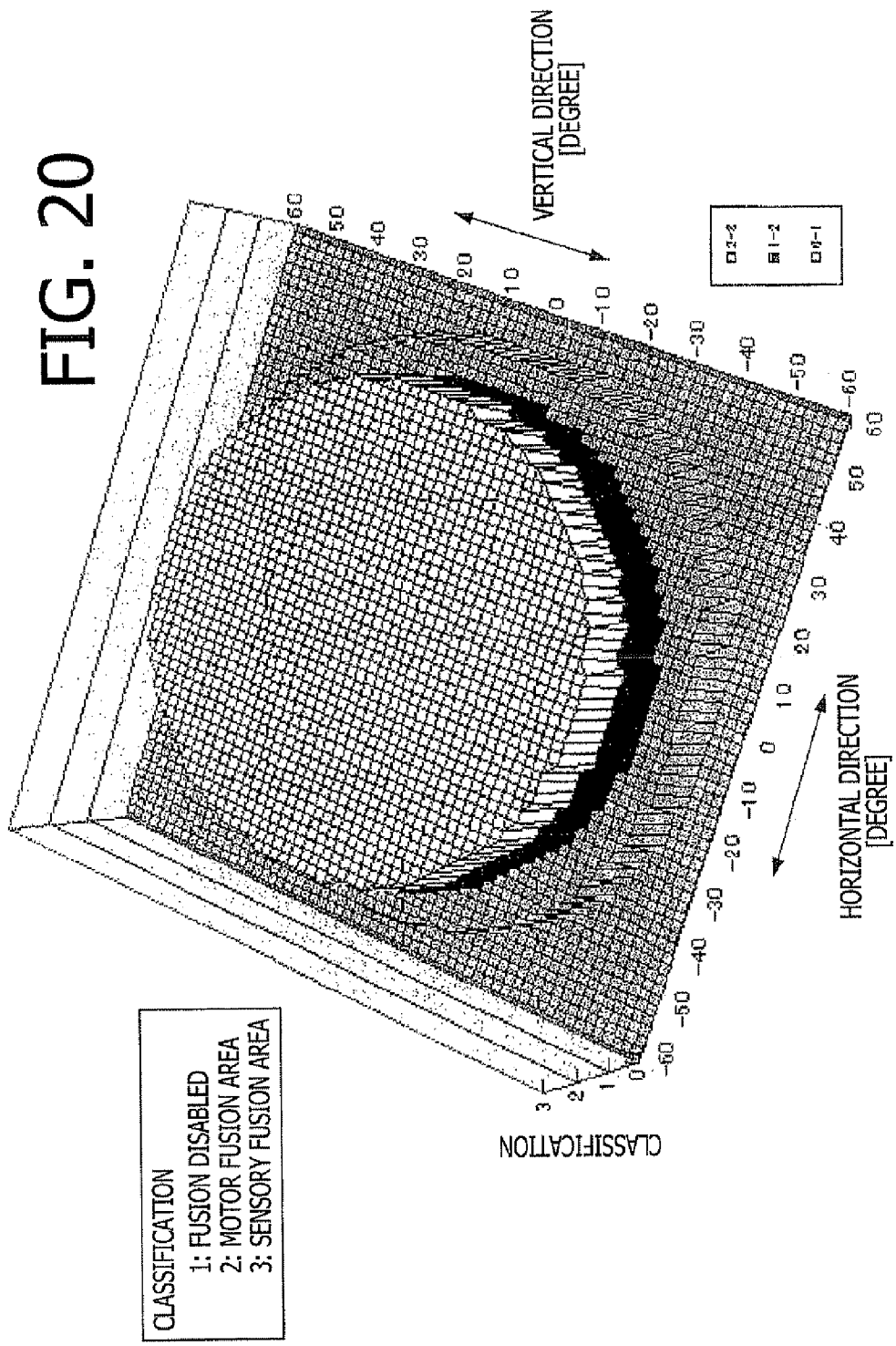
FIG. 20 is a diagram showing a field of fixation through eyeglass lenses for both eyes of embodiment 1 in the eyeglass lens evaluation method of the present invention.
Figure 21:
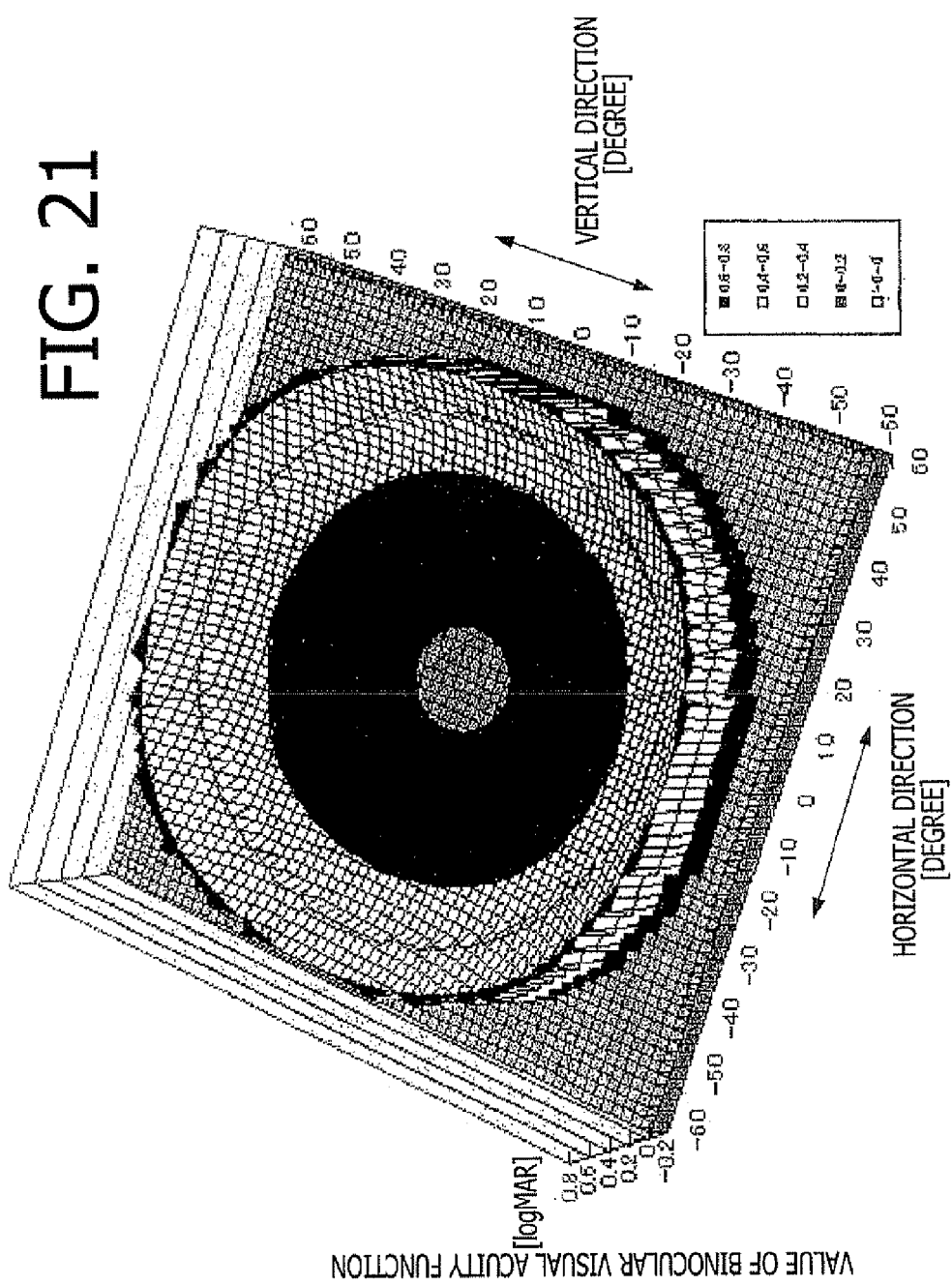
FIG. 21 is a diagram showing values of visual functions for both eyes of embodiment 1 in the eyeglass lens evaluation method of the present invention.

The four pieces consist of FIG. 18-FIG. 21 is a one set, and they diagrammatically show the evaluations at the respective evaluation points of the eyeglass lenses, and both the horizontal axis and the vertical axis are the binocular vision directions for all of them. The horizontal axis is the horizontal direction and the vertical axis is the vertical direction. The unit is in a degree of an angle. FIG. 18 shows the convergence aberrations in the surface parallel direction, FIG. 19 shows the convergence aberrations in the surface vertical direction, and the units in both are in a prism diopter. FIG. 20 is a field of fixation of the both eyes through the eyeglass lenses. In FIG. 21, the gray area represents the distribution where the relative convergence is impossible, the black area inside of the gray area represents the distribution within the motor fusion, and the white area inside of the black area represents the distribution of the sensory fusion, respectively. FIG. 20 shows the values of the binocular visual acuity function. The unit is in the logMAR unit. From FIG. 18 and FIG. 19, both the surface parallel components and the surface perpendicular components of the convergence aberrations are extremely small, and they are less than or equal to 0.005 prism diopter in almost all areas. Therefore, in the field of fixation shown in FIG. 20, almost all area of the binocular vision direction is covered with the area of the sensory fusion. Further, for the binocular visual acuity function shown in FIG. 21, it is not shown here, but the visual functions for left and right single eyes are 0 at the central portion which is close to the design reference point, and since the condition of the binocular visual acuity is satisfied, the values are negative values.

(2) Embodiment 2 (an Example in which a Difference Between Left and Right Spherical Diopter Powers is Greater than or Equal to −2D)

Figure 22:
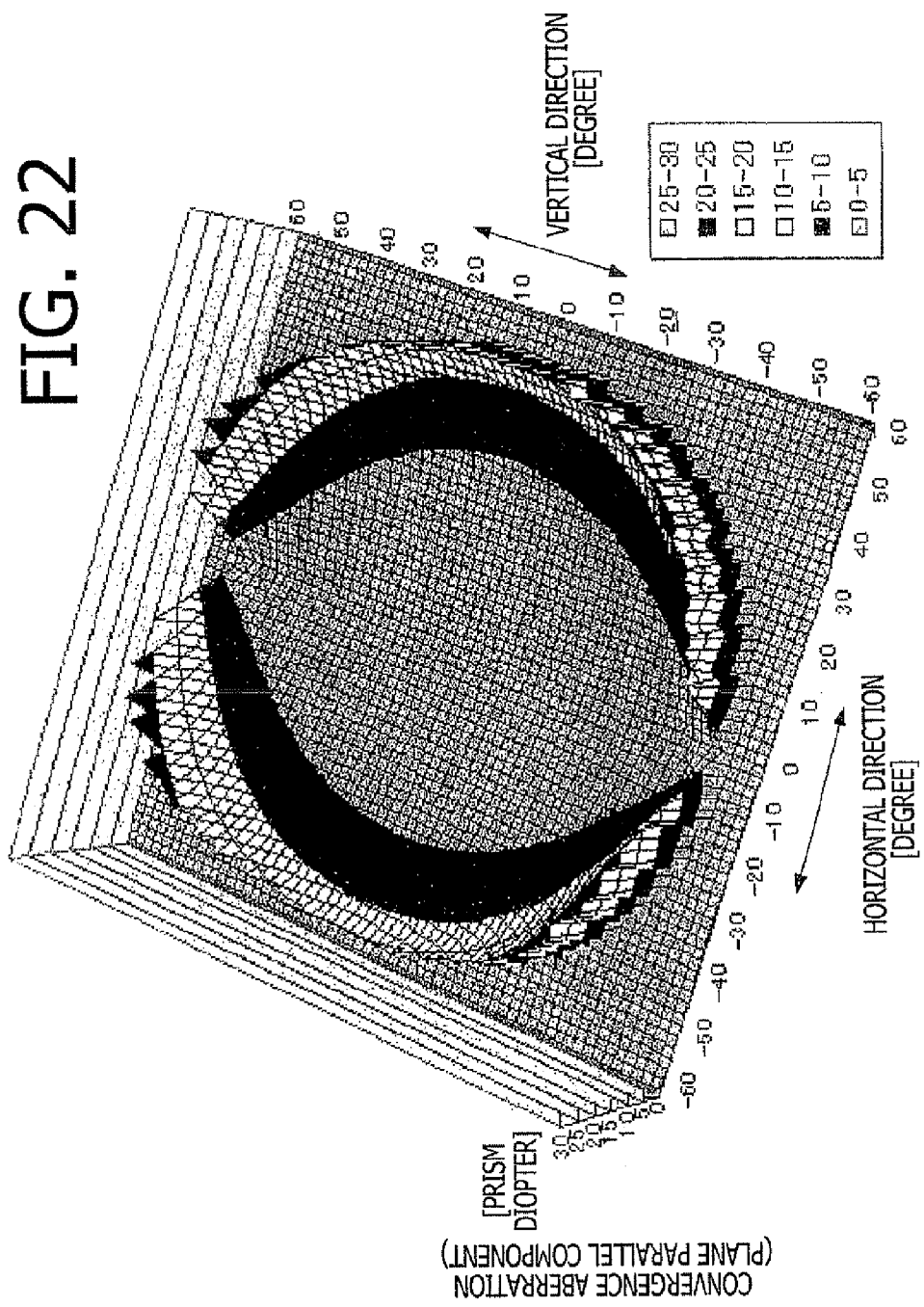
FIG. 22 is a diagram showing a surface parallel component of a convergence aberration of embodiment 2 in the eyeglass lens evaluation method of the present invention.
Figure 24:
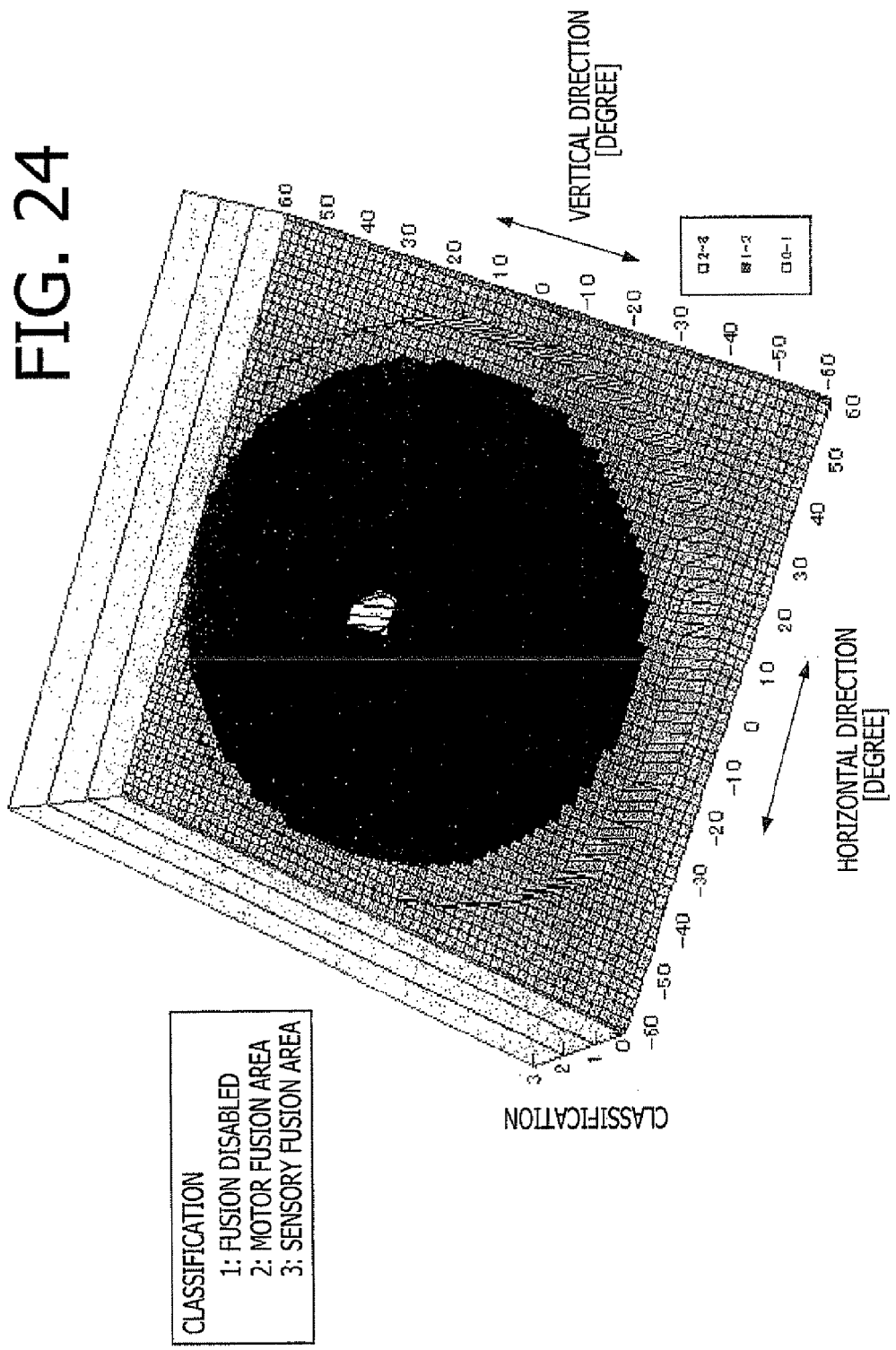
FIG. 24 is a diagram showing a field of fixation through eyeglass lenses for both eyes of embodiment 2 in the eyeglass lens evaluation method of the present invention.
Figure 25:
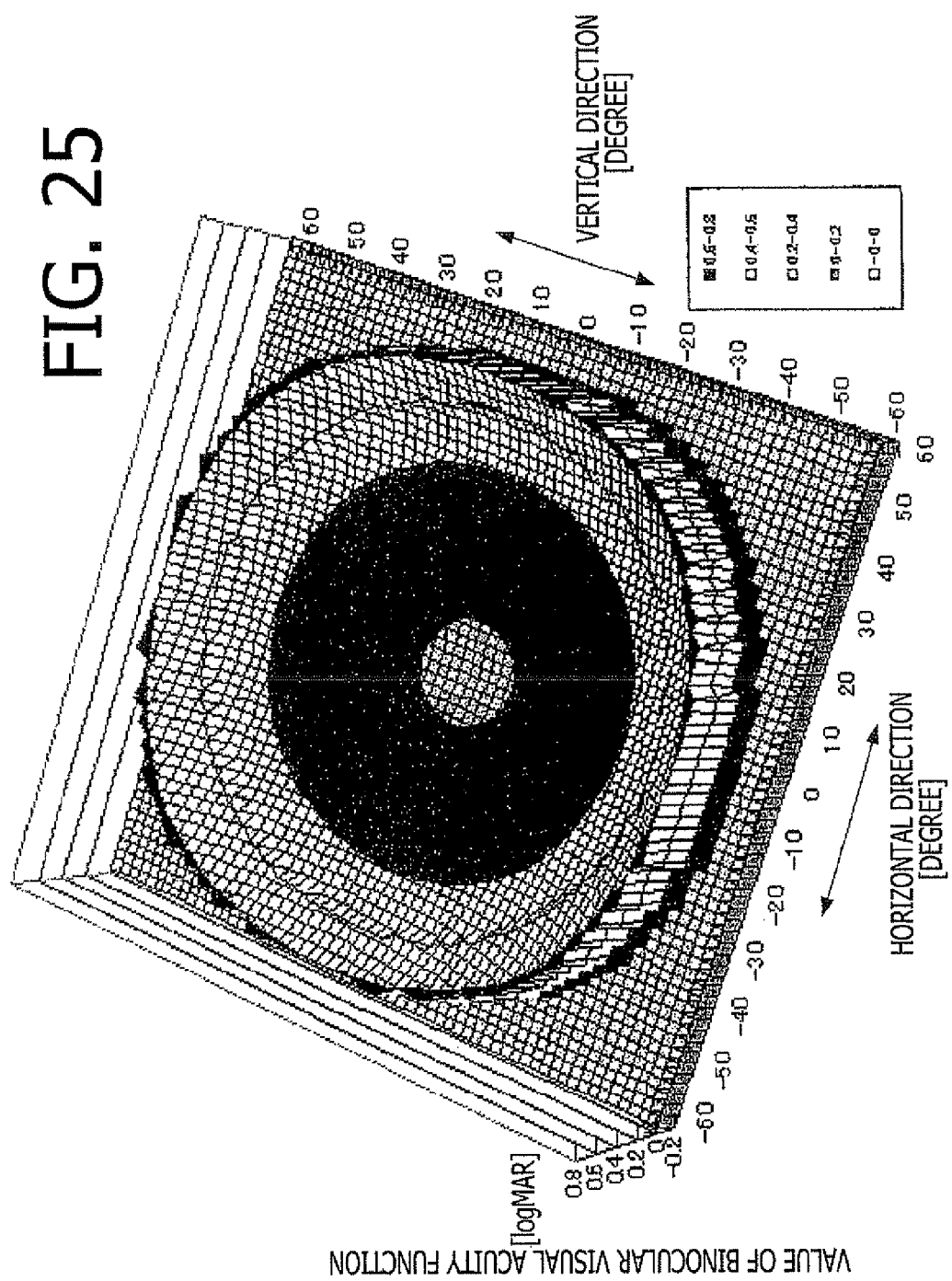
FIG. 25 is a diagram showing values of visual functions for both eyes of embodiment 2 in the eyeglass lens evaluation method of the present invention.

Next, as embodiment 2, an evaluation of eyeglass lenses, which is in general regarded as the definition of an anisometropia (greater than or equal to −2D, in left and right), is performed. In this example, the spherical diopter power of the right eyeglass lens is set to −4D, the astigmatism degree is set to 0D, namely, the right eyeglass lens is the same as the lens used in the above described embodiment 1. On the other hand, for the left eyeglass lens, the spherical diopter power is set to −6D, the astigmatism degree is set to 0D, and other conditions are set to the same as the above described embodiment 1. This example is also an example of an evaluation of eyeglass lenses, and no iteration calculation is performed for optimization. FIG. 22 is the convergence aberration in the surface parallel direction, FIG. 23 is the convergence aberration in the surface perpendicular direction, FIG. 24 is the field of fixation through the eyeglass lenses for both eyes, the FIG. 25 is the values of the binocular visual acuity function, and the units are the same as FIG. 18-FIG. 21, respectively.

Figure 23:
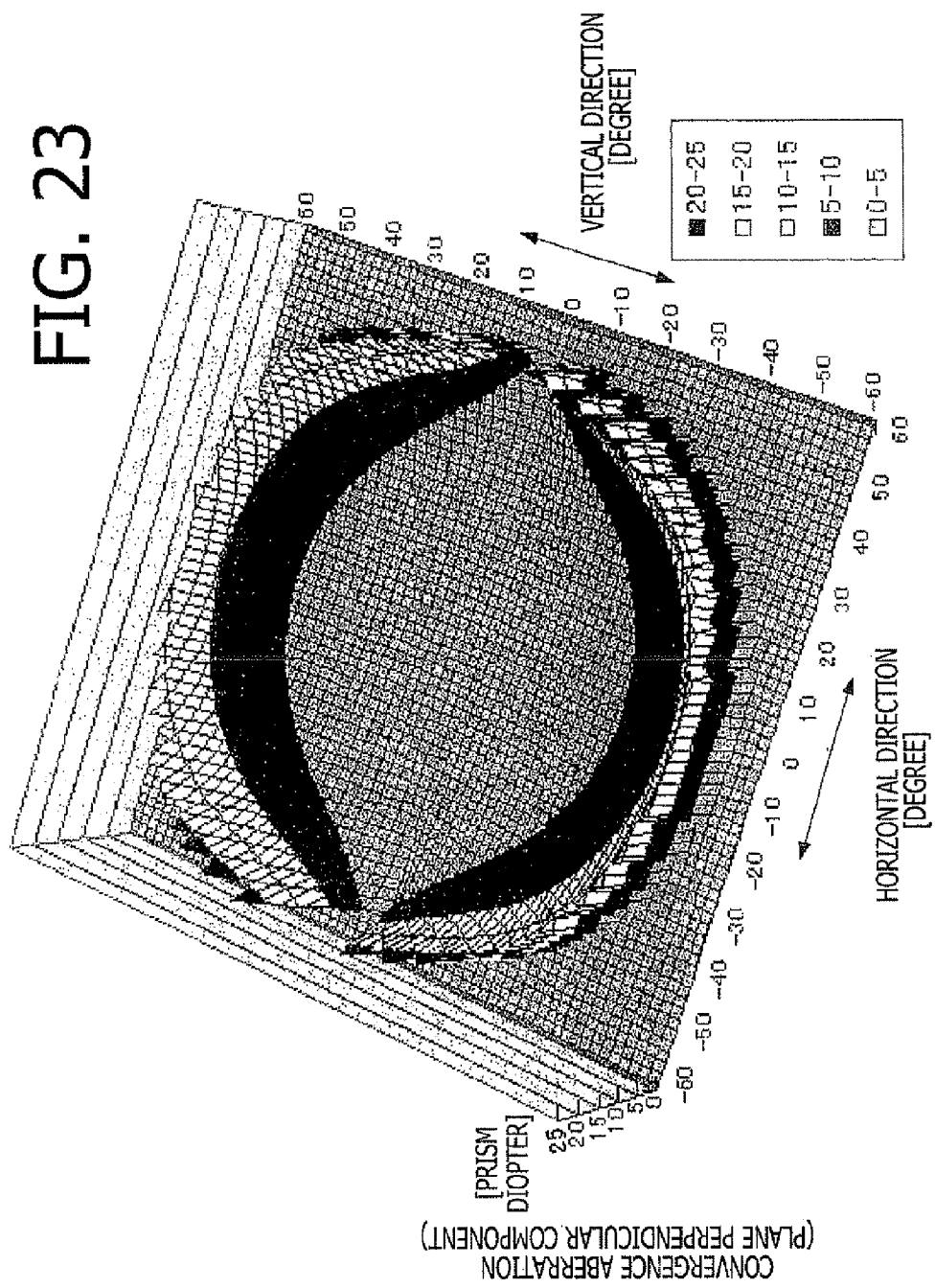
FIG. 23 is a diagram showing a surface perpendicular component of the convergence aberration of embodiment 2 in the eyeglass lens evaluation method of the present invention.

From FIG. 22 and FIG. 23, the surface parallel component and the surface perpendicular component of the convergence aberration are equally large. Therefore, for the field of fixation shown in FIG. 24, major parts are covered with the motor fusion (blackened area). The binocular visual acuity function shown in FIG. 25 is the same as FIG. 21 in the embodiment 1, and there is no problem as the visual acuity. However, from FIG. 24, the area of the sensory fusion at the center is small, and it can be said that the eyeballs cannot keep a stable state. Through this, it is confirmed that the eyeglass lenses having a difference of −2D between the left and right tends to cause the visual fatigue, that have been said from the past. In the embodiment 2, it is classified in the above described lens shape review process in the sixth step S6 that the area of the sensory fusion is small. Conventionally, the anisometropia lens haves been discussed in terms of magnifications. However, a problem can be raised such that the visual fatigue occurs, since the area of the sensory fusion becomes smaller by the convergence aberration.

(3) Embodiment 3 (an Example in which an Elevation Angle is 20 Degrees)

Figure 26:
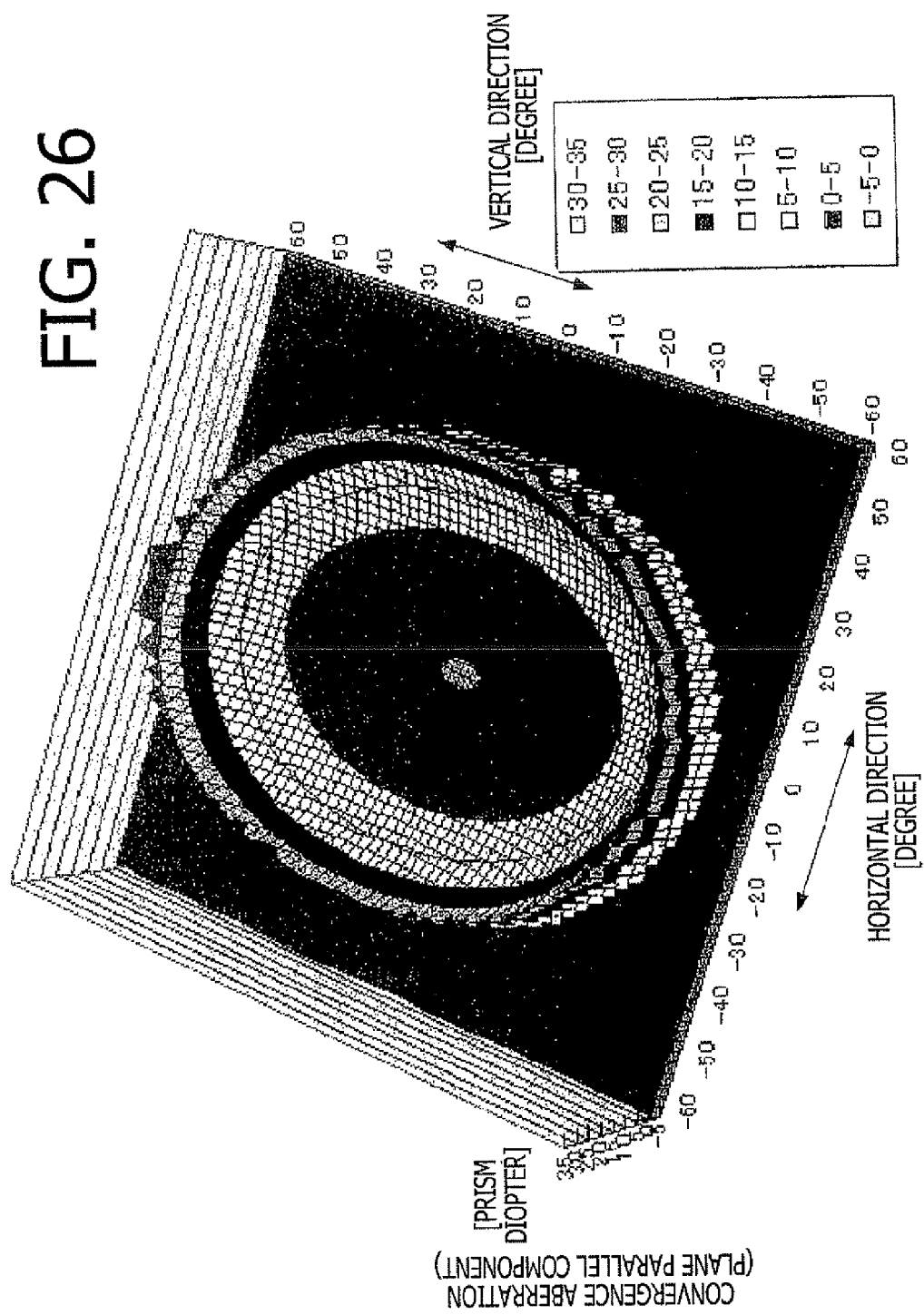
FIG. 26 is a diagram showing a surface parallel component of a convergence aberration of embodiment 3 in the eyeglass lens evaluation method of the present invention.
Figure 28:
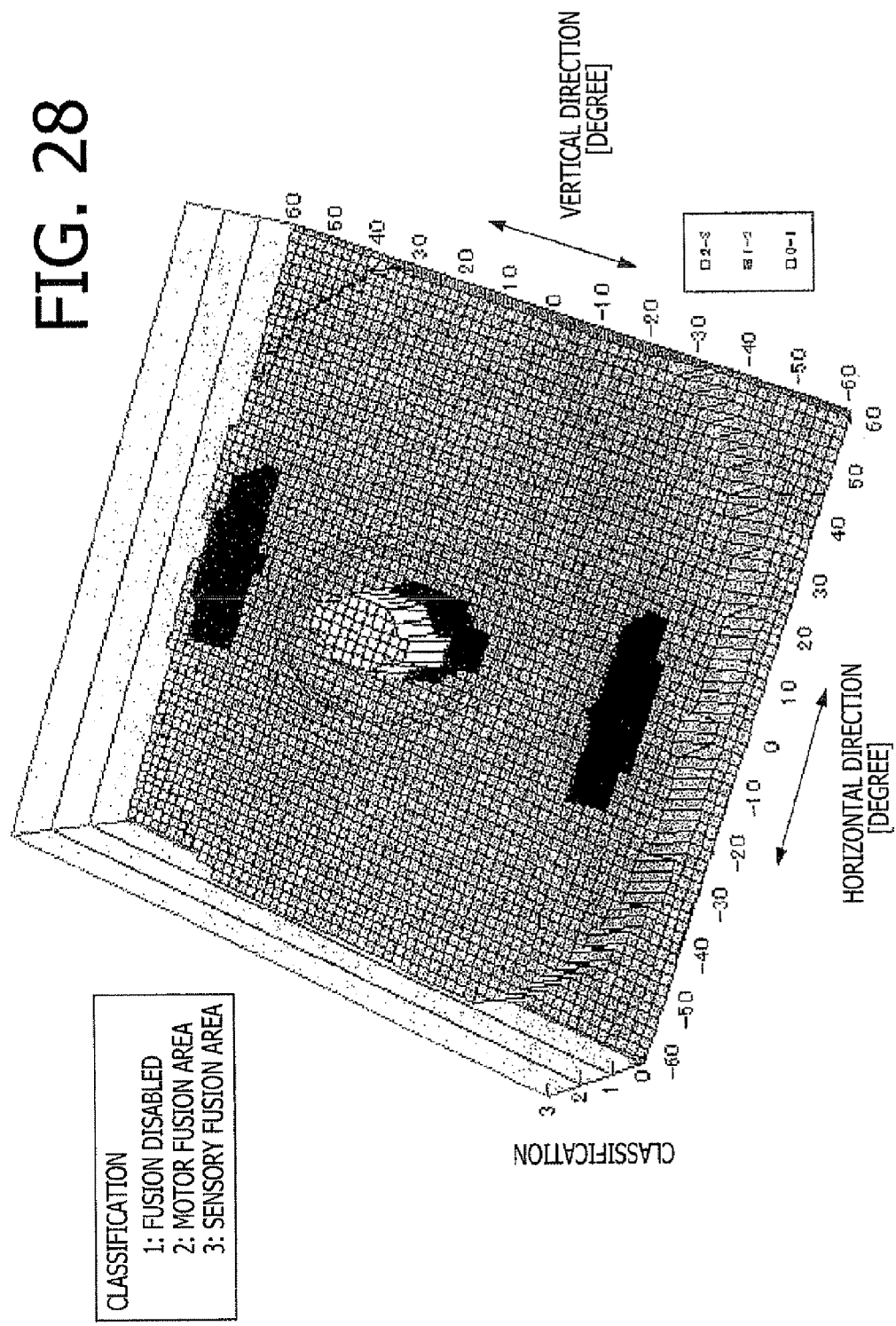
FIG. 28 is a diagram showing a field of fixation through eyeglass lenses for both eyes of embodiment 3 in the eyeglass lens evaluation method of the present invention.
Figure 29:
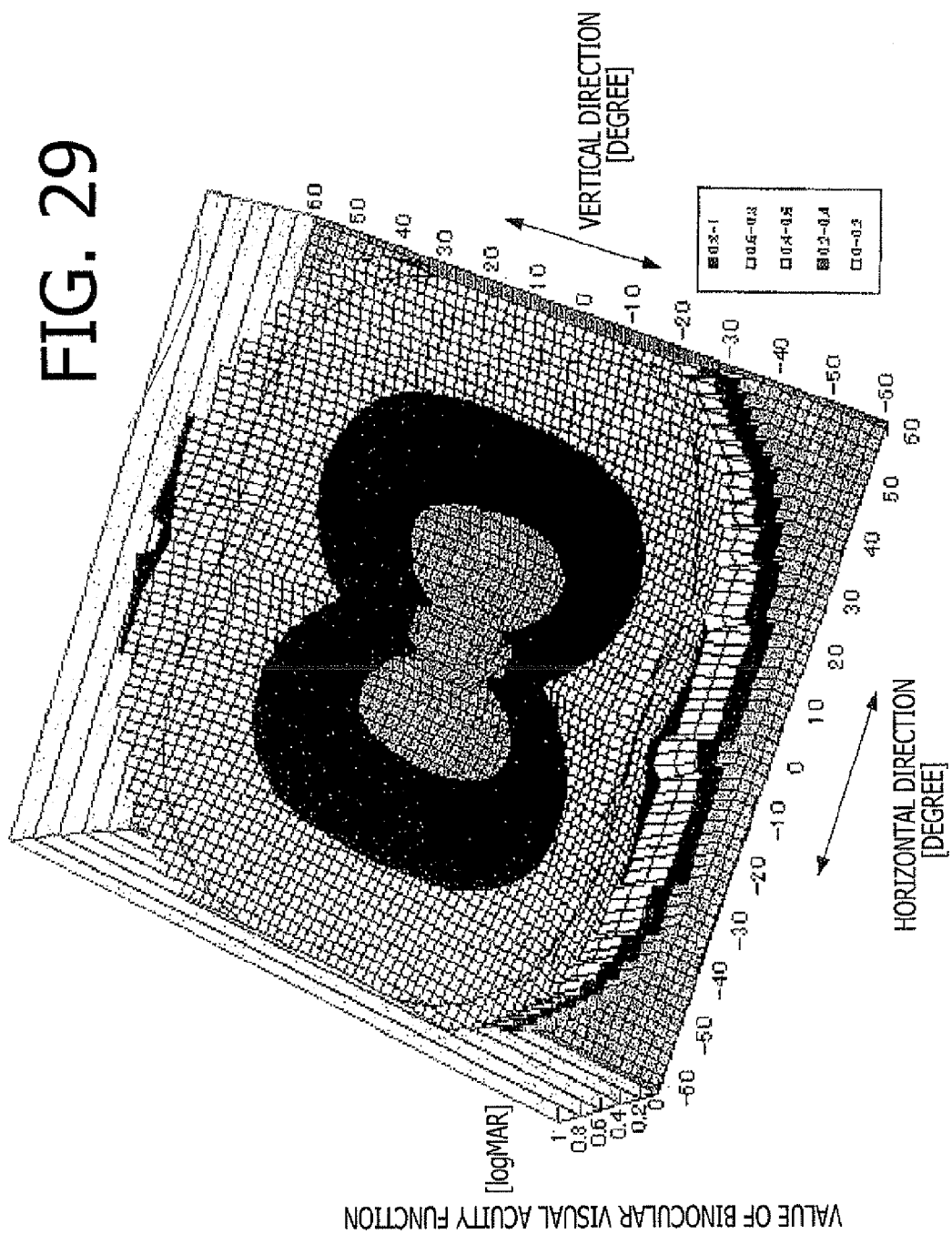
FIG. 29 is a diagram showing values of visual functions for both eyes of embodiment 3 in the eyeglass lens evaluation method of the present invention.

As embodiment 3, the convergence aberrations are calculated for the case in which there is an elevation angles in a frame. In this example, the spherical diopter power, the astigmatism degree, and other condition are set to the same as that of the lens used in the above embodiment 1, and in order to evaluate the extent of the effect of the elevation angle, the elevation angle of 20 degrees is given. It is also an example of an evaluation of eyeglass lenses, and no iteration calculation is performed for optimization. FIG. 26 is the convergence aberration in the surface parallel direction, FIG. 27 is the convergence aberration in the surface perpendicular direction, FIG. 28 is the field of fixation through the eyeglass lenses for both eyes, the FIG. 29 is the values of the binocular visual acuity function, and the units are the same as FIG. 18-FIG. 21, respectively.

Figure 27:
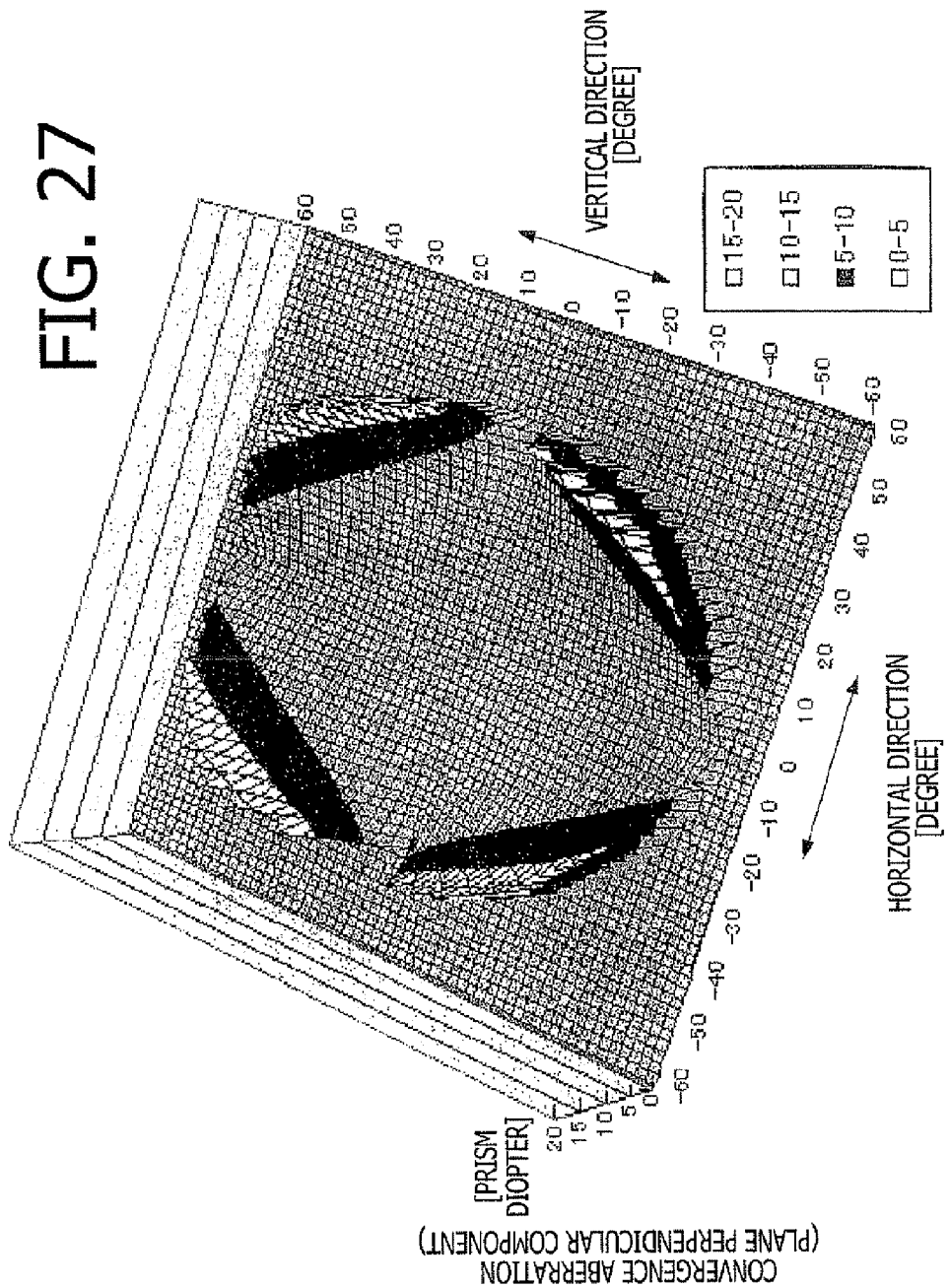
FIG. 27 is a diagram showing a surface perpendicular component of the convergence aberration of embodiment 3 in the eyeglass lens evaluation method of the present invention.

In this example, it is a characteristic that, the surface parallel component shown in FIG. 26 is very large, in comparison with the surface perpendicular component shown in FIG. 27. Therefore, there is almost no area of motor fusion (blackened area) in the field of fixation shown in FIG. 28. Therefore, it is not so bad as long as it is viewed in straight, but it is expected that uncomfortable feeling increases when walking or viewing while moving the eyeballs to view the circumference without moving the head. This is because the range without a sense of depth is large. In this manner, with the evaluation method of the present invention, it becomes possible to quantify the sense of discomfort by taking it as a decrease in the range of the motor fusion. Further, for the binocular visual acuity function shown in FIG. 29, it can be seen that the visual acuity decreases at the central portion in comparison with the above described embodiment 1. The reason is that there is a large astigmatism at the central portion, and the visual acuity is degraded.

(4) Embodiment 4 (an Example in which the Optimization is Applied to the Eyeglass Lenses of the Embodiment 3)

Figure 30:
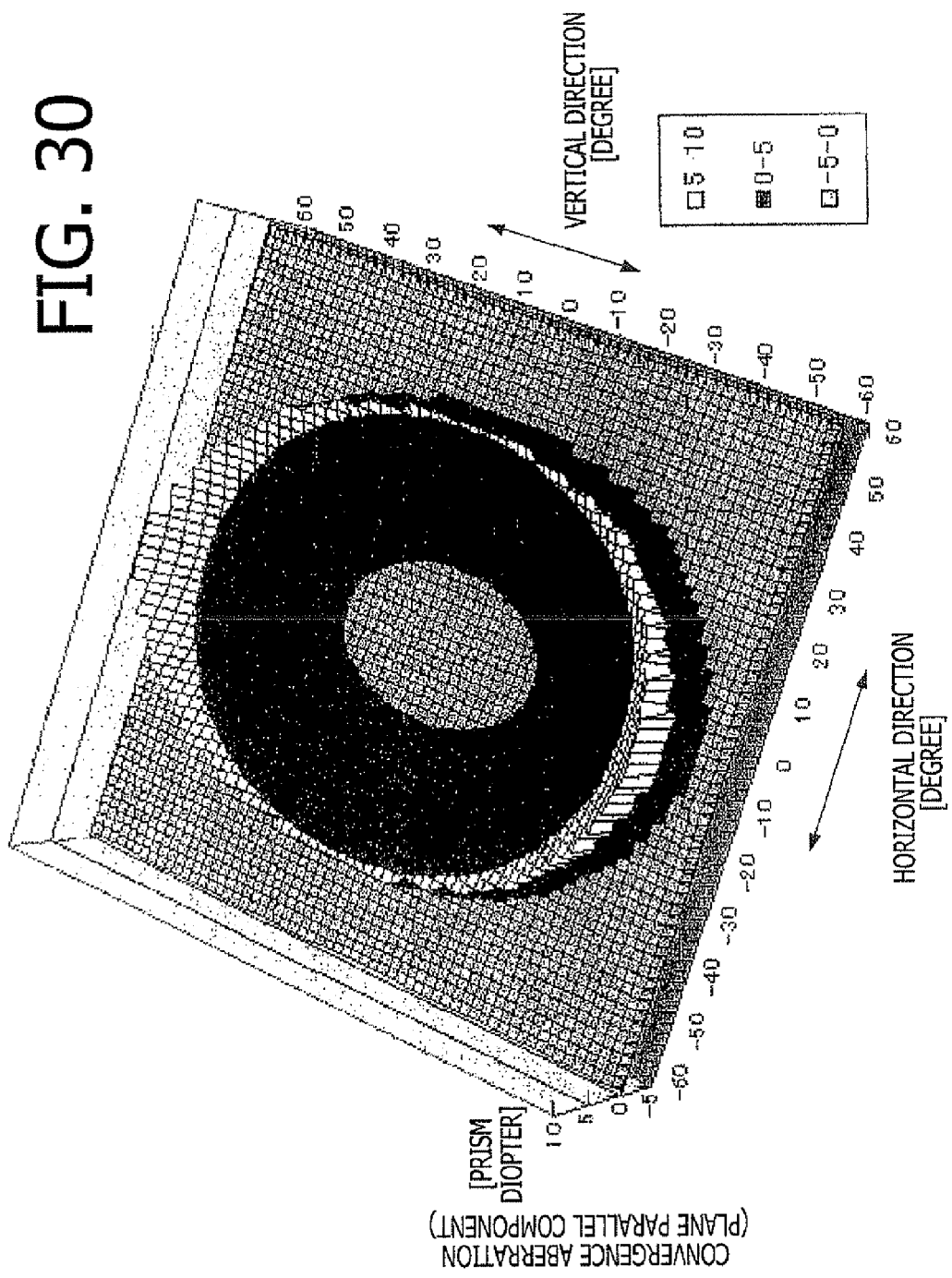
FIG. 30 is a diagram showing a surface parallel component of a convergence aberration, after being optimized, of embodiment 3 in the eyeglass lens evaluation method of the present invention.
Figure 31:
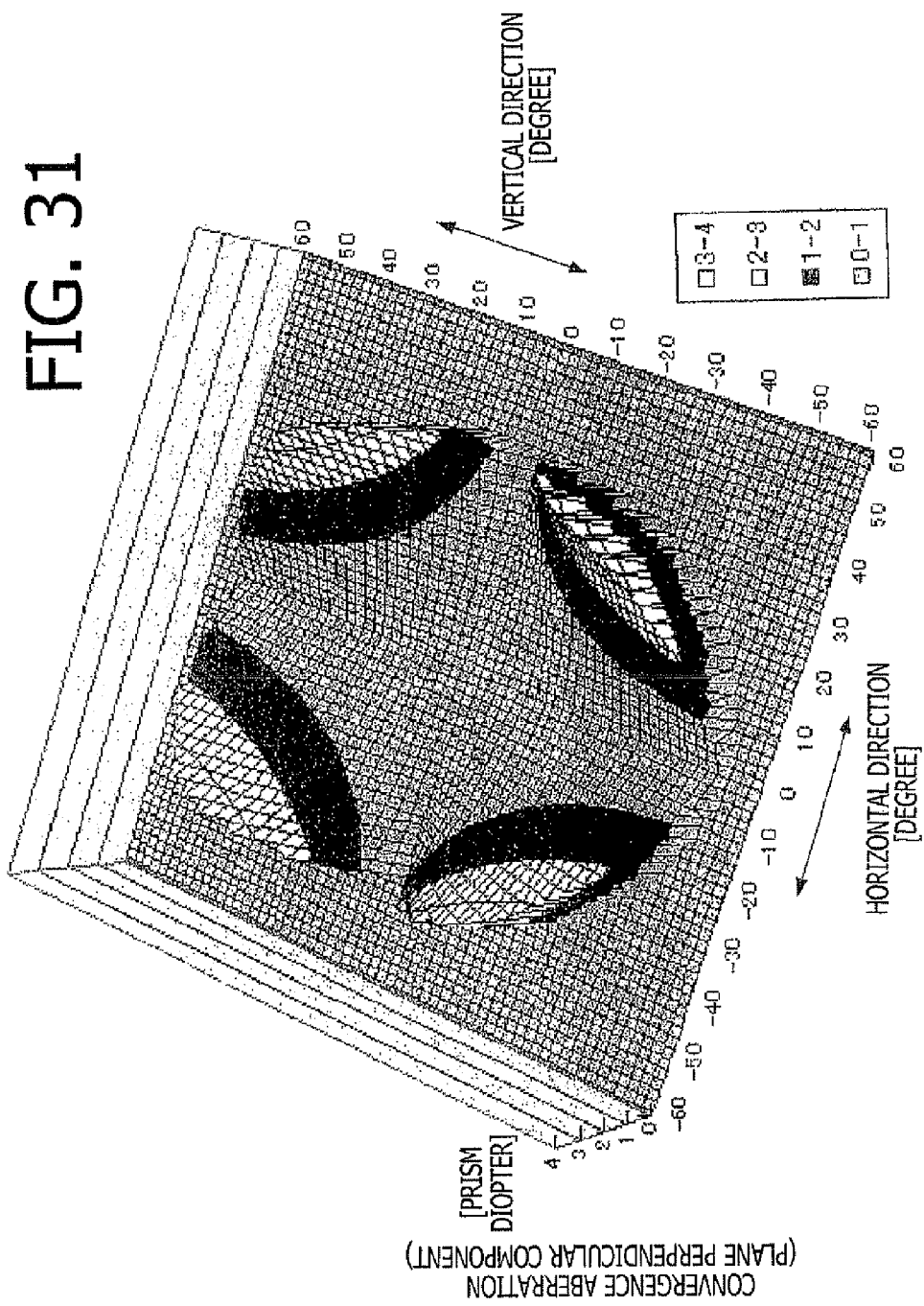
FIG. 31 is a diagram showing a surface perpendicular component of a convergence aberration, after being optimized, of embodiment 3 in the eyeglass lens evaluation method of the present invention.
Figure 32:
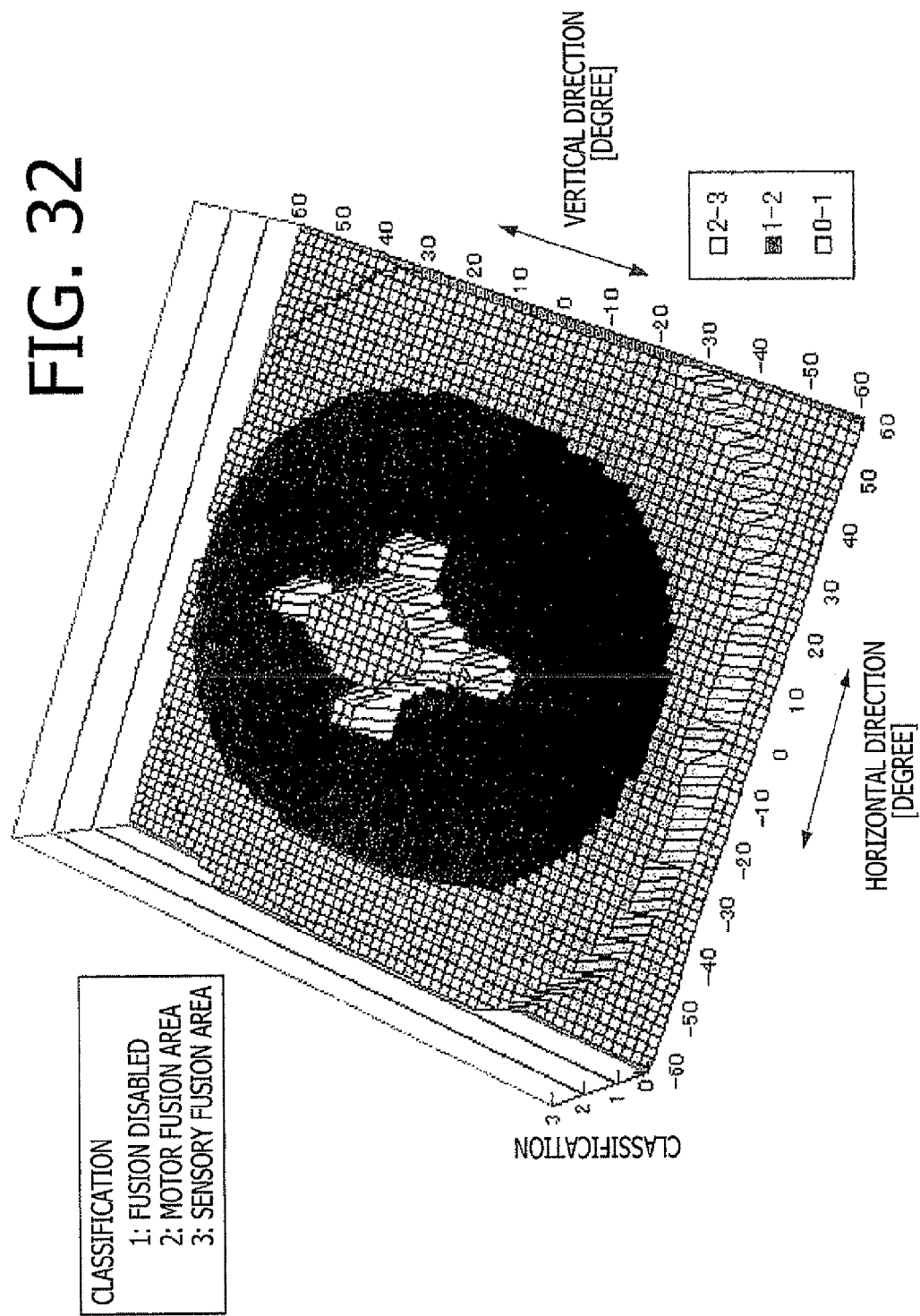
FIG. 32 is a diagram showing a field of fixation through the eyeglass lenses for the both eyes, after being optimized, of embodiment 3 in the eyeglass lens evaluation method of the present invention.
Figure 33:
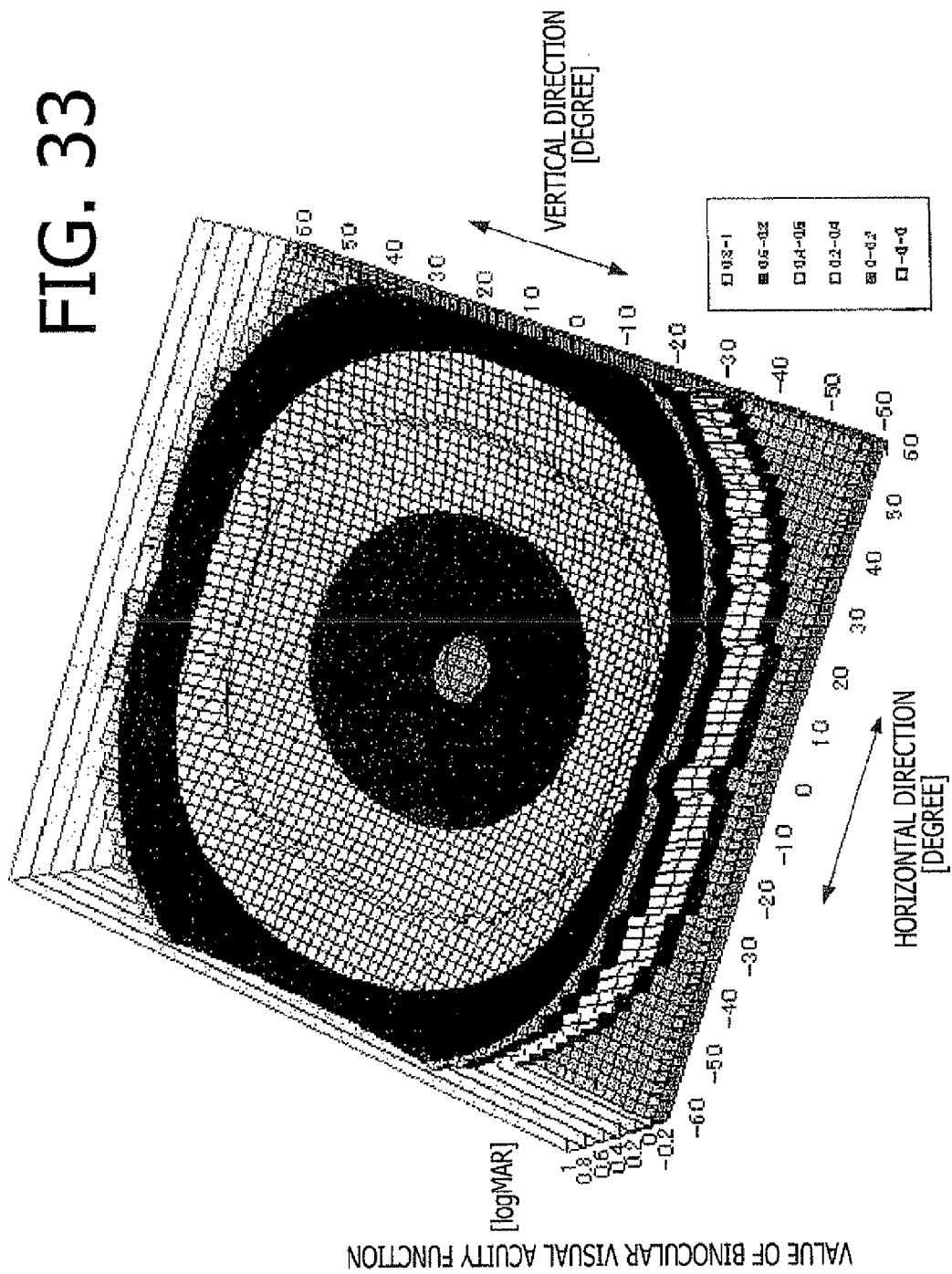
FIG. 33 is a diagram showing values of visual functions, after being optimized, embodiment 3 in the eyeglass lens evaluation method of the present invention.

As an embodiment 4, the conditions of the spherical diopter power, the astigmatism degree, and the elevation angle are set to the same as those in the previously described embodiment 3. However, the function for which the binocular visual acuity functions are added at all of the lens evaluation points is set as the evaluation function, and the optimization of the lens shapes is performed. Namely, the iterative computations of the second step S2—the fifth step S5 are performed, and the minimization of the evaluation function is performed while varying the convex and the concave shapes of the eyeglass lenses. The results are shown in FIG. 30-FIG. 33. FIG. 30 is the convergence aberration in the surface parallel direction, FIG. 31 is the convergence aberration in the surface perpendicular direction, FIG. 32 is the field of fixation through the eyeglass lenses for both eyes, the FIG. 33 is the values of the binocular visual acuity function, and the units are the same as FIG. 17-FIG. 20, respectively.

Firstly, it can be seen that both of the surface parallel direction and the surface perpendicular direction of the convergence aberration shown in FIG. 30 and FIG. 31 are greatly improved in comparison with the embodiment 3. Further, the field of fixation is also greatly improved, and both of the area of the motor fusion (the blackened area) and the area of the sensory fusion (the white area) are extended in comparison with FIG. 28 in the embodiment 3. Further, for the binocular function shown in FIG. 33, the anisotropy is reduced in comparison with FIG. 29 in the embodiment 3. There is no astigmatism at the center portion. Namely, with the optimization using the evaluation function proposed in the present invention, the convergence aberration is improved. Therefore, the areas of the motor fusion and the Panum's fusional area of the field of fixation are extended, and the sense of discomfort is greatly improved.

As described above, according to the present invention, by using the binocular visual acuity function including the relative measurement values, the quantitative evaluation of the binocular visual performance of the eyeglass lenses becomes possible. Therefore, it becomes possible to improve the fusional performance of the binocular visual performance. Further, the present invention is not limited to the configurations explained in the above described examples of the embodiment, and various modification and changes are possible within the scope which does not depart from the configuration of the present invention.

What is claimed is:
1. An eyeglass lens manufacturing method, comprising:
   selecting relative measurement values from individual measurement values related to binocular vision of a wearer of eyeglasses, including: a positive relative convergence, a negative relative convergence, a positive relative accommodation, a negative relative accommodation and a vertical fusional vergence, using at least one of or both of the positive relative convergence and the negative relative convergence in the relative measurement values;
   optimizing the binocular vision while using, as an evaluation function for calculation of the optimizing, a function obtained by adding binocular visual acuity functions including the relative measurement values as factors at respective evaluation points; and
   manufacturing eyeglass lenses based on optical design values obtained by the calculation for the optimizing.

2. The eyeglass lens manufacturing method according to claim 1,
wherein the relative measurement values include at least one of or both of the positive relative accommodation and the negative relative accommodation.

3. The eyeglass lens manufacturing method according to claim 1, wherein the relative measurement values include the vertical fusional vergence.

4. The eyeglass lens manufacturing method according to claim 1, further comprising:
classifying a fusion disabled area and a fusional area as threshold values for the binocular visual acuity functions;
defining a smaller value of visual functions of left and right eyeballs, as the binocular visual acuity function in the fusion disabled area; and
defining a value obtained by subtracting a binocular visual acuity improvement value from the smaller value of the visual functions of the left and right eyeballs, as the binocular visual acuity function in the fusional area.

5. The eyeglass lens manufacturing method according to claim 4, wherein when a three-dimensional space in which a horizontal axis represents an angle of convergence, a vertical axis represents the vertical fusional vergence of motor fusion and a depth axis represents an accommodation axis is considered for the classifying the fusion disabled area and the fusional area, the classifying the fusion disabled area and the fusional area is executed by using, as criteria, an inside and an outside of a closed surface defined by using the relative measurement values as thresholds.

6. The eyeglass lens manufacturing method according to claim 5, further comprising:
defining, as a motor fusion threshold, ⅓ of the positive relative convergence or the negative relative convergence of the relative measurement values on the axis of the angle of convergence;
obtaining a convergence aberration defined as a difference between the angle of convergence at the evaluation point and a convergence angle reference value which is the angle of convergence of a fixation line passing through design reference points of the eyeglass lenses;
obtaining a plane parallel component which includes a median line of the fixation line by which the angle of convergence at the evaluation point is obtained and which is a projection to a plane perpendicular to a median plane;
defining, as a judgment criterion of motor fusion of relative convergence, a compared value between a plane parallel component value of the convergence aberration and a motor fusion threshold of the angle of convergence;
defining, as a motor fusion threshold of accommodation, ⅓ of the positive relative accommodation or the negative relative accommodation of the relative measurement values on the accommodation axis;
defining, as a judgment criterion of the motor fusion of relative accommodation, a compared value between an average dioptric error obtained at the evaluation point and the motor fusion threshold of accommodation;
defining, as a motor fusion threshold of vertical fusional vergence, ⅓ of the vertical fusional vergence of the relative measurement values on the axis of the vertical fusional vergence of motor fusion;
obtaining a plane vertical component which includes a median line of the fixation line for which the angle of convergence of the evaluation point is obtained and which is a projection to a plane parallel with the median plane;
defining, as a judgment criterion of motor fusion of vertical fusional vergence, a compared value between a value of the plane vertical component of the convergence aberration and the motor fusion threshold of vertical fusional vergence;
classifying into an inside of a motor fusional area satisfying a criterion of motor fusion when all the judgment criteria of the motor fusions of relative convergence, relative accommodation and vertical fusional vergence are satisfied simultaneously; and
classifying into a motor fusion disabled area when at least one of the judgment criteria of the motor fusions is not satisfied.

7. The eyeglass lens manufacturing method according to claim 5, further comprising:
defining, as a sensory fusion threshold of the angle of convergence, a plane parallel component perpendicular to a median plane of a Panum's fusional area on the axis of the angle of convergence;
obtaining a convergence aberration defined as a difference between the angle of convergence of the evaluation point and a convergence angle reference value which is the angle of convergence of a fixation line passing through design reference points of the eyeglass lenses;
obtaining, for the convergence aberration, a plane parallel component which includes a median line of the fixation line for which the angle of convergence of the evaluation point is obtained and which is a projection to a plane perpendicular to a median plane;
defining, as a judgment criterion of sensory fusion of relative convergence, a compared value between a plane parallel component value of the convergence aberration and the sensory fusion threshold of the angle of convergence;
defining a focal depth as a sensory fusion threshold of accommodation, on the accommodation axis;
defining, as a judgment criterion of sensory fusion of relative accommodation, a compared value between an average dioptric error at the evaluation point and the sensory fusion threshold of accommodation;
defining, as a sensory fusion threshold of vertical fusional vergence, a plane vertical component parallel with the median plane of the Panum's fusional area on the axis of the vertical fusional vergence of motor fusion;
obtaining, for the convergence aberration, a plane vertical component which includes the median line of the fixation line for which the angle of convergence of the evaluation point is obtained and which is a projection to a plane parallel with the median plane;
defining, as a judgment criterion of sensory fusion of vertical fusional vergence, a compared value between a value of the plane vertical component of the convergence aberration and the sensory fusion threshold of vertical fusional vergence;
classifying inot an inside of a sensory fusional area when all the judgment criteria of the sensory fusions of relative convergence, relative accommodation and vertical fusional vergence are satisfied simultaneously; and
classifying into an inside of a sensory fusion disabled area when at least one of the judgment criteria of the sensory fusions is not satisfied.

8. The eyeglass lens manufacturing method according to claim 1, wherein each of the evaluation function and the binocular visual acuity function has a following relationships defined by equations (1) and (2):

$$\text{evaluation function} = \Sigma^n_{i=1}[W_i \times (B_i - \min B)]^2 \qquad (1)$$

where $W_i$ represents a weight at an i-th evaluation point of an object represented in a binocular view direction, the weight represents a coefficient which varies depending on importance of a usage condition of an area including the i-th evaluation point within the eyeglass lens, $B_i$ is an i-th binocular visual acuity function, and minB is an arbitrary constant which is smaller than a minimum value of n pieces of binocular visual acuity functions, and $$B_i = \min(AVR_i, AVL_i) + C \qquad (2)$$

where $AVR_i$ and $AVL_i$ represent right and left visual functions at the i-the evaluation point, C is a value such that, if a tolerance is satisfied, then fusion is possible and a value of C becomes minB, and if the tolerances is not satisfied, the value of C becomes 0.

9. An eyeglass lens manufacturing system in which an ordering side computer having a function of executing a process for ordering eyeglass lenses and is installed on an eyeglass lens ordering side, a manufacturing side computer having a function of receiving information from the ordering side computer and executing a process necessary for receiving an order for the eyeglass lenses are connected via a network, wherein the ordering side computer transmits information necessary for designing the eyeglass lenses including at least one of or both of a positive relative convergence and a negative relative convergence, to the manufacturing side computer;

wherein the manufacturing side computer includes:

a data input unit to which data including the information necessary for designing the eyeglass lenses value transmitted from the ordering side computer is inputted;

a binocular visual acuity function calculation unit that calculates optical performance values at a plurality of evaluation points of the eyeglass lenses based on the inputted data;

an evaluation value optimization unit that optimizes the optical performance values by using, as an evaluation function, a function obtained by adding binocular visual acuity functions including, as factors, the information necessary for designing the eyeglass lenses;

an evaluation function evaluating unit that evaluates the optical performance values by comparing the evaluation function with a predetermined threshold;

a design data correction unit that corrects design data when values of the binocular visual acuity functions do not reach a predetermined convergence condition as a result of the evaluation by the evaluation function evaluating unit;

an optical design value determination unit that determines the design data based on a result of evaluation finished for each evaluation point by the evaluation function evaluating unit;

a design data output unit that supplies final design data obtained by the optical design value determination unit; and a lens processing device that manufactures the eyeglass lenses based on the final design data supplied by the design data output unit.

10. Eyeglass lenses manufactured by executing the steps of:

selecting relative measurement values from individual measurement values related to binocular vision of a wearer of eyeglasses, including: a positive relative convergence, a negative relative convergence, a positive relative accommodation, a negative relative accommodation and a vertical fusional vergence, using at least one of or both of the positive relative convergence and the negative relative convergence in the relative measurement values; and executing optimization while using an evaluation function obtained by adding binocular visual acuity functions including the relative measurement values as factors at respective evaluation points; and manufacturing the eyeglass lenses based on optical design values obtained by calculation of the optimizing.

* * * * *